United States Patent
Qin et al.

(10) Patent No.: US 11,855,765 B2
(45) Date of Patent: Dec. 26, 2023

(54) DATA TRANSMISSION METHOD AND COMMUNICATION APPARATUS

(71) Applicant: HUAWEI TECHNOLOGIES CO., LTD., Guangdong (CN)

(72) Inventors: Yi Qin, Shanghai (CN); Fan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 17/448,035

(22) Filed: Sep. 17, 2021

(65) Prior Publication Data

US 2022/0006683 A1 Jan. 6, 2022

Related U.S. Application Data

(63) Continuation of application No. PCT/CN2020/078094, filed on Mar. 6, 2020.

(30) Foreign Application Priority Data

Mar. 19, 2019 (CN) .......................... 201910207314.1

(51) Int. Cl.
*H04L 27/36* (2006.01)
*H04L 1/00* (2006.01)
(Continued)

(52) U.S. Cl.
CPC .......... *H04L 27/361* (2013.01); *H04L 1/0002* (2013.01); *H04L 27/3405* (2013.01); *H04W 72/04* (2013.01)

(58) Field of Classification Search
None
See application file for complete search history.

(56) References Cited

U.S. PATENT DOCUMENTS

2006/0274846 A1* 12/2006 Bauch .................. H04L 1/0071
375/267
2013/0195275 A1 8/2013 Koivisto et al.
(Continued)

FOREIGN PATENT DOCUMENTS

| CN | 106788633 A | 5/2017 |
| CN | 107528802 A | 12/2017 |

(Continued)

OTHER PUBLICATIONS

Nokia Siemens Networks, Nokia, On PUCCH Transmission diversity for PUCCH Format 1B with channel selection. 3GPP TSG RAN WG1 Meeting #66bis, Zhuhai, China, Oct. 10-14, 2011, R1-113134, 7 pages.

(Continued)

*Primary Examiner* — Rebecca E Song
(74) *Attorney, Agent, or Firm* — Paul Christopher Hashim

(57) ABSTRACT

Embodiments of this application provide a non-coherent data transmission method and a communication apparatus. In the method, a transmit end device determines, in a first constellation, a first constellation point corresponding to first to-be-modulated bits, where the first constellation point corresponds to P first symbols, P=M*N, M is a positive integer, and N is an integer greater than 1; and sends the P first symbols on N resource units by using M antenna ports, or sends P second symbols determined based on the P first symbols, and foregoes sending demodulation reference signals of the P first symbols or the P second symbols. In the method, a constellation is designed, and each constellation point in the constellation corresponds to a plurality of resource units so that data can be transmitted with no need to transmit a reference signal, and only the data needs to be transmitted.

20 Claims, 7 Drawing Sheets

(51) Int. Cl.
  *H04L 27/34* (2006.01)
  *H04W 72/04* (2023.01)

(56) References Cited

U.S. PATENT DOCUMENTS

2018/0227910 A1  8/2018  Hong et al.
2019/0020390 A1  1/2019  Lomayev et al.

FOREIGN PATENT DOCUMENTS

CN   107846377 A   3/2018
CN   108366375 A   8/2018

OTHER PUBLICATIONS

Dokou Elom Kodjo, Investigation on Channel Estimation of the Downlink Physical Layer of LTE System. Harbin Institute of Technology, Feb. 28, 2018, 1 page.

Alevizos Panos N et al: "Noncoherent Short Packet Detection and Decoding for Scatter Radio Sensor Networking", IEEE Transactions on Communications, IEEE Service Center, Piscataway, NJ. USA, vol. 65, No. 5, May 1, 2017, pp. 2128-2140.

* cited by examiner

DATA TRANSMISSION METHOD AND COMMUNICATION APPARATUS

CROSS-REFERENCE TO RELATED APPLICATIONS

This application is a continuation of International Application No. PCT/CN2020/078094, filed on Mar. 6, 2020, which claims priority to Chinese Patent Application No. 201910207314.1, filed on Mar. 19, 2019. The disclosures of the aforementioned applications are hereby incorporated by reference in their entireties.

TECHNICAL FIELD

This application relates to the communication field, and more specifically, to a data transmission method and a communication apparatus in the communication field.

BACKGROUND

Currently, a data transmission method based on coherent transmission is known. In this method, a transmit end device sends data in a form of sending a reference signal and data, where the reference signal is used to demodulate the data. The transmit end device performs channel coding, scrambling, and modulation on the data, and maps obtained modulation symbols to a first time-frequency resource. The transmit end device may map the reference signal (for example, a demodulation reference signal (DMRS)) to a resource that is different from the first time-frequency resource and that is in time-frequency resources used to transmit the data. Therefore, the transmit end device sends the reference signal and the data on the time-frequency resources used to transmit the data.

It can be learned that the reference signal and the data are transmitted on different time-frequency resources, generation of the reference signal is irrelevant to the data, and in a data transmission optimization process (for example, channel coding, modulation, or scrambling), the data is only optimized. However, because both the reference signal and the data need to be sent in a data transmission process, independent design of the reference signal and the data may cause relatively poor data transmission performance.

Therefore, a technology needs to be provided to effectively improve data transmission performance.

SUMMARY

This application provides a data transmission method, to effectively improve data transmission performance.

According to a first aspect, a data transmission method is provided. The method includes:
  determining, in a first constellation, a first constellation point corresponding to first to-be-modulated bits, where the first constellation point corresponds to P first symbols, P=M*N, M is a positive integer, N is an integer greater than 1, and the first to-be-modulated bits include a positive integer quantity of bits; and
  sending P second symbols on N resource units by using M antenna ports, where the P second symbols are the P first symbols, or the P second symbols are symbols determined based on the P first symbols; and the first to-be-modulated bits represent input bits in a modulation process.

Optionally, the method further includes foregoing (skipping) sending demodulation reference signals of the P second symbols.

Optionally, the first to-be-modulated bits may be some bits in a to-be-transmitted bit stream, or may be all bits in the to-be-transmitted bit stream. That is, the to-be-transmitted bit stream may be a bit stream that is currently to be transmitted and that has not undergone physical layer bit-level processing. The physical layer bit-level processing may include one or more of the following processing: segmentation, concatenation, channel coding, rate matching, scrambling, cyclic redundancy check (CRC) addition, and the like.

Optionally, the first to-be-modulated bits may be bits obtained after a transmit end device processes at least some bits in the to-be-transmitted bit stream. The at least some bits may be some bits in the to-be-transmitted bit stream, or may be all bits in the to-be-transmitted bit stream. As an example instead of a limitation, the transmit end device may perform channel coding and/or scrambling on the at least some bits. Correspondingly, the first to-be-modulated bits are bits obtained after channel coding and/or scrambling are/is performed on the at least some bits.

A relationship between the first to-be-modulated bits and the first constellation is as follows: A bit quantity of the first to-be-modulated bits is a first bit quantity u, a quantity of antenna ports used to transmit the first to-be-modulated bits is M, and in a resource mapping process, a quantity of resource units carrying the first to-be-modulated bits is N, that is, the N resource units are resource units occupied by one modulation resource block. Correspondingly, the first constellation includes $2^u$ constellation points, each constellation point corresponds to P complex modulation symbols (symbols for short), and P=M*N, and each constellation point corresponds to one value (bit value for short) of the to-be-modulated bits. A bit value (denoted as a first bit value) of the first to-be-modulated bits corresponds to the first constellation point.

In this way, the transmit end device may determine, in a plurality of constellation points in the first constellation and based on the first bit value of the first to-be-modulated bits, the first constellation point corresponding to the first bit value, to implement a process of modulating the first to-be-modulated bits, to obtain the P first symbols. In embodiments of this application, when sending the P first symbols or the P second symbols, alternatively, the transmit end device may perform other processing, such as layer mapping or resource mapping, on the P first symbols or the P second symbols, and then send the P first symbols or the P second symbols. This is not limited in embodiments of this application.

Optionally, the transmit end device maps the P first symbols to the N resource units, and sends the first symbols by using the M antenna ports.

Optionally, the transmit end device performs further processing on the P first symbols (for example, performs scrambling processing on the P first symbols) to obtain the P second symbols, maps the P second symbols to the N resource units, and send the P second symbols by using the M antenna ports.

Therefore, according to the data transmission method provided in this embodiment of this application, the transmit end device modulates the first to-be-modulated bits on the first constellation point in the constellation, where the first constellation point corresponds to an M*N matrix X. In the method, a space generated by a row vector of the matrix X carries the first to-be-modulated bits. In this way, a receive end device can obtain the space generated by the row vector of the matrix X, with no need to know channel state information (that is, H), thereby obtaining the first to-be-modulated bits through demodulation based on the matrix X. Therefore, in the method, data (for example, the first to-be-modulated bits) can be transmitted with no need to transmit a reference signal. In this way, on the one hand, compared with a manner of transmitting data on only some scheduled resource units (resource units used to carry data, or resource units in scheduled resource units except resource units used to transmit a reference signal) in coherent transmission, this method can jointly design scheduled resource units, and implement an optimization dimension. For example, during optimization, throughput performance of fading channels can be improved to resist channel fading. On the other hand, because no reference signal needs to be transmitted, resource overheads can be reduced, which improves resource utilization. Therefore, throughput performance of data transmission is effectively improved, and data transmission performance is improved.

In a possible implementation, reference signals used to demodulate the P first symbols or the P second symbols are not sent. Alternatively, demodulation reference signals of a first channel are not sent, where the first channel is used to carry the P first symbols or the P second symbols.

In embodiments of this application, resource units corresponding to one constellation point may be referred to as a modulation resource block, and resource units occupied by one modulation resource block are resource units corresponding to one constellation point. For example, the N resource units corresponding to the first constellation point are used to transmit the first to-be-modulated bits, and the N resource units are one modulation resource block.

In a possible design, N is determined based on a time-frequency resource used to transmit the first to-be-modulated bits, or N is determined based on a time-frequency resource used to transmit a to-be-transmitted bit stream and a first threshold, where the to-be-transmitted bit stream includes the first to-be-modulated bits, or at least some bits in the to-be-transmitted bit stream are used to determine the first to-be-modulated bits.

For a case in which N is determined based on a time-frequency resource used to transmit the first to-be-modulated bits, optionally, a system or a communication protocol may specify or default that only one modulation resource block is used to carry the to-be-transmitted bit stream or to carry a bit stream obtained based on the to-be-transmitted bit stream. The to-be-transmitted bit stream or the bit stream obtained based on the to-be-transmitted bit stream does not need to be grouped, and resource units included in a time-frequency resource scheduled by a network device may be used as resource units occupied by one modulation resource block.

For a case in which N is determined based on a time-frequency resource used to transmit a to-be-transmitted bit stream and a first threshold, optionally, a smaller value of the time-frequency resource used to transmit the to-be-transmitted bit stream and T may be used as a quantity of resource units occupied by one modulation resource block. When a quantity of resource units included in the time-frequency resource is less than T, the time-frequency resource do not need to be grouped, and resource units included in the time-frequency resource used to transmit the to-be-transmitted bit stream may be used as resource units occupied by one modulation resource block. When the quantity of resource units included in the time-frequency resource used to transmit the to-be-transmitted bit stream is greater than T, the time-frequency resource may be grouped to obtain a plurality of resource unit groups, that is, to obtain a plurality of modulation resource blocks, and a quantity of resource units occupied by each modulation resource block is T.

Therefore, in the data transmission method in this embodiment of this application, the resource units (for example, the N resource units) occupied by one modulation resource block are determined by using a time-frequency resource used to transmit the to-be-transmitted bit stream, or the resource units occupied by one modulation resource block are determined by using the time-frequency resource used to transmit the to-be-transmitted bit stream and the first threshold, so that one modulation resource block does not occupy too many resource units, and in a coherent time period and a coherent bandwidth, a channel for the resource units occupied by one modulation resource block does not change greatly, which helps improve data transmission performance in non-coherent transmission.

In a possible design, the method further includes determining the first constellation based on at least one of M or N, where each constellation point in the first constellation corresponds to P symbols.

During specific implementation, if a quantity of antenna ports supported by the communication protocol or the system is a fixed value, for example, M=1 or M=2, M does not need to be determined, and the corresponding first constellation may be determined based on N. If a quantity of resource units that correspond to a constellation and that are supported by the communication protocol or the system is a fixed value, similarly, N does not need to be determined, and the corresponding first constellation may be determined based on M. If the communication protocol or the system may support different quantities of antenna ports and resource units, the corresponding first constellation may be determined based on M and N.

Optionally, the first constellation is determined based on the first bit quantity u of the first to-be-modulated bits and at least one of M or N.

In a possible design, a constellation point in the first constellation is obtained by scrambling a constellation point in a second constellation by using a first scrambling sequence, and each constellation point in the second constellation corresponds to P symbols.

Optionally, the first scrambling sequence includes P scrambling elements, the P scrambling elements correspond to the P symbols corresponding to each constellation point in the first constellation, and each scrambling element corresponds to one symbol.

Optionally, the first scrambling sequence may be determined based on a first scrambling parameter. As an example instead of a limitation, the first scrambling parameter may be determined based on at least one of the following: an ID (for example, a cell radio network temporary identifier (C-RNTI)) of a terminal device, an ID that is of the terminal device and that is configured by the network device, a sequence number of a time unit (for example, a slot, a mini-slot, a frame, or a symbol), a sequence number of an RB, or a sequence number of a modulation resource block.

Optionally, the P scrambling elements of the first scrambling sequence are not completely the same.

In other words, the P scrambling elements may all be different, or may be partially the same.

Optionally, the first scrambling sequence may be a function of the first scrambling parameter and a sequence number of a resource unit (for example, a sequence number of a time domain unit and/or a frequency domain unit).

Optionally, amplitudes of the P scrambling elements in the first scrambling sequence are the same, and/or phases of the P scrambling elements are determined based on the first scrambling parameter.

Therefore, according to the data transmission method provided in this embodiment of this application, a basic constellation (for example, the second constellation) is scrambled by using a scrambling sequence to obtain a new constellation (for example, the first constellation), to implement rotation of the basic constellation, which plays a pseudo random role, where different scrambling sequences can be used to obtain different new constellations. For the first to-be-modulated bits, even when M, N, and u are the same, the transmit end device may further determine the first constellation by using the first scrambling parameter used to determine the first scrambling sequence, thereby implementing interference randomization between different users in non-coherent transmission.

In a possible design, the first constellation includes $L_1$ constellation points, where $L_1=2^u$, and u is a positive integer; and the method further includes:
  determining the first to-be-modulated bits based on u and a to-be-transmitted bit stream, where the to-be-transmitted bit stream includes the first to-be-modulated bits, or at least some bits in the to-be-transmitted bit stream are used to determine the first to-be-modulated bits.

Optionally, when the transmit end device is a terminal device, the network device sends first information to the terminal device, where the first information is used to determine the first constellation.

For example, the first information may be first indication information, and the first indication information is used to indicate the first constellation.

For another example, the first information may be second indication information and third indication information, the second indication information is used to indicate the quantity M of antenna ports, and the third indication information is used to indicate the first constellation corresponding to M.

For another example, the first information may alternatively be fourth indication information, the fourth indication information indicates both the quantity M of antenna ports and the first constellation corresponding to M, and the fourth indication information may be generated through joint coding based on M and the first constellation.

For another example, the first information may alternatively be sixth indication information, the sixth indication information is used to indicate the second constellation, and the second constellation includes $L_1$ constellation points, where $L_1=2^u$. In this way, the terminal device may determine the first bit quantity u based on the constellation (for example, the first constellation or the second constellation) determined by the first information sent by the network device, and obtain, based on u and the to-be-transmitted bit stream, the first to-be-modulated bits whose bit quantity is u.

Optionally, when the first information is the sixth indication information, the terminal device may determine the first constellation based on the sixth indication information and the first scrambling sequence, and modulate the first to-be-modulated bits by using the first constellation.

Optionally, when u is a quantity of bits in the to-be-transmitted bit stream, the to-be-transmitted bit stream is used as the first to-be-modulated bits; when u is less than the quantity of bits in the to-be-transmitted bit stream, first to-be-modulated bits whose bit quantity is u are intercepted from the to-be-transmitted bit stream.

Therefore, the data transmission method provided in this embodiment of this application may be well applied to a scenario in which complete service data cannot be transmitted at a time. Because complete service data cannot be transmitted at a time, for a case in which the transmit end device is a terminal device, the terminal device may not know a quantity of bits of service data that can be currently transmitted. Therefore, in this scenario, a constellation (for example, the first constellation or the second constellation) may be used to determine a bit quantity of to-be-modulated bits (for example, the first to-be-modulated bits), to further determine the to-be-modulated bits. In this way, transmission of the to-be-modulated bits is completed.

In a possible design, the constellation point in the first constellation belongs to a third constellation, the first constellation includes $L_1$ constellation points, the third constellation includes $L_2$ constellation points, and $L_2 \geq L_1$.

$L_2=2^v$, where v is greater than or equal to u. The third constellation may be understood as a general constellation, including a plurality of sub-constellations, and each sub-constellation corresponds to one bit quantity. In other words, the third constellation may be used to determine sub-constellations corresponding to a plurality of bit quantities. A sub-constellation corresponding to each bit quantity includes some or all constellation points in the third constellation, the some or all constellation points form a sub-constellation of the third constellation, and the first constellation is a sub-constellation of the third constellation.

Therefore, according to the data transmission method provided in this embodiment of this application, a general constellation (for example, the third constellation) that includes a plurality of sub-constellations is designed. In this way, the transmit end device can obtain a plurality of sub-constellations of different sizes only by storing the general constellation, thereby effectively reducing a storage space.

In a possible design, amplitudes of all of the P first symbols are the same, and/or a phase difference between any two first symbols in the P first symbols is an integer multiple of S, where $S=2*pi/k$, pi is the ratio of circumference to diameter, and k is an integer greater than 1.

Optionally, the P first symbols may be selected from specific k candidate symbols, and a minimum phase difference between the k candidate symbols is $S=2*pi/k$.

Optionally, the k candidate symbols may be QPSK symbols.

Therefore, according to the data transmission method in this embodiment of this application, the first constellation is further designed, so that the amplitudes of all the P first symbols in the first constellation point are the same; and/or the phase difference between any two first symbols in the P first symbols is an integer multiple of S. This can effectively reduce a peak to average power ratio (PAPR) in a data transmission process, and improve uplink coverage.

In a possible design, that the P second symbols are symbols determined based on the P first symbols includes:
  the P second symbols are determined based on the P first symbols and a second scrambling sequence.

Therefore, according to the information transmission method provided in this embodiment of this application, the P modulated first symbols are scrambled by using the second scrambling sequence, so that the P first symbols can be rotated, to play a pseudo random role. In this way, randomize interference between different users in non-coherent transmission is implemented.

In a possible design, the method further includes:

when determining to use t resource unit groups to transmit a to-be-transmitted bit stream, performing channel coding on the at least some bits in the to-be-transmitted bit stream, to obtain the first to-be-modulated bits, where each resource unit group in the t resource unit groups includes a plurality of resource units; and the N resource units are resource units in any resource unit group in the t resource unit groups, t is greater than a preset value, and t is an integer.

Optionally, the preset value is 1, 2, 3, 4, or a larger integer value. This is not limited in this embodiment of this application.

Therefore, according to the data transmission method in this embodiment of this application, when a quantity t of modulation resource blocks (that is, resource unit groups) used to transmit the to-be-transmitted bit stream is greater than the preset value, a channel on which there are a relatively large quantity of modulation resource blocks is relatively severely faded. Therefore, channel coding is performed on the at least some bits in the to-be-transmitted bit stream, which helps resist channel fading and improve data transmission performance.

Conversely, when the quantity t of modulation resource blocks used to transmit the to-be-transmitted bit stream is less than the preset value, a channel on which there are a small quantity of modulation resource blocks is not significantly faded. Therefore, better transmission performance can also be obtained without performing channel coding on the at least some bits in the to-be-transmitted bit stream.

In a possible design, a to-be-transmitted bit stream includes the first to-be-modulated bits, or at least some bits in the to-be-transmitted bit stream are used to determine the first to-be-modulated bits, where the network device configures information about a constellation used to transmit the to-be-transmitted bit stream, where each constellation point in the constellation corresponds to a plurality of resource units;

the to-be-transmitted bit stream is control information;

a channel carrying the to-be-transmitted bit stream is a physical layer control channel;

a transmission direction of transmitting the to-be-transmitted bit stream is uplink transmission;

a quantity of bits in the to-be-transmitted bit stream falls within a first value range;

a quantity of antenna ports used for transmitting the to-be-transmitted bit stream is less than a second threshold; or a quantity of resource units occupied by the to-be-transmitted bit stream is less than a third threshold.

According to this method, whether to use the non-coherent transmission method provided in this embodiment of this application or a coherent transmission method can be flexibly configured, to improve system compatibility.

According to a second aspect, a data transmission method is provided. The method includes:

receiving P second symbols or P first symbols on N resource units by using M antenna ports, where the P second symbols are symbols determined based on the P first symbols, the P first symbols correspond to a first constellation point, P=M*N, M is a positive integer, and N is an integer greater than 1; and determining first to-be-modulated bits corresponding to the first constellation point in a first constellation.

For specific descriptions of the P first symbols, the first constellation, and the P second symbols, refer to related descriptions in the first aspect. For brevity, details are not described herein again.

Optionally, the method further includes foregoing (skipping) receiving demodulation reference signals of the P second symbols.

In a possible design, N is determined based on a time-frequency resource used to transmit the first to-be-modulated bits, or N is determined based on a time-frequency resource used to transmit a to-be-transmitted bit stream and a first threshold, where the to-be-transmitted bit stream includes the first to-be-modulated bits, or at least some bits in the to-be-transmitted bit stream are used to determine the first to-be-modulated bits.

For specific descriptions of determining N based on the foregoing two cases, refer to related descriptions in the first aspect. For brevity, details are not described herein again.

In a possible design, the method further includes determining the first constellation based on at least one of M or N, where each constellation point in the first constellation corresponds to P symbols.

For specific descriptions of determining the first constellation based on at least one of M or N, refer to related descriptions in the first aspect. For brevity, details are not described herein again.

In a possible design, a constellation point in the first constellation is obtained by scrambling a constellation point in a second constellation by using a first scrambling sequence, and each constellation point in the second constellation corresponds to P symbols;

the P first symbols correspond to a second constellation point, and the second constellation point is obtained by scrambling the first constellation point by using a first scrambling sequence; and the determining first to-be-modulated bits corresponding to the first constellation point in a first constellation includes: determining first to-be-modulated bits corresponding to the second constellation point in the second constellation.

For specific descriptions of the second constellation and the first scrambling sequence, refer to related descriptions in the first aspect. For brevity, details are not described herein again.

In a possible design, the constellation point in the first constellation belongs to a third constellation, the first constellation includes the $L_1$ constellation points, the third constellation includes $L_2$ constellation points, and $L_2 \geq L_1$.

For specific descriptions of the third constellation and the first constellation, refer to related descriptions in the first aspect. For brevity, details are not described herein again.

In a possible design, amplitudes of all of the P first symbols are the same, and/or a phase difference between any two first symbols in the P first symbols is an integer multiple of S, where S=2*pi/k, pi is the ratio of circumference to diameter, and k is an integer greater than 1.

For specific descriptions of the P first symbols, refer to related descriptions in the first aspect. For brevity, details are not described herein again.

In a possible design, the P second symbols are symbols obtained by scrambling the P first symbols by using a second scrambling sequence; and the method further includes:

descrambling the P second symbols by using the second scrambling sequence, to obtain the P first symbols.

In a possible design, a to-be-transmitted bit stream includes the first to-be-modulated bits, or at least some bits in the to-be-transmitted bit stream are used to determine the first to-be-modulated bits, where the network device configures information about a constellation used to transmit the to-be-transmitted bit stream, where each constellation point in the constellation corresponds to a plurality of resource units;
the to-be-transmitted bit stream is control information;
a channel carrying the to-be-transmitted bit stream is a physical layer control channel;
a transmission direction of transmitting the to-be-transmitted bit stream is uplink transmission;
a quantity of bits in the to-be-transmitted bit stream falls within a first value range;
a quantity of antenna ports used for transmitting the to-be-transmitted bit stream is less than a second threshold; or
a quantity of resource units occupied by the to-be-transmitted bit stream is less than a third threshold.

According to a third aspect, a communication apparatus is provided. The apparatus may be a transmit end device, may be an apparatus in the transmit end device, or may be another apparatus that can match the transmit end device, and the transmit end device may be a terminal device or a network device. The apparatus may include a processing unit and a transceiver unit. The processing unit and the transceiver unit may perform corresponding functions performed by the transmit end device in any design example of the first aspect. The following specifically describes functions of each unit.

The processing unit is configured to determine, in a first constellation, a first constellation point corresponding to first to-be-modulated bits, where the first constellation point corresponds to P first symbols, P=M*N, M is a positive integer, and N is an integer greater than 1.

The transceiver unit is configured to send P second symbols on N resource units by using M antenna ports, where the P second symbols are the P first symbols, or the P second symbols are symbols determined based on the P first symbols.

Optionally, the transceiver unit is not configured to send demodulation reference signals of the P second symbols.

For specific descriptions of the first to-be-transmitted bit stream, the first constellation, and the P second symbols, refer to related descriptions in the first aspect. For brevity, details are not described herein again.

According to a fourth aspect, a communication apparatus is provided. The apparatus may be a receive end device, may be an apparatus in the receive end device, or may be another apparatus that can match the receive end device, and the receive end device may be a terminal device or a network device. The apparatus may include a processing unit and a transceiver unit. The processing unit and the transceiver unit may perform corresponding functions performed by the receive end device in any design example of the second aspect. The following specifically describes functions of each unit.

The transceiver unit is configured to receive P second symbols on N resource units by using M antenna ports, where the P second symbols are P first symbols, or the P second symbols are symbols determined based on P first symbols, the P first symbols correspond to a first constellation point, P=M*N, M is a positive integer, and N is an integer greater than 1.

The processing unit is configured to determine first to-be-modulated bits corresponding to the first constellation point in a first constellation.

Optionally, the transceiver unit is not configured to receive demodulation reference signals of the P second symbols.

For specific descriptions of the first to-be-transmitted bit stream, the first constellation, and the P second symbols, refer to related descriptions in the second aspect. For brevity, details are not described herein again.

According to a fifth aspect, an embodiment of this application further provides a communication apparatus. The communication apparatus includes a processor, configured to implement functions of the transmit end device in the method described in the first aspect. The communication apparatus may further include a memory, the memory is coupled to the processor, and the processor is configured to implement the functions of the transmit end device in the method described in the first aspect. In a possible implementation, the memory is configured to store program instructions and data. The memory is coupled to the processor, and the processor may invoke and execute the program instructions stored in the memory, to implement the functions of the transmit end device in the method described in the first aspect. The communication apparatus may further include a communication interface, and the communication interface is used by the communication apparatus to communicate with another device. For example, the communication interface is a transceiver, an interface, a circuit, or the like, and the another device is a receive end device.

In a possible design, the communication apparatus includes a processor and a communication interface, where the processor is configured to determine first to-be-modulated bits.

The processor is further configured to determine, in a first constellation, a first constellation point corresponding to the first to-be-modulated bits, where the first constellation point corresponds to P first symbols, P=M*N, M is a positive integer, and N is an integer greater than 1.

The processor sends, through the communication interface, P second symbols on N resource units by using M antenna ports, where the P second symbols are the P first symbols, or the P second symbols are symbols determined based on the P first symbols.

Optionally, the communication interface is not configured to send demodulation reference signals of the P second symbols.

For specific descriptions of the first to-be-transmitted bit stream, the first constellation, and the P second symbols, refer to related descriptions in the first aspect. For brevity, details are not described herein again.

According to a sixth aspect, an embodiment of this application further provides a communication apparatus. The communication apparatus includes a processor, configured to implement functions of the receive end device in the method described in the second aspect. The communication apparatus may further include a memory, the memory is coupled to the processor, and the processor is configured to implement the functions of the receive end device in the method described in the second aspect. In a possible implementation, the memory is configured to store program instructions and data. The memory is coupled to the processor, and the processor may invoke and execute the program instruction stored in the memory, to implement the functions of the receive end device in the method described in the second aspect. The communication apparatus may further include a communication interface, and the communication interface is used by the communication apparatus to communicate with another device. For example, the communication interface is a transceiver, an interface, a circuit, or the like, and the another device is a transmit end device.

In a possible design, the communication apparatus includes a processor and a communication interface, where the processor receives, through the communication interface, P second symbols on N resource units by using M antenna ports, where the P second symbols are P first symbols, or the P second symbols are symbols determined based on P first symbols, the P first symbols correspond to a first constellation point, P=M*N, M is a positive integer, and N is an integer greater than 1.

The processor is configured to determine first to-be-modulated bits corresponding to the first constellation point in a first constellation.

Optionally, the communication interface is not configured to receive demodulation reference signals of the P second symbols.

For specific descriptions of the first to-be-transmitted bit stream, the first constellation, and the P second symbols, refer to related descriptions in the second aspect. For brevity, details are not described herein again.

According to a seventh aspect, an embodiment of this application further provides a computer-readable storage medium, including instructions. When the instructions are run on a computer, the computer is enabled to perform the method according to any possible design of the first aspect or the second aspect.

According to an eighth aspect, an embodiment of this application further provides a computer program product, including instructions. When the instructions are run on a computer, the computer is enabled to perform the method according to any possible design of the first aspect or the second aspect.

According to a ninth aspect, an embodiment of this application provides a chip system. The chip system includes a processor, may further include a memory, and is configured to implement the method according to any possible design of the first aspect or the second aspect. The chip system may include a chip, or may include a chip and another discrete component.

According to a tenth aspect, an embodiment of this application provides a system, where the system includes the apparatus according to the fifth aspect and the apparatus according to the sixth aspect, or the apparatus according to the third aspect and the apparatus according to the fourth aspect.

DESCRIPTION OF EMBODIMENTS

Figure 1:
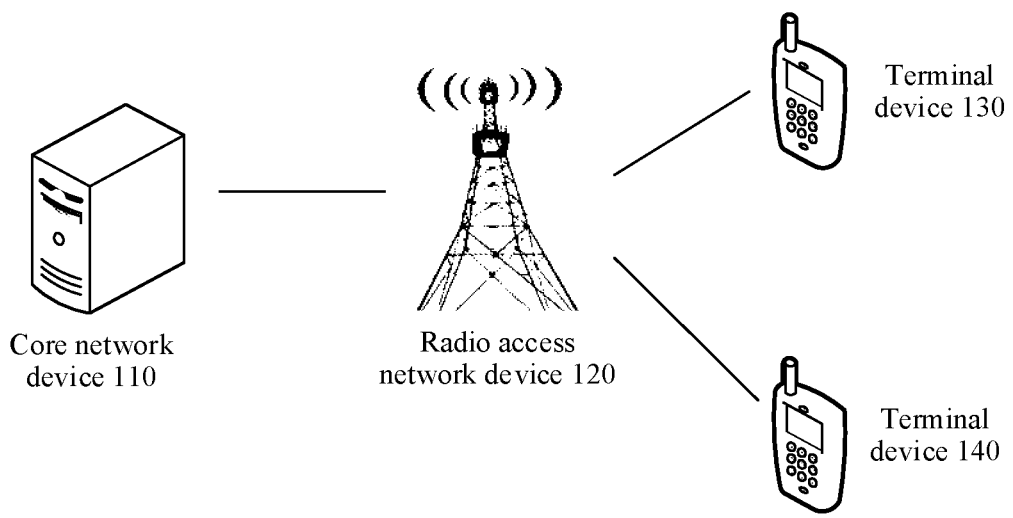
FIG. 1 is a schematic architectural diagram of a mobile communication system to which an embodiment of this application is applicable.

The following describes technical solutions in embodiments of this application with reference to accompanying drawings.

In the embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least a part" may be all or a part. For example, "at least a part of B in A" may represent all B in A, or may represent a part of B in A. The term "at least one of the following items (pieces)" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural. "A belongs to B" may indicate that A is a subset of B, or may indicate that content of A is the same as content of B. "A includes B" may indicate that B is a subset of A, or may indicate that content of A is the same as content of B, or "A includes B" may indicate that A includes B and other content, or may indicate that A includes only B.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The technical solutions in the embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, or a 5th generation (5G) system. 5G may also be referred to as new radio (NR).

The technical solutions provided in the embodiments of this application can be applied to wireless communication between communication devices. The communication devices may include a network device and a terminal device. The wireless communication between the communication devices may include, but is not limited to, wireless communication between a network device and a terminal device, wireless communication between network devices, and wireless communication between terminal devices. In the embodiments of this application, the term "wireless communication" may be referred to as "communication" for short, and the term "communication" may also be described as "data transmission", "signal transmission", "information transmission", "transmission", or the like. In the embodiments of this application, transmission may include sending or receiving. For example, the transmission may be uplink transmission. For example, the terminal device may send a signal to the network device. The transmission may alternatively be downlink transmission. For example, the network device may send a signal to the terminal device. In the embodiments of this application, the wireless communication between the communication devices may be described as: A transmit end sends a signal to a receive end, and the receive end receives the signal from the transmit end.

The terminal device in the embodiments of this application may also be referred to as a terminal, and may be a device with a wireless transceiver function. The terminal may be deployed on land, including an indoor device, an outdoor device, a handheld device, or a vehicle-mounted device, may be deployed on a water surface (such as on a ship), or may be deployed in the air (for example, on an aircraft, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus configured to implement a terminal function may be a terminal, or may be an apparatus, for example, a chip system, that can support the terminal in implementing the function. The apparatus may be installed in the terminal. In the embodiments of this application, a chip system may include a chip, or may include a chip and another discrete component. In the technical solutions provided in the embodiments of this application, an example in which an apparatus for implementing a terminal function is a terminal may be used to describe the technical solutions provided in the embodiments of this application.

The network device in the embodiments of this application includes a base station (BS) or an access network device. The base station may be a device that is deployed in a radio access network and that can perform wireless communication with a terminal. The base station may be in a plurality of forms, for example, a macro base station, a micro base station, a relay node, and an access point. For example, the base station in the embodiments of this application may be a base station in 5G or a base station in LTE, and the base station in 5G may also be referred to as a transmission reception point (TRP) or a gNB (gNodeB). In the embodiments of this application, an apparatus configured to implement a network device function may be a network device, or may be an apparatus that can support the network device in implementing the function, for example, a chip system. The apparatus may be installed in the network device. In the technical solutions provided in the embodiments of this application, an example in which an apparatus for implementing a network device function is a network device may be used to describe the technical solutions provided in the embodiments of this application.

In a possible design, in the embodiments of this application, the apparatus for implementing a terminal device function or the apparatus for implementing a network device function includes a hardware layer, an operating system layer that runs on the hardware layer, and an application layer that runs on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not particularly limited in the embodiments of this application, provided that communication can be performed according to the method provided in the embodiments of this application. For example, the execution body of the method provided in the embodiments of this application may be the terminal device, the network device, or a function module that is in the terminal device or the network device and that can invoke and execute a program.

In addition, aspects or features in the embodiments of this application may be implemented as a method, an apparatus, or a product that uses standard programming and/or engineering technologies. The term "product" used in the embodiments of this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to various other media that can store, contain and/or carry instructions and/or data.

FIG. 1 is a schematic architectural diagram of a mobile communication system to which an embodiment of this application is applicable. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices independent of each other, or a function of the core network device and a function of the radio access network device may be integrated into one physical device, or a part of functions of the core network device and a part of functions of the radio access network device may be integrated into one physical device. The terminal device may be at a fixed position or may be movable. FIG. 1 is only a schematic diagram. The communication system may further include other network devices, for example, may further include a wireless relay device and a wireless backhaul device, which are not shown in FIG. 1. Quantities of core network devices, radio access network devices, and terminal devices included in the mobile communication system are not limited in this embodiment of this application.

As described in the background, in current wireless communication, data is transmitted in a coherent transmission mode, that is, data is transmitted based on a reference signal. The data may be service data, or may be various types of information used for wireless communication, for example, control information carried on a physical layer data channel. The transmitted data may also be referred to as to-be-transmitted data. In this transmission mode, generation of the reference signal is irrelevant to the to-be-transmitted data. Therefore, in a data transmission optimization process, the data is optimized only in a process such as channel coding, scrambling, or modulation. However, because both the reference signal and the data need to be sent in the data transmission process, an independent design of the reference signal and the data leads to poor data transmission performance. For example, a transmission condition of the reference signal may not match a transmission condition of the data. As a result, an error rate of a demodulation result obtained when the data is demodulated based on the reference signal is high, and therefore a data transmission rate is relatively low.

Based on this, the embodiments of this application provide a data transmission method. In the method, a transmit end device may not need to transmit data based on a reference signal, that is, no reference signal needs to be sent in a data transmission process. Correspondingly, a receive end device also does not need to demodulate data by estimating a channel state by using a reference signal. In this way, data can be uniformly designed and optimized. Compared with coherent transmission in which a reference signal and data are not jointly optimized in the conventional technology, the data transmission method provided in the embodiments of this application may have better throughput performance, and therefore data transmission performance can be improved.

The transmit end device may be referred to as a "transmit end" for short, and the transmit end device may be a terminal device, or may be a network device. The receive end device may be referred to as a "receive end" for short, and the receive end device may be a network device, or may be a terminal device.

For ease of description, as an example instead of a limitation, the transmission mode provided in the embodiments of this application may be referred to as non-coherent transmission.

For ease of understanding, related terms and technologies used in the embodiments of this application are first briefly described.

1. Resource Unit

The resource unit may be used as a measurement unit of a resource in time domain, frequency domain, or time-frequency domain. In the embodiments of this application, the measurement unit of the resource in time-frequency domain may be represented as a resource unit, and the resource unit may be, for example, a resource element (RE) or a resource block (RB).

The RE may also be referred to as a resource element. In a communication system based on orthogonal frequency division multiplexing (OFDM), for example, in LTE or 5G, one RE may correspond to one time domain symbol in time domain, and may correspond to one subcarrier in frequency domain. In the embodiments of this application, a time-frequency resource of the RE may be an example of a resource unit. For example, the time domain symbol may be an orthogonal frequency division multiple access (OFDMA) symbol or a single-carrier frequency division multiple access (SC-FDMA) symbol.

One RB includes $N_{sc}^{RB}$ consecutive subcarriers in frequency domain, where $N_{sc}^{RB}$ is a positive integer. For example, in LTE or 5G, $N_{sc}^{RB}$ may be equal to 12. In the embodiments of this application, the RB may be defined only in frequency domain, that is, a quantity of time domain resources occupied by an RB in time domain is not limited. Alternatively, the RB may be defined in time domain and frequency domain. For example, one RB includes $N_{sc}^{RB}$ consecutive subcarriers in frequency domain and includes a positive integer quantity of time domain symbols in time domain. For example, one RB includes 7, 14, 6, or 12 time domain symbols in time domain. In the embodiments of this application, the time-frequency resource of the RB may be another example of a resource unit.

2. Resource Unit Group

The resource unit group may be used as another measurement unit of the resource in time domain, frequency domain, or time-frequency domain. In the embodiments of this application, one resource unit group includes a positive integer quantity of resource units.

For example, one resource unit group may include a positive integer quantity of subcarriers in frequency domain, and include a positive integer quantity of time domain symbols, slots, subframes, or the like in time domain. In other words, one resource unit group includes a positive integer quantity of REs.

For example, one resource unit group may include a positive integer quantity of RBs in frequency domain, and include a positive integer quantity of time domain symbols, slots, subframes, or the like in time domain. In other words, one resource unit group includes a positive integer quantity of REs. One slot may include a positive integer quantity of time domain symbols, for example, 7 or 14 time domain symbols. One subframe may include a positive integer quantity of slots or a positive integer quantity of time domain symbols. For example, in 5G, for each subcarrier spacing supported in a system, for example, 15 kHz, 30 kHz, 60 kHz, 120 kHz, and 240 kHz, one slot may be configured to include 14 time domain symbols, and a length of a subframe is set to 1 ms. Because symbol lengths corresponding to different subcarrier spacings may be different, quantities of slots included in subframes corresponding to different subcarrier spacings may be different.

In the embodiments of this application, a resource unit in the resource unit group may be a resource unit corresponding to a constellation point in a modulation process. Therefore, the resource unit group may also be referred to as a modulation resource block. In the following descriptions, the resource unit group and the modulation resource block may be alternately used for description.

3. Constellation

The constellation is used to modulate to-be-modulated bits. It is assumed that the to-be-modulated bits (or referred to as to-be-modulated data) include u bits. Because a value of each bit may be 0 or 1, that is, there are two possible values in total, there may be $2^u$ possible values of the u bits. Therefore, the constellation corresponding to the u bits includes $2^u$ constellation points, each constellation point corresponds to a plurality of complex-valued modulation symbols, the $2^u$ constellation points are in a one-to-one correspondence with the $2^u$ possible bit values, and each bit value represents one possible value of the u bits, where u is a positive integer. In the embodiments of this application, the positive integer may be 1, 2, 3, or a larger integer.

For example, the transmit end device may determine the corresponding constellation based on u, and determine, in a plurality of constellation points in the constellation, a constellation point corresponding to a value of the u bits, to obtain complex-valued modulation symbols corresponding to the determined constellation point. The transmit end may map the obtained complex-valued modulation symbols or the complex-valued symbols obtained based on the obtained complex-valued modulation symbols to a time-frequency resource, for transmission. Herein, neither the real part nor the imaginary part of a complex value may be 0, one of the real part and the imaginary part may be 0, or both the real part and the imaginary part may be 0.

The constellation herein may also be considered as modulation mapping from bit values to complex-valued modulation symbols. That is, for a given constellation, it may be considered that the constellation is a mapping relationship between input bit values and output complex-valued modulation symbols. The mapping relationship may be described in a form of a table and/or a form of a formula. A specific form is not limited herein. The complex-valued modulation symbol may also be referred to as a complex modulation symbol, a complex number modulation symbol, a complex symbol, a symbol, or the like.

In the non-coherent transmission in the embodiments of this application, a constellation is related to a bit quantity of to-be-modulated bits, and constellation points in the constellation are constellation points corresponding to at least one antenna port and corresponding to a plurality of resource units.

That the to-be-modulated bits are u bits is still used as an example. It is assumed that a quantity of antenna ports used to transmit the to-be-modulated bits is M, and in a resource mapping process, a quantity of resource units used to transmit the to-be-modulated bits is N.

Correspondingly, the constellation corresponding to the to-be-modulated bits includes $2^u$ constellation points, each constellation point includes P elements, P=M*N, M is a positive integer (for example, 1, 2, 4, 8, or 16), N is a positive integer greater than 1 (for example, 2, 4, 6, or 8), and P is a positive integer greater than 1. One element may be understood as one complex-valued modulation symbol (symbol for short), and the P elements are P symbols. For ease of unified description below, elements may be collectively referred to as symbols, and the two expressions may be replaced with each other. In addition, as an example instead of a limitation, the P elements may be denoted as a matrix of M rows and N columns (M*N) or N rows and M columns (N*M), or the P elements may be denoted as an element group. Certainly, another description method is not excluded in this specification. For example, the P elements may be a sequence whose length is P. In this way, the transmit end device may determine, in a plurality of constellation points in the constellation and based on a bit value of the to-be-modulated bits, a constellation point corresponding to the to-be-modulated bits, to implement a process of modulating the to-be-modulated bits, to obtain the P symbols.

It should be understood that in the embodiments of this application, one constellation point may correspond to one modulation symbol group, one modulation symbol group includes P complex modulation symbols, and any complex modulation symbol in the P complex modulation symbols may be a complex number whose real part is 0 and/or imaginary part is 0.

Based on this, the constellation in the embodiments of this application may be further considered as modulation mapping from bit values to modulation symbol groups. That is, for a given constellation, it may be considered that the constellation is a mapping relationship between input bit values and output modulation symbol groups. The mapping relationship may be described in a form of a table and/or a form of a formula. A specific form is not limited herein.

It should be further understood that the modulation symbol group in the embodiments of this application may also have another name, for example, a modulation symbol sequence, a modulation symbol matrix, or a modulation symbol.

For ease of description, in the embodiments of this application, an example in which one constellation point corresponds to one modulation symbol group is used for description, an example in which one constellation point corresponds to one modulation symbol sequence is used for description, or an example in which one constellation point corresponds to one modulation symbol matrix is used for description.

Figure 2:
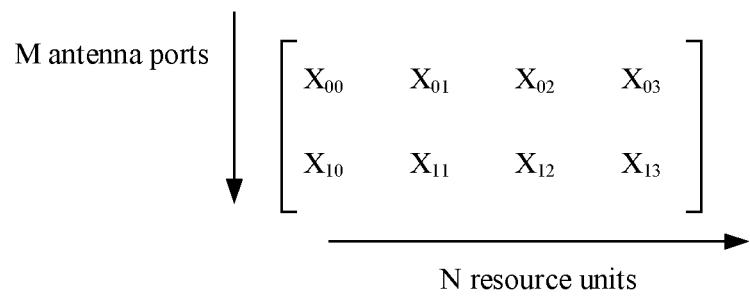
FIG. 2 is a schematic diagram of a constellation point according to an embodiment of this application.

FIG. 2 is a schematic diagram of a constellation point according to an embodiment of this application. As shown in FIG. 2, it is assumed that M=2 and N=4. A matrix corresponding to the constellation point is denoted as X, the matrix X may be an M*N matrix (where certainly, the matrix X may also be an N*M matrix, and the M*N matrix is used as an example herein), and the matrix includes eight symbols. For the M*N matrix, it may be understood that a symbol in an $m^{th}$ row and an $n^{th}$ column in the matrix X is mapped to an $n^{th}$ resource unit, and is sent by using an $m^{th}$ antenna port, m is from 0 to 1 (that is, m is an integer ranging from 0 to 1), and n is from 0 to 3 (that is, n is an integer ranging from 0 to 3).

4. To-be-Transmitted Bit Stream

The to-be-transmitted bit stream includes one or more bits. The to-be-transmitted bit stream may be a bit stream that is currently to be transmitted and that has not undergone physical layer bit-level processing. The physical layer bit-level processing may include one or more of the following processing: segmentation, concatenation, channel coding, rate matching, scrambling, cyclic redundancy check (CRC) addition, and the like. For example, the to-be-transmitted bit stream may be delivered by a media access control (MAC) layer of the transmit end to a physical layer of the transmit end, or may be information bits on a physical layer control channel. The transmit end may perform processing such as channel coding, scrambling, or modulation on the to-be-transmitted bit stream. The to-be-transmitted bit stream may be understood as current to-be-transmitted data. The data may be service data, control information carried on a physical layer data channel, or various other control information used for wireless communication. As an example instead of a limitation, the service data may be data carried on a physical uplink shared channel (PUSCH), data carried on a physical downlink shared channel (PDSCH), or the like. As an example instead of a limitation, the other control information may be information (for example, downlink control information (DCI)) carried on a physical downlink control channel (PDCCH), may be information (for example, uplink control information (UCI)) carried on a physical uplink control channel (PUCCH), or the like. The uplink control information may include but is not limited to an acknowledgment (ACK), a negative acknowledgment (NACK), channel state information (CSI), scheduling request information, beam interruption recovery request information, and the like. The ACK/NACK is used to feed back whether information is correctly received, the CSI is used to feed back information (for example, channel state information, a precoding matrix indication, or a rank indication) related to a channel state, the scheduling request information is used by the terminal device to request a scheduling resource from the network device, and the beam interruption recovery request information is used by the terminal device to report a beam interruption to the network device and request to perform beam interruption recovery. In the following descriptions, the to-be-transmitted bit stream and the to-be-transmitted data may be alternately used for description.

In the embodiments of this application, data is transmitted in a non-coherent transmission mode, and the transmit end device or the receive end device may not need to transmit data based on a reference signal. Based on this, a related design is performed for the modulation process in non-coherent transmission, and other processes, such as channel coding and scrambling, of processing data at a physical layer are further designed. The reference signal may also be referred to as a pilot, a demodulation reference signal, or the like.

The following describes in detail the data transmission method in the embodiments of this application with reference to FIG. 3 to FIG. 15. All methods in the embodiments of this application are applicable to uplink transmission and downlink transmission, are applicable to communication between network devices such as a macro base station and a micro base station, and are applicable to device-to-device (D2D) communication between terminal devices. For ease of description, the transmit end device and the receive end device are together used as execution bodies of the embodiments of this application. The transmit end device generates and sends data, and the receive end device receives and demodulates the data. In a possible application scenario, the transmit end device may be an apparatus that can perform the embodiments of this application, such as a network device or a chip disposed in the network device. Correspondingly, the receive end device is an apparatus that can perform the embodiments of this application, such as a terminal device or a chip disposed in the terminal device. Alternatively, the transmit end device may be an apparatus that can perform the embodiments of this application, such as a terminal device or a chip disposed in the terminal device. Correspondingly, the receive end device is an apparatus that can perform the embodiments of this application, such as a network device or a chip disposed in the network device.

In the embodiments of this application, a plurality of resource units (where the plurality of resource units may be considered as one resource unit group) corresponding to one constellation point may be referred to as a modulation resource block, or a plurality of resource units used when complex-valued modulation symbols of one constellation point are sent are referred to as a modulation resource block. In a modulation process, to-be-modulated bits are modulated by using a modulation resource block as a unit. For example, a modulation resource block corresponding to the constellation point shown in FIG. 2 includes four resource units. For ease of description, the following may describe the embodiments of this application by using to-be-modulated bits (for example, first to-be-modulated bits) carried on any modulation resource block as an example.

Figure 3:
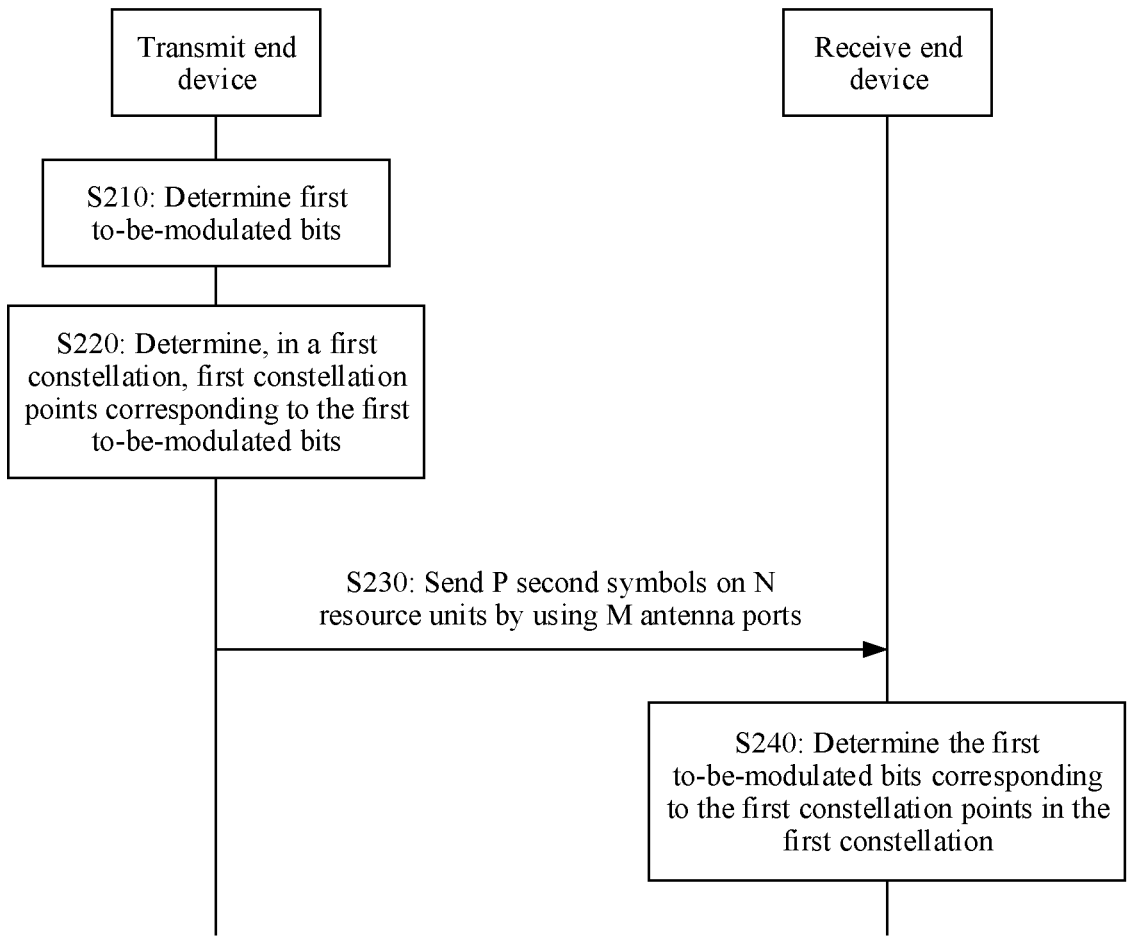
FIG. 3 is a schematic interaction diagram of a data transmission method according to an embodiment of this application.

FIG. 3 is a schematic interaction diagram of a data transmission method 200 according to an embodiment of this application.

S210: A transmit end device determines first to-be-modulated bits.

The first to-be-modulated bits represent input bits in a modulation process.

Optionally, a to-be-transmitted bit stream includes the first to-be-modulated bits, or at least some bits in the to-be-transmitted bit stream are used to determine the first to-be-modulated bits.

In a possible design, the first to-be-modulated bits may be some bits in the to-be-transmitted bit stream, or may be all bits in the to-be-transmitted bit stream.

Specifically, a quantity of resource units corresponding to one constellation point may be limited. However, during actual transmission, a quantity of resource units included in a time-frequency resource used to transmit the to-be-transmitted bit stream may be greater than the quantity of resource units corresponding to one constellation point. In this case, the resource units included in the time-frequency resource used to transmit the to-be-transmitted bit stream may be divided into a plurality of groups, to obtain a plurality of modulation resource blocks. The time-frequency resource used to transmit the to-be-transmitted bit stream may be preconfigured, or may be scheduled by a network device for a terminal device, for example, may be sent to the terminal device by using DCI. This is not limited in the embodiments of this application.

In a possible design, the to-be-transmitted bit stream may be divided into a plurality of groups, where a group of bits includes u bits, the plurality of groups of bits are in a one-to-one correspondence with a plurality of modulation resource blocks of a same quantity, and each modulation resource block carries a corresponding group of bits. Any group of bits may be used as the first to-be-modulated bits, and the first to-be-modulated bits are some bits in the to-be-transmitted bit stream.

In another possible design, the to-be-transmitted bit stream may not need to be grouped, and the to-be-transmitted bit stream may be used as the first to-be-modulated bits, where the first to-be-modulated bits are all bits in the to-be-transmitted bit stream. The transmit end device may send the first to-be-modulated bits by using one modulation resource block. Optionally, when there are a plurality of modulation resource blocks, the transmit end device may repeatedly transmit the to-be-transmitted bit stream, where a quantity of repeated transmissions is a quantity of the modulation resource blocks, one modulation resource block is used for each transmission, and different modulation resource blocks are used for any two transmissions. In each transmission, the to-be-transmitted bit stream is modulated, and modulated symbols are mapped to a corresponding modulation resource block.

If the quantity of resource units included in the time-frequency resource used to transmit the to-be-transmitted bit stream is the quantity of resource units corresponding to one constellation point, the to-be-transmitted bit stream may not need to be grouped, and the to-be-transmitted bit stream is used as to-be-modulated bits carried on one modulation resource block.

Herein, the to-be-transmitted bit stream is the first to-be-modulated bits, and the first to-be-modulated bits are all bits in the to-be-transmitted bit stream.

In a possible design, the first to-be-modulated bits may be bits obtained after the transmit end device processes at least some bits in the to-be-transmitted bit stream. The at least some bits may be some bits in the to-be-transmitted bit stream, or may be all bits in the to-be-transmitted bit stream. As an example instead of a limitation, the transmit end device may perform channel coding and/or scrambling on the at least some bits. Correspondingly, the first to-be-modulated bits are bits obtained after channel coding and/or scrambling are/is performed on the at least some bits. The transmit end device may further perform other processing on the at least some bits, for example, one or more of the following processing: code block segmentation, CRC addition, rate matching, and code block concatenation. This is not limited in this embodiment of this application.

For example, in a case in which the transmit end device performs channel coding on the at least some bits, the first to-be-modulated bits may be determined in two manners. A main difference between the two manners is as follows: In one manner, after channel coding is performed on the to-be-transmitted bit stream, a bit stream obtained based on the channel coding is grouped or not grouped, to determine the first to-be-modulated bits. In the other manner, channel coding is performed on grouped or ungrouped bits in the to-be-transmitted bit stream to obtain new bits, to determine the first to-be-modulated bits. When the first to-be-modulated bits are determined based on the former manner, the at least some bits in the to-be-transmitted bit stream in this design are all bits in the to-be-transmitted bit stream. When the first to-be-modulated bits are determined based on the latter manner, if the to-be-transmitted bit stream is grouped, the at least some bits in the to-be-transmitted bit stream in this design are some bits in the to-be-transmitted bit stream; if the to-be-transmitted bit stream is not grouped, the at least some bits in the to-be-transmitted bit stream in this design are all bits in the to-be-transmitted bit stream.

For another example, in a case in which the transmit end device performs channel coding and scrambling on the at least some bits, the first to-be-modulated bits may alternatively be determined in two manners. A main difference between the two manners is as follows: In one manner, after channel coding and scrambling are performed on the to-be-transmitted bit stream, an obtained new bit stream is grouped or not grouped, to determine the first to-be-modulated bits. In the other manner, channel coding and scrambling are performed on grouped or ungrouped bits in the to-be-transmitted bit stream to obtain new bits, to determine the first to-be-modulated bits. When the first to-be-modulated bits are determined based on the former manner, the at least some bits in the to-be-transmitted bit stream in this design are all bits in the to-be-transmitted bit stream. When the first to-be-modulated bits are determined based on the latter manner, if the to-be-transmitted bit stream is grouped, the at least some bits in the to-be-transmitted bit stream in this design are some bits in the to-be-transmitted bit stream; if the to-be-transmitted bit stream is not grouped, the at least some bits in the to-be-transmitted bit stream in this design are all bits in the to-be-transmitted bit stream.

For specific descriptions of determining the first to-be-modulated bits, refer to related descriptions of the first to-be-modulated bits in the embodiments described below in various cases.

For brevity, details are not described again.

S220: The transmit end device determines, in a first constellation, a first constellation point corresponding to the first to-be-modulated bits, where the first constellation point corresponds to P first symbols, P=M*N, M is a positive integer, and N is an integer greater than 1.

S230: The transmit end device sends P second symbols on N resource units by using M antenna ports, where the P second symbols are the P first symbols, or the P second symbols are symbols determined based on the P first symbols.

Different from coherent transmission, in this method, the transmit end device does not need to send a reference signal to a receive end device. In other words, in this method, the P second symbols do not need to be transmitted based on a reference signal.

As described above, in non-coherent transmission in this embodiment of this application, a constellation is related to a bit quantity of to-be-modulated bits, and constellation points in a constellation are constellation points for at least one antenna port and a plurality of resource units. The first to-be-modulated bits and the corresponding first constellation are used as an example. A bit quantity of the first to-be-modulated bits is a first bit quantity u, a quantity of antenna ports used to transmit the first to-be-modulated bits is M, and in a resource mapping process, a quantity of resource units carrying the first to-be-modulated bits is N, that is, the N resource units are resource units included in one modulation resource block. Correspondingly, the first constellation includes $2^u$ constellation points, each constellation point corresponds to P symbols, and P=M*N.

In addition, each constellation point corresponds to one value (bit value for short) of the to-be-modulated bits. In this way, the transmit end device may determine, in a plurality of constellation points in the first constellation and based on a bit value (denoted as a first bit value) of the first to-be-modulated bits, a first constellation point corresponding to the first bit value. Therefore, the process of modulating the first to-be-modulated bits is implemented, to obtain P symbols corresponding to the first constellation point. The P symbols may be referred to as the P first symbols. Herein, the modulation process may be considered as modulation mapping from bit values to modulation symbol groups. When a plurality groups of first to-be-modulated bits may be determined based on the to-be-transmitted bit stream, the foregoing modulation method may be used for the plurality of first to-be-modulated bits, to modulate the to-be-transmitted bit stream.

In a possible design, the transmit end device may map the P first symbols to the N resource units of each of the M antenna ports, and send the P first symbols by using the M antenna ports, where N first symbols in the P first symbols are mapped to the N resource units of each antenna port. Alternatively, in another possible design, the transmit end device performs further processing on the P first symbols (for example, scrambling processing on the P first symbols) to obtain the P second symbols, maps the P second symbols to the N resource units of each of the M antenna ports, and sends the P second symbols by using the M antenna ports, where N second symbols in the P second symbols are mapped to the N resource units of each antenna port.

Optionally, in a constellation design, to ensure a low peak to average power ratio (PAPR) in data transmission, in a possible design, amplitudes of all of the P first symbols are the same, and/or a phase difference between any two first symbols in the P first symbols is an integer multiple of S, where S=2*pi/k, k is an integer greater than 1, and pi is the ratio of circumference to diameter, and may also be represented as π. For example, k is 4.

That a phase difference between two first symbols is an integer multiple of S may be understood as that the phase difference between the two first symbols is 0, 1, 2, . . . , or k times of S. That the phase difference between the two first symbols is 0 times of S may be understood as that the phase difference between the two first symbols is 0. That the phase difference between the two first symbols is 0 may also be understood as that the phase difference between the two first symbols is k times of S. When the phase difference between the two first symbols is greater than or equal to 2*pi, or when the phase difference is less than 0, the phase difference between the two first symbols is a result of the phase difference modulo 2*pi.

In a possible design, each first symbol in the P first symbols is a quadrature phase shift keying (QPSK) symbol or a binary phase shift keying (BPSK) symbol. For example, when each first symbol in the P first symbols is a QPSK symbol, that is, a value of any one of the P first symbols may be a complex number $e^{j\pi/4}$, $e^{j3\pi/4}$, $e^{j5\pi/4}$, or $e^{j7\pi/4}$, values of different symbols in the P first symbols may be the same or different. This is not limited in this embodiment of this application. When each first symbol in the P first symbols is a BPSK symbol, that is, a value of any one of the P first symbols may be a complex number $e^{j2\pi}$ or $e^{j\pi}$, values of different symbols in the P first symbols may be the same or different. This is not limited in this embodiment of this application, j represents an imaginary unit, and the square of j is equal to −1.

A phase difference between any two first symbols in the P first symbols is an integer multiple of S. For different groups of two first symbols, integer multiples may be the same value or different values. Phases of any two first symbols in the P first symbols may be the same or may be different. It is assumed that P=4. For example, a phase difference between two first symbols may be one time of S, and a phase difference between another two first symbols may be two times of S. For another example, a phase difference between two first symbols may be one time of S, and a phase difference between another two first symbols is 0. When the phase difference is 0, it indicates that phases of the another two first symbols are the same. In this case, it may be considered that the phase difference between the another two first symbols is k times of S.

During specific implementation, for example, each first symbol in the P first symbols may be selected from specific k candidate symbols, a minimum phase difference between the k candidate symbols is S=2*pi/k, and each candidate symbol in the k candidate symbols may be a QPSK symbol. Assuming that k=4, the four candidate symbols may be [1, −1, j, −j], or may be [√1+j, √1−j, √−1+1, √−1−j]. When P=8, each first symbol in the eight first symbols may be any one of four candidate symbols, and any two first symbols in the eight first symbols may be a same candidate symbol, or may be different candidate symbols. For example, if the four candidate symbols are [1, −1, j, −j], the eight first symbols may be [1, 1, 1, −1, −1, j, j, −j], j represents an imaginary unit, and the square of j is equal to −1.

Matrices corresponding to any two constellation points in the plurality of constellation points in the first constellation may be different. Specifically, elements in the matrices corresponding to the two constellation points are not completely different. In other words, the elements in the two matrices may be completely different or partially the same. However, the any two matrices have at least one different element. Optionally, a matrix corresponding to one constellation point in the first constellation and a matrix corresponding to each of the other constellation points in the first constellation do not have a linear relationship.

S240: The receive end device determines the first to-be-modulated bits corresponding to the first constellation point in the first constellation.

When the transmit end device sends the P first symbols or the P second symbols to the receive end device on a channel, the sent symbols may have amplitude and/or phase distortion on the channel due to various reasons such as fading, noise, or a Doppler shift. For simplification of description, the receive end device also records the deformed symbols as the P first symbols or the P second symbols.

When the transmit end device sends the P first symbols, that is, the P second symbols sent by the transmit end device are the P first symbols, the receive end device demodulates the P first symbols to obtain the first to-be-modulated bits. When the transmit end device further processes the P first symbols, and sends the processed P second symbols, the receive end device may obtain the P first symbols based on the P second symbols, and demodulate the P first symbols to obtain the first to-be-modulated bits. Certainly, if the first to-be-modulated bits are bits obtained after the transmit end device performs channel coding and/or scrambling processing on bits in the to-be-transmitted bit stream, the receive end device may further decode and/or descramble the first to-be-modulated bits, to obtain bits on which channel coding and/or scrambling are not performed. For specific descriptions, refer to related descriptions in the following embodiments. On the receive end device side, the first to-be-modulated bits are demodulation output bits of the receive end device. For ease of corresponding understanding of an interaction procedure between the transmit end device and the receive end device, the first to-be-modulated bits are referred to as the first to-be-modulated bits from a perspective of the receive end device.

As an example instead of a limitation, a manner of demodulating data by the receive end device is briefly described by using a generalized likelihood ratio test (GLRT) receiver as an example. It should be understood that the receive end device may alternatively demodulate the data in another manner. This is not limited herein.

For ease of description, a matrix corresponding to an $i^{th}$ constellation point in the first constellation is denoted as $X_i$, where a value range of i is [1, $2^u$], $2^u$ is a quantity of constellation points included in the first constellation, and u is a bit quantity of to-be-modulated bits carried on a resource unit corresponding to each constellation point. The receive end device may calculate, according to the following formula, a distance $d_i$ between a matrix corresponding to the P first symbols and a matrix corresponding to the $i^{th}$ constellation point.

$$d_i = \sqrt{M - \text{trace}(X_i \times Y^H \times Y \times X_i^H)}$$

For the P first symbols, signals received by the receive end device are represented as Y=H*X+W, where the matrix H is a matrix of S*M dimensions and represents channel state information (CSI) of a channel used to transmit the P first symbols, the matrix W is a matrix of S*N dimensions and represents noise on the channel, X represents the P first symbols, X is an M*N matrix, M is the quantity of antenna ports used to transmit the first to-be-modulated bits, N is the quantity of resource units used to transmit the first to-be-modulated bits, trace represents a trace of the matrix $X_i \times Y^H \times Y \times X_i^H$. $Y^H$ represents a conjugate transpose of the matrix Y, $X_i^H$ represents a conjugate transpose of $X_i$, and S is a positive integer.

Based on the foregoing formula, a distance between the matrix corresponding to the P first symbols and a matrix corresponding to each of the $2^u$ constellation points is calculated by setting i to 1 to $2^u$, to obtain $2^u$ $d_i$. P symbols in a matrix $X_i$ corresponding to a minimum distance $d_i$ are considered as the P first symbols detected by the receive end device. In this way, the receive end device may determine, based on a correspondence between a constellation point corresponding to the detected P first symbols and a bit value, that a bit value corresponding to the matrix $X_i$ is data obtained after the P first symbols are demodulated.

For example, the bit quantity of the first to-be-modulated bits is u=2, M=1, N=4, S=1, W=[w1, w2, w3, w4], and is a 1*4 vector, H is a scalar, and the first constellation includes four constellation points. Matrices corresponding to the four constellation points are:

$X_1$=[1, 1, 1, 1], corresponding to a bit value 00;
$X_2$=[1, 1, −1, −1], corresponding to a bit value 01;
$X_3$=[1, −1, 1, −1], corresponding to a bit value 10; and
$X_4$=[1, −1, −1, 1], corresponding to a bit value 11.

It is assumed that the first to-be-modulated bits sent by the transmit end device is 01, and i=2, corresponding to the transmit matrix $X_2$, after a channel H is passed, symbols received by the receive end device are Y=[H+$w_1$, H+$w_2$, −H+$w_3$, −H+$w_4$]. After receiving Y, the receive end device sets i to 1 to 4 (to be specific, starting from 1, i is set to 1 to 4, that is, i is equal to 1, 2, 3, and 4). The foregoing four matrices are separately substituted into the formula $d_i = \sqrt{M - trace(X_i \times Y^H \times Y \times X_i^H)}$, to obtain four $d_i$ values corresponding to the four $X_i$. For example, $d_1$=0.6 (corresponding to the matrix $X_1$), $d_2$=0.1 (corresponding to the matrix $X_2$), $d_3$=0.5 (corresponding to the matrix $X_3$), and $d_4$=0.9 (corresponding to the matrix $X_4$), where $d_2$ is the smallest. The receive end device may determine that the received P first symbols are symbols in the matrix $X_2$. Therefore, the receive end device obtains the bit value 01 based on the mapping relationship between the matrix $X_2$ and the bit value, to demodulate the first to-be-modulated bits.

$d_i$ may represent a magnitude of a gap between subspaces generated by row vectors of two matrices to some extent, and the two matrices represent the matrix (for example, the matrix Y) corresponding to the P first symbols received by the receive end device and the matrix (for example, $X_i$) corresponding to the $i^{th}$ constellation point in the first constellation. A larger value of $d_i$ indicates a larger subspace gap, a smaller value of $d_i$ indicates closer subspaces, and $d_i$=0 indicates that two subspaces are the same. Therefore, a symbol in a matrix corresponding to $d_i$ indicating a smallest distance is used as a received symbol.

According to the foregoing described receiving method, different from the coherent transmission method, in the method provided in this embodiment of this application, the transmit end device does not need to send the reference signal to the receive end device, and the receive end device does not need to receive the P second symbols based on the reference signal. The reference signal may be referred to as a reference signal, a pilot, or a demodulation reference signal of the P second symbols. When the P second symbols are carried on a physical channel for transmission, the reference signal may also be referred to as a reference signal, a pilot, or a demodulation reference signal of the physical channel.

It can be learned from the foregoing descriptions that, in non-coherent transmission, design of a constellation is critical. The following describes a relationship between non-coherent transmission and a constellation.

In conventional coherent transmission, one constellation point corresponds to one symbol, and to-be-modulated bits are carried by using one symbol. In non-coherent transmission, the to-be-modulated bits are carried in a direction of the matrix X itself, or when the matrix X is represented as an M*N matrix, it may be understood as that the space generated by using the row vector of the matrix X carries the to-be-modulated bits. That is, spaces generated by using row vectors of matrices corresponding to different constellation points in a constellation are different. Therefore, spaces corresponding to different to-be-modulated bits are also different. It is assumed that all matrices corresponding to constellation points in a constellation are normalized, that is, trace($X_i \times X_i^H$)=1, where the matrix $X_i$ represents a modulation symbol matrix corresponding to the $i^{th}$ constellation point in the first constellation. Any two constellation points in the first constellation are used as an example, and matrices corresponding to the two constellation points are $X_1$ and $X_2$. In this case, an M*M-dimensional square matrix I that enables $X_1$=I*$X_2$ does not exist. The reason is that left multiplying $X_2$ by the matrix I may be understood as performing linear transformation on $X_2$. When such I exists, $X_2$ may be transformed into $X_1$ through linear transformation. In this case, spaces generated by row vectors of $X_1$ and $X_2$ are the same. Therefore, in non-coherent transmission, there is no such I.

It is precisely this constellation design that satisfies a characteristic that in non-coherent transmission, the transmit end device does not need to send a reference signal and the receive end device does not need to demodulate data based on a reference signal. Specifically, assuming that channels corresponding to the N resource units are approximately the same, when P symbols in the matrix X corresponding to the constellation point are transmitted on the channel, for the receive end device, a received symbol may be denoted as Y=H*X+W, where H is an S*M-dimensional matrix and represents channel state information (CSI) of the channel, W is an S*N-dimensional matrix and represents noise, and S is a positive integer. It can be learned that multiplying H by X is a linear transformation performed on X. Because linear transformation performed on a matrix does not change a space generated by row vectors, a space generated by row vectors of H*X and a space generated by row vectors of X may be considered the same, that is, it may be understood as that a channel state indicated by H*X is the same as a channel state indicated by X. Therefore, the receive end device can obtain the space generated by the row vector of X, with no need to know the channel state information (that is, H), to obtain to-be-modulated bits based on X.

Therefore, according to the data transmission method provided in this embodiment of this application, the transmit end device modulates the first to-be-modulated bits on the first constellation point in the constellation, where the first constellation point corresponds to the M*N matrix X, the matrix X includes the P first symbols, and P=M*N; maps the P first symbols or the P second symbols obtained based on the P first symbols to the N resource units; and sends the P first symbols or the P second symbols to the receive end device by using the M antenna ports. The receive end device denotes the received symbol as Y=H*X+W, where H represents the channel state information, and multiplying H by X is performing linear transformation on X. Because performing linear transformation on a matrix does not change a space generated by row vectors, the space generated by the row vectors of H*X is the same as the space generated by the row vectors of X. In the method, the first constellation point is an M*N matrix X, and the first to-be-modulated bits are carried in a direction of the matrix X, or the first to-be-modulated bits are carried in the space generated by the row vectors of the matrix X. In this way, the receive end device can obtain the space generated by the row vectors of the matrix X, with no need to know the channel state information (that is, H), so that the receive end device can obtain the first to-be-modulated bits through demodulation based on the matrix X. Therefore, in the method, data (for example, the first to-be-modulated bits) can be transmitted with no need to transmit a reference signal. In this way, on the one hand, compared with a manner of transmitting data on only some scheduled resource units (resource units used to carry data, or resource units in scheduled resource units except resource units used to transmit a reference signal) in coherent transmission, this method can jointly design scheduled resource units, and implement an optimization dimension. For example, during optimization, throughput performance of fading channels can be improved to resist channel fading. On the other hand, because no reference signal needs to be transmitted, resource overheads can be reduced, which improves resource utilization. Therefore, throughput performance of data transmission is effectively improved, and data transmission performance is improved.

In S220 and S240, both the receive end device and the transmit end device need to know the first constellation. The following describes manners in which the transmit end device and the receive end device determine the first constellation.

Manner 1

Manner 1-1: The first constellation is determined based on at least one of M and N.

This manner is applicable to the transmit end device and the receive end device that perform uplink transmission and downlink transmission.

Optionally, the first constellation is determined based on at least one of M and N, where each constellation point in the first constellation corresponds to P symbols. At least one of M and N may be M, N, or M and N.

During specific implementation, if a quantity of antenna ports supported by the communication protocol or the system is a fixed value, for example, M=1, M does not need to be determined, and the corresponding first constellation may be determined based on N. If a quantity of resource units that correspond to a constellation and that are supported by the communication protocol or the system is a fixed value, similarly, N does not need to be determined, and the corresponding first constellation may be determined based on M. If the communication protocol or the system may support variable quantities of antenna ports and resource units, the corresponding first constellation may be determined based on M and N.

M may be configured by the network device. When the terminal device is used as the transmit end device or the receive end device, the network device may indicate M to the terminal device by using signaling, so that the terminal device determines M. The transmit end device or the receive end device herein is from a perspective of the to-be-modulated bits. From a perspective of M, the network device is the transmit end device, and the terminal device is the receive end device. For a manner of determining N, refer to the following related descriptions of a manner of determining resource units occupied by one modulation resource block.

For example, when the first constellation is determined based on at least one of M and N, there may be a plurality of candidate constellations, and any candidate constellation has corresponding $M_i$ and $N_i$, where $M_i$ is M corresponding to an $i^{th}$ constellation in the plurality of candidate constellations, $N_i$ is N corresponding to the $i^{th}$ constellation in the plurality of candidate constellations, and i is an integer greater than 1 and less than a quantity of the candidate constellations. For example, a constellation point in the $i^{th}$ constellation in the plurality of candidate constellations is an $M_i*N_i$-dimensional matrix. After determining M and N, that is, M and N are given, the terminal device may select a constellation corresponding to M and N from the plurality of candidate constellations. The first constellation is determined based on the selected constellation, and $M_i$ and $N_i$ corresponding to the selected constellation are equal to given M and N, respectively.

Optionally, when the first constellation is determined based on the selected constellation, if the selected constellation includes $2^u$ constellation points, the selected constellation may be used as the first constellation.

Optionally, when the first constellation is determined based on the selected constellation, if the selected constellation includes more than $2^u$ constellation points, the selected constellation may be further considered, based on a manner 1-2, as a general constellation in the following manner 1-2, and the first constellation is determined according to the method described in the manner 1-2. The method may be described as determining the first constellation based on u and at least one of M and N.

For another example, when all constellation points in a constellation supported in the system are M*N-dimensional matrices, it may be considered that the first constellation does not need to be determined based on at least one of M and N, and the first constellation may need to be determined based only on the constellation supported in the system.

Optionally, the constellation supported in the system is a plurality of candidate constellations, an $i^{th}$ candidate constellation includes $2^{ui}$ constellation points, and i is an integer greater than 1 and less than a quantity of candidate constellations. A constellation corresponding to u may be selected from the plurality of candidate constellations, the first constellation is the selected constellation, and the selected constellation includes $2^u$ constellation points. The plurality of candidate constellations may be a plurality of independent constellations, or may be a plurality of sub-constellations described in the following manner 1-2. This is not limited in this embodiment of this application.

Optionally, if the constellation supported in the system is the general constellation in the following manner 1-2, the first constellation may be determined according to the method described in the manner 1-2.

Manner 1-2: The first constellation is determined based on u.

In this embodiment of this application, the first constellation may be an independent constellation, or may be a sub-constellation of a general constellation, or may be a general constellation including a plurality of sub-constellations. If the first constellation is related to the general constellation, for ease of describing a process of determining the first constellation, the related general constellation is first described, and then a relationship between the first constellation and the general constellation is described.

Figure 4:
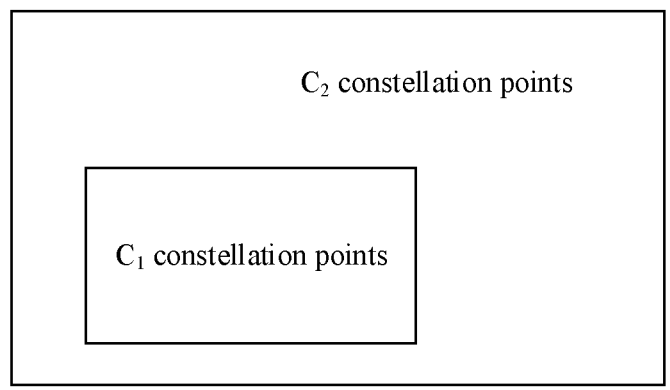
FIG. 4 is another schematic diagram of constellation points according to an embodiment of this application.

In a constellation design, a general constellation may be designed, and the general constellation may include sub-constellations corresponding to a plurality of bit quantities. Refer to FIG. 4. For example, a general constellation includes $C_2$ constellation points, a sub-constellation includes $C_1$ constellation points, where $C_2>C_1$. $C_2=2^{p_2}$, $C_1=2^{p_1}$, $p_2>p_1$, $p_1$ is an integer, and $p_2$ is a positive integer. The general constellation may be used to determine the sub-constellations corresponding to the plurality of bit quantities, $p_2$ may be understood as a maximum bit quantity in the plurality of bit quantities, and a sub-constellation corresponding to each bit quantity includes some or all constellation points in the general constellation. The some or all constellation points form a sub-constellation. For example, assuming that $p_2=2$, the general constellation includes four constellation points, and the constellation points are (1, 1), (1, j), (1, −1), and (1, −j). If $p_1=1$, a corresponding sub-constellation includes two constellation points, and the constellation points in the sub-constellation may be any two of the foregoing four constellation points or may be two predefined constellation points. For example, the constellation points in the sub-constellation are (1, 1) and (1, j). j is an imaginary unit, and the square of j is equal to −1. It can be learned that the general constellation may be used to determine sub-constellations corresponding to two bit quantities (1 and 2), and 2 is a maximum bit quantity in the two bit quantities.

In addition, a plurality of constellation points in the general constellation may correspond to a same quantity of antenna ports and a same quantity of resource units, or a plurality of sub-constellations in the general constellation may correspond to a same quantity of antenna ports and a same quantity of resource units. Still using $p_2=2$ and $p_1=1$ as an example, the four constellation points each correspond to $M_1$ antenna ports and $N_1$ resource units, where $M_1$ is a positive integer, and $N_1$ is an integer greater than 1. A sub-constellation formed by two constellation points corresponding to $p_1=1$ also corresponds to $M_1$ antenna ports and $N_1$ resource units.

In this way, the transmit end device and the receive end device may obtain sub-constellations of different sizes by storing only one general constellation, thereby reducing storage space.

Based on this, in this embodiment of this application, the first constellation may be determined based on u.

In a first possible design, a constellation point in the first constellation belongs to a third constellation, the first constellation includes $L_1$ constellation points, and the third constellation includes $L_2$ constellation points, where $L_2 \geq L_1$, and $L_1$ and $L_2$ are integers greater than 0. $L_2=2^v$, where v is greater than or equal to u, and v is an integer greater than or equal to 1.

The third constellation may be the foregoing general constellation, the first constellation may be the foregoing sub-constellation or the foregoing general constellation, $L_2$ is analogous to $C_2$, $p_2$ is analogous to v, $L_1$ is analogous to $C_1$ or $C_2$, and $p_1$ is analogous to u.

Therefore, the transmit end device or the receive end device may determine the first constellation in the third constellation based on u.

In a second possible design, based on the design of the general constellation, u may be obtained in the following manner, and the corresponding first constellation is determined based on obtained u. Herein, the first constellation may be the foregoing general constellation, $p_2$ is analogous to u, and $p_1$ is analogous to v.

For example, the transmit end device may use the at least some bits in the to-be-transmitted bit stream as the first to-be-modulated bits, or may process (for example, perform channel coding and/or scrambling on) the at least some bits in the to-be-transmitted bit stream to obtain the first to-be-modulated bits. For ease of distinguishing from subsequent to-be-modulated bits, the first to-be-modulated bits herein are denoted as old first to-be-modulated bits. After obtaining the old first to-be-modulated bits, the transmit end device may add u-v bits to the old first to-be-modulated bits, to obtain new first to-be-modulated bits. A bit quantity of the old first to-be-modulated bits is v, a bit quantity of the new first to-be-modulated bits is u, and u is greater than or equal to v. A bit value of the u-v bits may be preconfigured. For example, u-v bits 0 or 1 may be added before the old first to-be-modulated bits, or u-v bits 0 or 1 may be added after the old first to-be-modulated bits. Alternatively, u-v bits may be added for the old first to-be-modulated bits according to another predefined rule. The u-v bits 0 may be described as u-v bits whose values are 0, and the u-v bits 1 may be described as u-v bits whose values are 1.

Herein, both the old first to-be-modulated bits and the new first to-be-modulated bits may be considered as the first to-be-modulated bits in this embodiment of this application. When a constellation is determined by using the second possible design in the manner 1-2, the new first to-be-modulated bits are modulated. For a manner of determining the bit quantity v of the old first to-be-modulated bits, refer to the descriptions of the manner of determining u in the process of determining the first to-be-modulated bits in the following embodiments, provided that u is replaced with v below. When a constellation is not determined by using the second possible design in the manner 1-2, the old first to-be-modulated bits are modulated.

With regard to the second possible design, the receive end device may determine, according to a predefined rule, that the general constellation is the first constellation, and may determine that a maximum bit quantity in a plurality of bit quantities corresponding to the general constellation is u, so that the receive end device may remove the u-v bits 0 or 1 from the new first to-be-modulated bits based on determined v according to a predefined rule, to obtain the old first to-be-modulated bits.

For example, u=4, v=2, u−v=2, and the old first to-be-modulated bits are 00. The transmit end device adds two bits 1 before the old first to-be-modulated bits, to obtain new first to-be-modulated bits 1100. After obtaining the new first to-be-modulated bits "1100" through demodulation, the receive end device removes the first two bits 1 from 1100 according to a predefined rule, to obtain the old first to-be-modulated bits "00".

Manner 2: The first constellation is indicated by using signaling.

This manner is applicable to the terminal device that performs uplink transmission or downlink transmission. For a manner in which the network device determines the first constellation, refer to the manner 1-1, the manner 1-2, or another method. The terminal device may determine the first constellation in the following manners.

In a possible design, the network device sends first indication information to the terminal device, where the first indication information is used to indicate the first constellation.

As an example instead of a limitation, the first indication information may be a matrix value corresponding to the first constellation.

As an example instead of a limitation, the first indication information may be an index corresponding to the first constellation, and both the terminal device and the network device know at least one constellation and an index corresponding to each constellation. Different constellations in the at least one constellation may correspond to a same quantity of antenna ports or different quantities of antenna ports. In this way, the terminal device may determine the first constellation in the at least one constellation based on the index corresponding to the first constellation. The at least one may be one, two, three, or more. This is not limited in this embodiment of this application. The at least one constellation may also be referred to as a candidate constellation, a candidate constellation set, or another name. This is not limited in this embodiment of this application.

Table 1 shows a correspondence between at least one constellation and an index. It is assumed that the at least one constellation includes four constellations, and indexes of the four constellations are 0 to 3. The first indication information may include two bits, the two bits are used to indicate the index of the first constellation, and a value of the two bits may be 00, 01, 10, or 11. For example, if the first constellation is a constellation A, the value of the two bits in the first indication information may be 00, that is, an index 0 is used to indicate the constellation A. The four constellations may correspond to a same quantity of antenna ports. For example, all of the four constellations correspond to two antenna ports. The four constellations may alternatively correspond to a plurality of quantities of antenna ports. For example, a constellation A and a constellation B correspond to two antenna ports, and a constellation C and a constellation D correspond to four antenna ports.

It should be understood that the relationship between the constellation and the index shown in Table 1 is merely an example for description, and there may be another form of correspondence. This is not limited in this embodiment of this application.

TABLE 1

| Index | Constellation |
| --- | --- |
| 0 (Value of the two bits of the first indication information: 00) | Constellation A |
| 1 (Value of the two bits of the first indication information: 01) | Constellation B |
| 2 (Value of the two bits of the first indication information: 10) | Constellation C |
| 3 (Value of the two bits of the first indication information: 11) | Constellation D |

As an example instead of a limitation, the first indication information may be indication information obtained after information indicating the index of the first constellation and other information are jointly coded, that is, the first indication information is used to indicate the index of the first constellation and the other information. For example, the other information may be indication information of a modulation and coding scheme (MCS), and the MCS may indicate one or more of the following content: a modulation scheme, a bit rate of channel coding, and spectral efficiency. In this way, the first indication information may be indication information obtained after the MCS and the index of the first constellation are jointly coded, or the first indication information may be indication information obtained after the index of the first constellation and at least one of the code rate of channel coding and the spectral efficiency are jointly coded.

In a possible design, the network device sends second indication information and third indication information to the terminal device, where the second indication information is used to indicate the quantity M of antenna ports, and the third indication information is used to indicate the first constellation corresponding to M.

As an example instead of a limitation, the third indication information may be used to indicate the index of the first constellation. However, because there is a correspondence between M and a constellation, M may correspond to at least one constellation. Therefore, the index of the first constellation is an index falling in an index range of the at least one constellation corresponding to M. For each M, the terminal device and the network device know at least one constellation corresponding to each M and an index corresponding to each constellation. In this way, the terminal device may determine the first constellation based on the index. One M may be understood as one quantity of antenna ports.

Table 2a and Table 2b both show a correspondence between at least one constellation and an index, and a difference lies in that quantities of antenna ports corresponding to constellations in Table 2a and Table 2b are different. It is assumed that a constellation in Table 2a corresponds to two antenna ports, and a constellation in Table 2b corresponds to four antenna ports. Constellations corresponding to the two antenna ports in Table 2a are represented by using indexes 0 and 1, and a configured first constellation may be indicated in Table 2a by using 1-bit information. Constellations corresponding to the four antenna ports in Table 2b are represented by using indexes 0 and 1, and a configured first constellation may be indicated in Table 2b by using 1-bit information. If the first constellation is a constellation A, the second indication information may indicate that M=2, and a value of the third indication information is 0, that is, the index 0 is used to indicate the constellation A. It can be learned that, compared with the relationship between the constellation and the index shown in Table 1, the relationship between the constellation and the index shown in Table 2a and Table 2b can effectively reduce a quantity of bits occupied by an index, to reduce signaling overheads.

It should be understood that the relationship between the at least one constellation and the index shown in each of Table 2a and Table 2b is merely an example for description, and there may alternatively be a correspondence in another form. This is not limited in this embodiment of this application.

TABLE 2a

| (M = 2) | |
| --- | --- |
| Index | Constellation |
| 0 | Constellation A |
| 1 | Constellation B |

TABLE 2b

| (M = 4) | |
| --- | --- |
| Index | Constellation |
| 0 | Constellation C |
| 1 | Constellation D |

Optionally, the network device may send the second indication information and the third indication information to the terminal device by jointly coding the second indication information and the third indication information. Alternatively, the network device may indicate, to the terminal device by using one piece of fourth indication information, the quantity M of antenna ports and the first constellation corresponding to M. For example, Table 3 shows a possible value of the fourth indication information, and the quantity M of antenna ports and the first constellation corresponding to M that are indicated by the fourth indication information.

TABLE 3

| Index | Quantity M of antenna ports | Constellation |
| --- | --- | --- |
| 0 (Value of the fourth indication information: 00) | 2 | Constellation A |
| 1 (Value of the fourth indication information: 01) | | Constellation B |
| 0 (Value of the fourth indication information: 10) | 4 | Constellation C |
| 1 (Value of the fourth indication information: 11) | | Constellation D |

It should be noted that when M corresponds to one constellation, the third indication information may not be required.

In this indication manner, when M may correspond to a plurality of constellations, the first constellation is indicated in a range of the plurality of constellations corresponding to M, so that signaling overheads can be effectively reduced. For example, when M corresponds to four constellations, only two bits may be used to indicate the first constellation.

The foregoing describes in detail the manner in which the transmit end device or the receive end device determines the first constellation. The following describes in detail, based on actual considerations, a manner in which the transmit end device or the receive end device determines the N resource units used to carry the first to-be-modulated bits.

As described above, during actual transmission, the resource units included in the time-frequency resource used to transmit the to-be-transmitted bit stream may need to be divided into the plurality of groups, to obtain the plurality of modulation resource blocks. During processing in the to-be-transmitted bit stream, to-be-modulated bits corresponding to each modulation resource block may be separately modulated.

Based on the foregoing considerations, as an example instead of a limitation, for the to-be-transmitted bit stream, the embodiments of this application provide two manners (namely, a manner A and a manner B) to be used by the transmit end device or the receive end device to determine the resource units occupied by one modulation resource block. It should be understood that resource units that are included in one modulation resource block and that are determined below may be the N resource units that carry the first to-be-modulated bits. The resource units occupied by one modulation resource block may be further described as resource units included in one modulation resource block.

Manner A

The resource units occupied by one modulation resource block are determined based on the time-frequency resource used to transmit the to-be-transmitted bit stream.

The time-frequency resource may indicate a quantity of resource units and a time-frequency domain position.

As described above, the time-frequency resource used to transmit the to-be-transmitted bit stream may be preconfigured, or may be scheduled by the network device for the terminal device, for example, may be sent to the terminal device by using DCI, a system message, RRC signaling, a media access control control element (MAC CE), or a broadcast message. This is not limited in this embodiment of this application. When the to-be-transmitted bit stream is data carried on a data channel, the time-frequency resource may be a time-frequency resource configured for a PUSCH or a PDSCH. When the to-be-transmitted bit stream is control information, the time-frequency resource may be a time-frequency resource on a PDCCH or a PUCCH.

In this manner, for the to-be-transmitted bit stream, the system or the communication protocol may specify or default that only one modulation resource block is used to carry the to-be-transmitted bit stream or the bit stream obtained based on the to-be-transmitted bit stream, and there is no need to group the to-be-transmitted bit stream or the bit stream obtained based on the to-be-transmitted bit stream. In this case, the resource units included in the time-frequency resource used to transmit the to-be-transmitted bit stream may be used as the resource units occupied by one modulation resource block. In this case, the to-be-transmitted bit stream may be used as the first to-be-modulated bits, or the first to-be-modulated bits are a bit stream obtained after the transmit end device processes (for example, performs channel coding and/or scrambling on) the to-be-transmitted bit stream.

In this manner, the quantity of resource units included in the time-frequency resource used to transmit the to-be-transmitted bit stream is a quantity of resource units corresponding to one constellation point. In other words, the terminal device thinks that a configuration in which the quantity of resource units included in the time-frequency resource used to transmit the to-be-transmitted bit stream is not equal to the quantity of resource units corresponding to one constellation point does not exist.

In this embodiment of this application, the network device may indicate, by using signaling (for example, RRC signaling or DCI signaling) to the terminal device serving as the transmit end device or the receive end device, the time-frequency resource used to transmit the to-be-transmitted bit stream. For a method in which the network device indicates, to the terminal device by using the signaling, the time-frequency resource used to transmit the to-be-transmitted bit stream, refer to the method for allocating an RB to a PDSCH or a PUSCH by using DCI in the LTE standard 36.212, refer to the method for allocating an RB to a PDSCH or a PUSCH by using DCI in the NR standard 38.212, or refer to another resource allocation method. This is not limited in this embodiment of this application.

Manner B

The resource units occupied by one modulation resource block are determined based on the time-frequency resource used to transmit the to-be-transmitted bit stream and a first threshold.

An attribute of the time-frequency resource used to transmit the to-be-transmitted bit stream includes a quantity of the resource units included in the time-frequency resource and a time-frequency domain position of the time-frequency resource. The first threshold is a parameter used to compare with the time-frequency resource, and may be configured by the network device, or may be predefined. The first threshold is used to determine a quantity of resource units included in one modulation resource block.

Optionally, the first threshold may be a quantity of resource units, and for ease of differentiation, is represented by T, where T is a positive integer, for example, 1, 2, 4, or 8. Alternatively, the first threshold may be a quantity of time domain units (where for ease of differentiation, the quantity of time domain units is denoted as a) or a quantity of frequency domain units (where for ease of differentiation, the quantity of frequency domain units is denoted as b). A product of a and b may be used to determine the quantity of resource units included in one modulation resource block, that is, $T=a*b$. As an example instead of a limitation, some possible values of a and b are described by using an example in which the frequency domain unit is a subcarrier and the time domain unit is a time domain symbol. For example, a=12, or a is a multiple of 12; a may alternatively be 1, 2, 3, 4, or 6, all of which are divisors of 12, which facilitates scheduling. For another example, b=1, 2, 4, 7, 14, or the like. 1 indicates a single symbol, and a channel in a modulation resource block has a minimum change in time domain. 2 and 4 indicate dual symbols and four symbols, respectively, and a channel in a modulation resource block has a relatively small change in time domain. 7 and 14 indicate a half-slot (a type of micro-slot) and a slot, respectively, which facilitate scheduling, and can be used when a channel in a modulation resource block does not change much in time domain.

Optionally, the first threshold may be related to a subcarrier spacing. A case in which the subcarrier spacing is $15*2^g$ kHz is used as an example to describe a relationship between the first threshold and the subcarrier spacing, g is an integer greater than or equal to 0, for example, 0, 1, 2, 3, or 4.

In a possible design, assuming that the first threshold is T, T is inversely proportional to $2^g$, that is, each time the subcarrier spacing doubles, T decreases by half (where if T is not exactly divisible by 2, a result is obtained by rounding up T/2).

In another possible design, assuming that the first threshold is the quantity a of time domain units and the quantity b of frequency domain units, the T resource units are formed by the a time domain units and the b frequency domain units, that is, T=a*b, where b may be related to a subcarrier spacing. For example, b is inversely proportional to $2^g$, that is, when the subcarrier spacing doubles, the quantity b of frequency domain units occupied by the time-frequency resource decreases by half.

The foregoing two designs can ensure that a bandwidth of a frequency domain resource occupied by the time-frequency resource remains unchanged, so that a channel on the time-frequency resource does not change much in frequency domain.

In another possible design, a may be related to a subcarrier spacing. For example, a is directly proportional to $2^g$, that is, a doubles as the subcarrier spacing doubles. In this design, because the subcarrier spacing doubles, a time domain length of a corresponding resource unit approximately reduces by half. Therefore, doubling a can ensure that a time domain length occupied by one modulation resource block remains unchanged. In this way, it can be ensured that a channel on a time-frequency resource corresponding to the modulation resource block does not change much in time domain.

In addition, corresponding T may be further configured for each subcarrier spacing, or corresponding a and/or b may be configured for each subcarrier spacing, so that one modulation resource block has independent T or independent a and/or b in cases of different subcarrier spacings. Therefore, in a configuration manner, it can be ensured that a channel in a modulation resource block does not change much.

Optionally, a concept of a bandwidth part (BWP) is defined in a communication protocol. For example, the network device configures one or more BWPs for the terminal device in one cell, and may activate one or more of the BWPs for data transmission. One BWP corresponds to one subcarrier spacing configuration and one segment of bandwidth or one segment of frequency domain resource in a system bandwidth. Therefore, the first threshold may be configured for one BWP, that is, corresponding T is configured for one BWP, or corresponding a and/or b are/is configured for one BWP. For example, first thresholds configured for different BWPs may be the same or may be different.

In the manner B, a smaller value in the quantity of resource units in the time-frequency resource used to transmit the to-be-transmitted bit stream and the first threshold T may be used as the quantity of resource units in one modulation resource block.

When the quantity of resource units included in the time-frequency resource used to transmit the to-be-transmitted bit stream is less than T, the time-frequency resource does not need to be grouped, and the resource units included in the time-frequency resource may be used as the resource unit occupied by one modulation resource block. The modulation resource block carries the to-be-transmitted bit stream or the bit stream obtained based on the to-be-transmitted bit stream.

When the quantity of resource units included in the time-frequency resource used to transmit the to-be-transmitted bit stream is greater than T, the time-frequency resource may be grouped to obtain a plurality of resource unit groups, that is, to obtain a plurality of modulation resource blocks, and a quantity of resource units occupied by each modulation resource block may be T. When the resource units included in the time-frequency resource cannot be exactly divisible by T, a quantity of resource units occupied by one of the modulation resource blocks may be greater than or less than T.

To-be-modulated bits (for example, the first to-be-modulated bits) carried on one modulation resource block (for example, a first modulation resource block) may be some bits in the to-be-transmitted bit stream, or may be bits obtained based on the at least some bits in the to-be-transmitted bit stream. Correspondingly, the resource units occupied by one modulation resource block are some resource units in the resource units included in the time-frequency resource used to transmit the to-be-transmitted bit stream.

For example, if the time-frequency resource used to transmit the to-be-transmitted bit stream includes 10 REs, and T=5, the 10 REs may be divided into two groups to obtain two modulation resource blocks, and each modulation resource block includes five of the REs.

For another example, if the time-frequency resource used to transmit the to-be-transmitted bit stream includes 11 REs, and T=5, the 11 REs may be divided into two groups to obtain two modulation resource blocks, where one modulation resource block includes five REs, and the other modulation resource block includes six REs. Alternatively, the 11 REs may be grouped into three groups to obtain three modulation resource blocks, where each of two modulation resource blocks includes five REs, and the other modulation resource block includes one RE.

Figure 5:
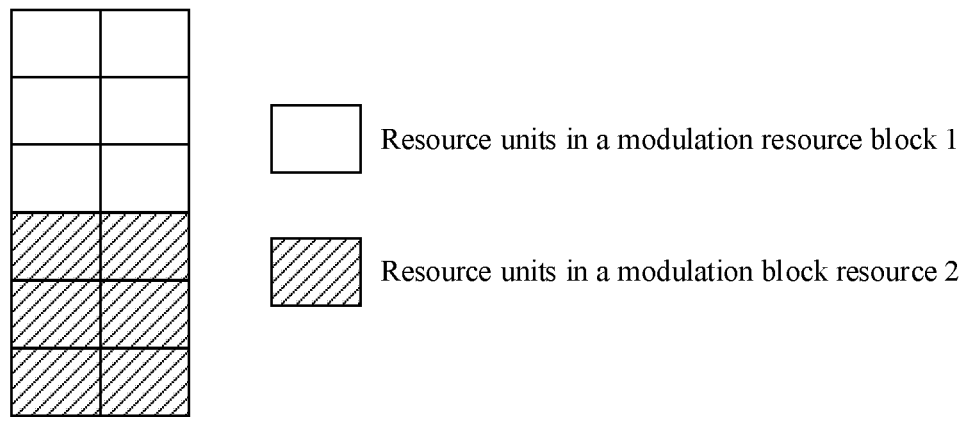
FIG. 5 is a schematic diagram of modulation resource blocks according to an embodiment of this application.

As an example instead of a limitation, FIG. 5 is a schematic diagram of modulation resource blocks according to an embodiment of this application. As shown in FIG. 5, each small box represents one resource unit, the time-frequency resource used to transmit the to-be-transmitted bit stream includes 12 resource units, and T=6. In this case, every six resource units form one modulation resource block, to obtain two modulation resource blocks: a modulation resource block 1 and a modulation resource block 2.

When the resource units used to transmit the to-be-transmitted bit stream are grouped, resource units occupied by each modulation resource block may be determined in a manner of first in time domain and then in frequency domain, or the resource units occupied by each modulation resource block may be determined in a manner of first in frequency domain and then in time domain. The following separately describes the two manners by using a time-frequency resource in which a resource unit is an RE as an example.

When the resource units occupied by each modulation resource block are determined in the manner of first in time domain and then in frequency domain:

For example, the resource unit is an RE, and it is assumed that an RE is labeled (m, n). m may represent a subcarrier index of the RE, and may start from 0 in a frequency increasing direction. As an example instead of a limitation, 0 corresponds to a subcarrier with a lowest frequency domain location in a frequency domain resource of the system, n may represent a time domain symbol index of the RE, and may start from 0 in a time sequence. As an example instead of a limitation, 0 corresponds to the first symbol in a slot. For an RE, a sequence number k=m*T0+n may be defined, where $T_0$ is a quantity of time domain symbols in the time-frequency resource used to transmit the to-be-transmitted bit stream. In a manner of increasing the sequence number k, every T REs form one group, to obtain each modulation resource block. In this manner, because time domain channel transformation is slow, demodulation performance can be improved.

Figure 6:
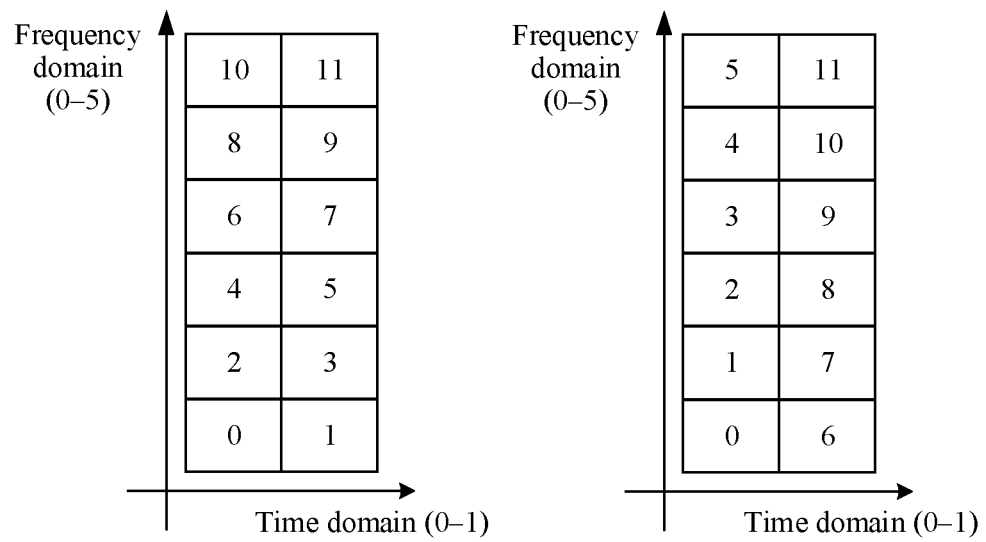
FIG. 6 is another schematic diagram of modulation resource blocks according to an embodiment of this application.

As an example instead of a limitation, FIG. 6 is another schematic diagram of modulation resource blocks according to an embodiment of this application. Refer to the figure on the left of FIG. 6. A value range of m is 0 to 5, a value range of n is 0 to 1, and $T_0=2$. Based on the foregoing formula for defining the sequence number k, the sequence number k of the RE in the figure on the left of FIG. 6 is shown in the figure. REs with sequence numbers 0 to 5 form one modulation resource block, and REs with sequence numbers 6 to 11 form another modulation resource block.

When the resource units occupied by each modulation resource block are determined in the manner of first in frequency domain and then in time domain:

For example, the resource unit is an RE, and it is assumed that, with reference to the foregoing manner, an RE is labeled (m, n). A difference lies in that, for an RE, a sequence number k=n*F0+m is defined, where F0 is a quantity of subcarriers in the time-frequency resource used to transmit the to-be-transmitted bit stream. In this manner, symbols corresponding to a same modulation resource block are preferentially mapped to a same time domain symbol or adjacent time domain symbols, so that after receiving the symbols on the modulation resource block, the receive end device can demodulate the symbols carried on the modulation resource block, with no need to wait for symbols carried on all modulation resource blocks to be completely received before demodulation. Therefore, fast demodulation is facilitated.

Refer to the figure on the right of FIG. 6. A value range of m is 0 to 5, a value range of n is 0 to 1, and $T_0=2$. Based on the foregoing formula for defining the sequence number k, the sequence number k of the RE in the figure on the right of FIG. 6 is shown in the figure. Time-frequency resources of REs with sequence numbers 0 to 5 form one modulation resource block, and time-frequency resources of REs with sequence numbers 6 to 11 form another modulation resource block.

It should be understood that both of the foregoing two manners may be applied to uplink transmission and downlink transmission, and the transmit end device or the receive end device may determine, based on either manner, resource units occupied by one modulation resource block.

In the foregoing two manners, the resource units occupied by one modulation resource block is determined based on the time-frequency resource used to transmit the to-be-transmitted bit stream, or the resource units occupied by one modulation resource block is determined based on the time-frequency resource used to transmit the to-be-transmitted bit stream and the first threshold. In this way, one modulation resource block does not occupy too many resource units, and in a coherent time period and a coherent bandwidth, a channel for the resource units occupied by one modulation resource block does not change greatly, which helps improve decoding performance in non-coherent transmission, to improve decoding accuracy.

In this embodiment of this application, processing of the at least some bits in the to-be-transmitted bit stream may be classified into four cases. Case A: modulation and resource mapping; case B: modulation, scrambling, and resource mapping; case C: channel coding, modulation, scrambling, and resource mapping; and case D: channel coding, modulation, and resource mapping.

Based on the foregoing four cases, the first to-be-modulated bits are used as an example to describe a process in which the transmit end device processes the first to-be-modulated bits and a process in which the receive end device obtains the first to-be-modulated bits. It should be understood that when the first to-be-modulated bits are some bits in the to-be-transmitted bit stream or bits obtained based on the some bits in the to-be-transmitted bit stream, a process in which the transmit end device processes other to-be-modulated bits is the same as the process in which the transmit end device processes the first to-be-modulated bits, and a process in which the receive end device obtains the other to-be-modulated bits is the same as the process in which the receive end device obtains the first to-be-modulated bits. For brevity, details are not described subsequently.

Case A: Modulation and Resource Mapping

Figure 7:
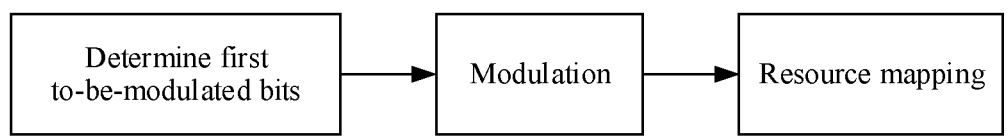
FIG. 7 is a schematic flowchart of a data transmission method according to an embodiment of this application.

In this case, as shown in FIG. 7, the process of processing the first to-be-modulated bits includes a process of determining the first to-be-modulated bits, a process of modulating the first to-be-modulated bits, and a process of performing resource mapping on the first to-be-modulated bits. The following divides this embodiment into two embodiments, namely, Embodiment 1 and Embodiment 2, based on different manners of determining a constellation in the modulation process, and describes in detail each step in an entire processing process in each embodiment. In Embodiment 1, the first constellation may be determined based on the manner 1 in the foregoing manners of determining the first constellation. In Embodiment 2, the first constellation may be determined based on the manner 2 in the foregoing manners of determining the first constellation.

In addition, in the case A, the P second symbols are the P first symbols.

Embodiment 1

In this embodiment, the transmit end device may determine the first constellation based on the foregoing manner 1 of determining the first constellation.

Step A1: Determine the First to-be-Modulated Bits.

As described above, if the resource units included in the time-frequency resource used to transmit the to-be-transmitted bit stream need to be divided into a plurality of groups, to obtain the plurality of modulation resource blocks, in a possible design, the to-be-transmitted bit stream may be divided into a plurality of groups of bits, where a quantity of the bit groups obtained through division is equal to a quantity of modulation resource blocks, the plurality of groups of bits are in a one-to-one correspondence with a plurality of modulation resource blocks, and one modulation resource block carries one group of bits corresponding to the modulation resource block. Any group of bits may be used as the first to-be-modulated bits. In another possible design, the to-be-transmitted bit stream does not need to be grouped, the to-be-transmitted bit stream may be used as the first to-be-modulated bits, the to-be-transmitted bit stream may be repeatedly transmitted, and a quantity of repeated transmissions is a quantity of modulation resource blocks.

For example, one modulation resource block is used for each transmission, and different modulation resource blocks are used for any two transmissions. In each transmission, the to-be-transmitted bit stream is modulated, and modulated symbols are mapped to a corresponding modulation resource block.

If the quantity of resource units included in the time-frequency resource used to transmit the to-be-transmitted bit stream is the quantity of resource units corresponding to one constellation point, the to-be-transmitted bit stream may not need to be grouped, either, and the to-be-transmitted bit stream is used as to-be-modulated bits carried on one modulation resource block. Herein, the to-be-transmitted bit stream is the first to-be-modulated bits.

For the case in which the to-be-transmitted bit stream is grouped, as an example instead of a limitation, the following describes in detail a process of determining to-be-modulated bits carried on each modulation resource block. The first to-be-modulated bits may be bits carried on any one of the following modulation resource blocks.

For ease of description, a quantity of bits in the to-be-transmitted bit stream is denoted as $u_t$, a quantity of modulation resource blocks is denoted as t, a quantity of bits corresponding to each modulation resource block is denoted as $u_0$, a quantity of resource units occupied by each modulation resource block is denoted as $N_0$, and a quantity of resource units in the time-frequency resource used to transmit the to-be-transmitted bit stream is denoted as $N_t$. The first to-be-modulated bits are bits corresponding to any modulation resource block, and a first bit quantity corresponding to the first to-be-modulated bits is denoted as u, where $u=u_0$. A quantity of resource units included in a first modulation resource block is denoted as N, where $N=N_0$. Symbols of all parameters may be common throughout the text.

Step 1: Determine a quantity of bits corresponding to each modulation resource block.

In this step, the quantity of bits corresponding to each modulation resource block may be determined in the following three manners. In a first manner, the transmit end device may be a terminal device or a network device. In a second manner and a third manner, the transmit end device may be a terminal device. The following separately describes the three manners.

First Manner

In a possible design, the transmit end device determines, based on the quantity of bits in the to-be-transmitted bit stream and the quantity of modulation resource blocks used to carry the to-be-transmitted bit stream, the quantity of bits corresponding to each modulation resource block.

For example, $$u_0 = \frac{u_t}{t}.$$

When $u_t$ cannot be exactly divisible by t, a quantity of bits corresponding to one of the modulation resource blocks may be greater than or less than a quantity of bits corresponding to each of the other modulation resource blocks. For example, when $u_t=10$ and $t=3$, two of the modulation resource blocks may correspond to 3 bits, and the remaining one modulation resource block may correspond to 4 bits. For another example, when $u_t=13$ and $t=4$, three of the modulation resource blocks may correspond to 3 bits, and the remaining one modulation resource block may correspond to 1 bit.

In this embodiment of this application, there may be the following manners of how to obtain the quantity of modulation resource blocks in the to-be-transmitted bit stream:

When the transmit end device is a terminal device, the quantity of modulation resource blocks may be indicated by the network device by using signaling.

Alternatively, the quantity of modulation resource blocks may be determined by the transmit end device based on the quantity of resource units occupied by each modulation resource block and the quantity of resource units used to transmit the to-be-transmitted bit stream. For example, assuming that the quantity of resource units occupied by each modulation resource block is $N_0$, and the quantity of resource units used to transmit the to-be-transmitted bit stream is $N_t$, $$t = \left\lceil \frac{N_t}{N_0} \right\rceil,$$

where $\lceil \ \rceil$ indicates rounding up, and when $N_t$ is exactly divisible by $N_0$, a rounding up symbol is not required.

For a manner in which the transmit end device determines the quantity of resource units occupied by each modulation resource block, refer to the foregoing manner in which the transmit end device determines the resource units occupied by one modulation resource block. For brevity, details are not described herein again.

Alternatively, the transmit end device may determine, based on the quantity of bits in the to-be-transmitted bit stream, the quantity of resource units occupied by each modulation resource block, and the quantity of resource units used to transmit the to-be-transmitted bit stream, the bit quantity of the to-be-modulated bits carried on each modulation resource block. For example, $$u_0 = \frac{u_t}{N_t/N_0}.$$

Likewise, when $u_0$ is not an integer, a quantity of bits corresponding to one of the modulation resource blocks may be greater than or less than a quantity of bits corresponding to each of the other modulation resource blocks. If $N_t/N_0$ cannot be exactly divisible by $u_t$, for example, when $u_t=10$ and $N_t/N_0=3$, two of the modulation resource blocks may correspond to 3 bits, and the remaining one modulation resource block may correspond to 4 bits. For another example, when $u_t=13$ and $N_t/N_0=4$, three of the modulation resource blocks may correspond to 3 bits, and the remaining one modulation resource block may correspond to 1 bit. If a result of $N_t/N_0$ is not an integer, the result may be rounded up, and the quantity of bits corresponding to each modulation resource block is determined in the foregoing manner.

Second Manner

This manner is applicable to a case in which the transmit end device is a terminal device.

In a possible design, the network device sends, to the terminal device, resource indication information used to indicate the quantity of resource units occupied by each modulation resource block and scheduling information used to indicate the resource units used to transmit the to-be-transmitted bit stream, and the terminal device determines, based on the resource indication information and the scheduling information, the quantity of bits corresponding to each modulation resource block.

As an example instead of a limitation, the quantity $N_0$ of resource units occupied by each modulation resource block and the quantity $N_t$ of resource units used to transmit the to-be-transmitted bit stream may jointly correspond to the quantity $u_t$ of bits in the to-be-transmitted bit stream. The correspondence may be presented in a form of, for example, a table. For example, in a table, a row represents $N_t$, a column represents $N_0$, and one specific $N_t$ and one specific $N_0$ correspond to one $u_t$. In this way, the terminal device may determine $u_t$ by using $N_0$ and $N_t$, determine the quantity t of modulation resource blocks based on a ratio $t=N_t/N_0$, and determine, based on a ratio $u_0=u_t/t$, the quantity $u_0$ of bits corresponding to each modulation resource block The resource indication information indicating the quantity of resource units occupied by each modulation resource block may be independent signaling, or may be signaling carried in other information.

As an example instead of a limitation, the resource indication information may be signaling in modulation and coding scheme (MCS) configuration information. For example, the MCS configuration information may indicate, by using the resource indication information, the quantity $N_0$ of resource units occupied by each modulation resource block. In a modulation process, to-be-modulated bits need to be modulated by using a constellation, and each constellation point in the constellation in this embodiment of this application corresponds to a plurality of resource units. Therefore, the quantity of resource units occupied by each modulation resource block may be understood as a modulation scheme in which the to-be-modulated bits are modulated. The modulation scheme is indicated by using the quantity of resource units occupied by each modulation resource block. For example, Table 4 shows a relationship between an MCS and $N_0$, and an MCS may be represented by using an MCS index. It can be learned from Table 4 that one index indicates one MCS, and one MCS indicates one $N_0$, or it may be understood as that one MCS corresponds to one $N_0$. Optionally, the MCS configuration information may further be used to indicate a bit rate, and the bit rate indicates a ratio of bits before coding to bits after coding.

Because one piece of MCS configuration information indicates one MCS, in a specific implementation, the MCS and $N_t$ may be used to indicate $u_t$. For example, a table lookup manner may be used, where a row in a table represents $N_t$, and a column represents the MCS. Table 5 shows a relationship between an MCS, $N_t$, and $u_t$. The first row represents different $N_t$, the first column represents different MCS indexes, and starting from the second column, the second row to the fourth row represent $u_t$ indicated by different MCSs and different $N_t$. Assuming that $N_t=20$, and that an MCS indicated by an index 1 is MCS_2, it may be determined that resource indication information in MCS_2 indicates that $N_0=10$, MCS_2 and $N_t=10$ indicate that $u_t=30$, the quantity of modulation resource blocks is $t=N_t/N_0=20/10=2$, and the quantity of bits corresponding to each modulation resource block is $u_0=u_t/t=30/2=15$.

It should be understood that the relationship between the MCS, $N_t$, and $u_t$ shown in Table 5 is merely an example for description, and there may alternatively be a correspondence in another form. This is not limited in this embodiment of this application.

It should be further understood that the foregoing manner of determining $u_0$ by using $N_0$ indicated by the resource indication information and $N_t$ indicated by the scheduling information is merely an example for description. For example, the terminal device may determine $u_0$ based on spectral efficiency and $N_0$. The frequency efficiency may be used to determine a quantity of bits carried on one resource unit, and may be carried in the MCS configuration information. Alternatively, the terminal device may determine $u_t$ based on spectral efficiency and $N_t$, and determine $u_0$ based on t and $u_t$.

TABLE 4

| MCS index | $N_0$ |
|---|---|
| 0 (MCS_1) | 10 |
| 1 (MCS_2) | 10 |
| 2 (MCS_3) | 20 |
| . . . | . . . |

TABLE 5

| | $N_t$ | | |
|---|---|---|---|
| MCS index | 10 | 20 | 30 |
| 0 (MCS_1 ($N_0$ = 10)) | 20 | 30 | 40 |
| 1 (MCS_2 ($N_0$ = 10)) | 20 | 30 | 40 |
| 2 (MCS_3 ($N_0$ = 20)) | 30 | 50 | 60 |

It can be learned that, in this design, the resource indication information used to indicate $N_0$ is included in the MCS, to indicate $N_0$, and $u_t$ is indicated by using the MCS and $N_t$. Actually, when the MCS and $N_t$ are used for indication, $N_0$ may not need to be indicated by using the MCS, and the terminal device may determine $N_0$ by using other information or independently determine $N_0$.

In another possible design, the terminal device determines, based on the quantity of resource units occupied by each modulation resource block, an MCS used to transmit the to-be-transmitted bit stream, and the quantity of resource units used to transmit the to-be-transmitted bit stream, the quantity of bits corresponding to each modulation resource block.

In this design, the quantity of resource units occupied by each modulation resource block may be predefined. As an example instead of a limitation, a system or a communication protocol predefined that the quantity of resource units occupied by each modulation resource block is a fixed value, for example, the fixed value is 6. The quantity of resource units occupied by each modulation resource block may alternatively be indicated by the network device by using resource indication information. The MCS used to transmit the to-be-transmitted bit stream may be indicated by the network device by using MCS configuration information. The quantity of resource units used to transmit the to-be-transmitted bit stream may be indicated by the network device by using scheduling information.

As an example instead of a limitation, the system or the communication protocol may specify that the MCS used to transmit the to-be-transmitted bit stream and the quantity $N_t$ of resource units used to transmit the to-be-transmitted bit stream may jointly correspond to the quantity $u_t$ of bits in the to-be-transmitted bit stream, and the correspondence may be presented in a form of, for example, a table. For example, refer to Table 6. A row represents $N_t$, a column represents an MCS index, one specific MCS and one specific $N_t$ correspond to one $u_t$, the first row represents different $N_t$, the first column represents different MCS indexes, and starting from the second column, the second row to the fourth row represent different u indicated by different MCSs and different $N_t$. For example, MCS_1 indicated by an index 0 and $N_t=10$ may indicate $u_t=20$. In this way, the terminal device may determine $u_t$ based on the MCS and $N_t$; determine, based on the resource indication information or in a predefinition manner, the quantity $N_0$ of resource units occupied by each modulation resource block; further determine the quantity t of modulation resource blocks based on a ratio $t=N_t/N_0$; and determine, based on a ratio $u_0=u_t/t$, the quantity $u_0$ of bits corresponding to each modulation resource block.

TABLE 6

| MCS index | $N_t$ | | |
|---|---|---|---|
| | 10 | 20 | 30 |
| 0 (MCS_1) | 20 | 30 | 40 |
| 1 (MCS_2) | 30 | 50 | 60 |

In the foregoing two possible designs, optionally, the network device may determine, based on a subcarrier spacing, the quantity of resource units occupied by each modulation resource block, and further indicate, by using the resource indication information, the quantity of resource units occupied by each modulation resource block. An objective is to ensure, as far as possible, that a channel on these quantities of resource units does not change greatly. The quantity of resource elements occupied by each modulation resource block herein may be analogous to the foregoing first threshold. For determining, by the network device based on the subcarrier spacing, the quantity of resource units occupied by each modulation resource block, refer to the foregoing related descriptions about the relationship between the first threshold and the subcarrier spacing. Details are not described herein again.

Third Manner

This manner is applicable to a case in which the transmit end device is a terminal device. In this manner, the network device sends, to the terminal device, indication information used to indicate the quantity of bits corresponding to each modulation resource block. The terminal device may determine, based on the indication information, the quantity of bits corresponding to each modulation resource block.

The indication information may be independent signaling, or may be signaling carried in other information.

As an example instead of a limitation, the indication information may be signaling in MCS configuration information, in other words, the MCS configuration information may be used to indicate the indication information. Optionally, the MCS configuration information may further be used to indicate a bit rate. Optionally, the MCS configuration information may further be used to indicate a modulation scheme. The modulation scheme may be understood as the quantity of resource units occupied by each modulation resource block.

In a possible design, the network device may determine, based on the first manner of determining the quantity of bits corresponding to each modulation resource block, the quantity of bits corresponding to each modulation resource block.

In a possible design, the network device may determine, based on the quantity of resource units occupied by each modulation resource block and the resource units used to transmit the to-be-transmitted bit stream, the quantity of bits corresponding to each modulation resource block.

In another possible design, the network device may alternatively determine, based on the quantity of resource units occupied by each modulation resource block, an MCS used to transmit the to-be-transmitted bit stream, and the quantity of resource units used to transmit the to-be-transmitted bit stream, the quantity of bits corresponding to each modulation resource block. For specific descriptions, refer to the foregoing related descriptions about the second manner of determining the quantity of bits corresponding to each modulation resource block. For brevity, details are not described again.

Step 2: Determine, based on the quantity of bits corresponding to each modulation resource block, the to-be-modulated bits carried on each modulation resource block.

As an example instead of a limitation, the transmit end device may intercept corresponding bits based on a sequence of the t modulation resource blocks and a bit quantity of the to-be-modulated bits carried on each modulation resource block, to obtain the to-be-modulated bits carried on each modulation resource block.

For example, for an $i^{th}$ modulation resource block in the t modulation resource blocks, to-be-modulated bits carried on the $i^{th}$ modulation resource block are an $[(i-1)*u+1]^{th}$ bit to an $(i*u)^{th}$ bit in the to-be-transmitted bit stream, where i ranges from 0 to t−1. It is assumed that the to-be-transmitted bit stream is 10001100, each modulation resource block corresponds to 4 bits, to-be-modulated bits carried on the first modulation resource block are 1000, and to-be-modulated bits carried on the second modulation resource block are 1100.

Sequence numbers of the t modulation resource blocks may be determined in a manner of first in time domain and then in frequency domain, or may be determined in a manner of first in frequency domain and then in time domain.

Figure 8:
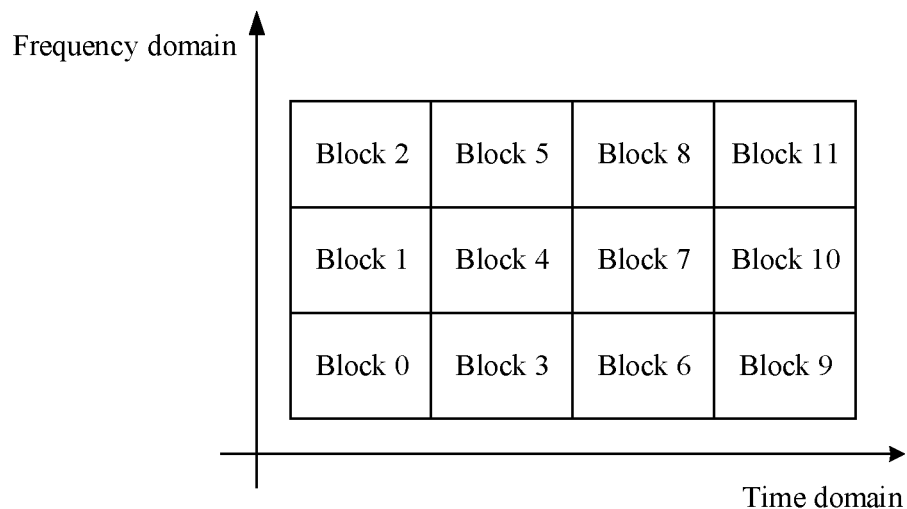
FIG. 8 is another schematic diagram of modulation resource blocks according to an embodiment of this application.
Figure 9:
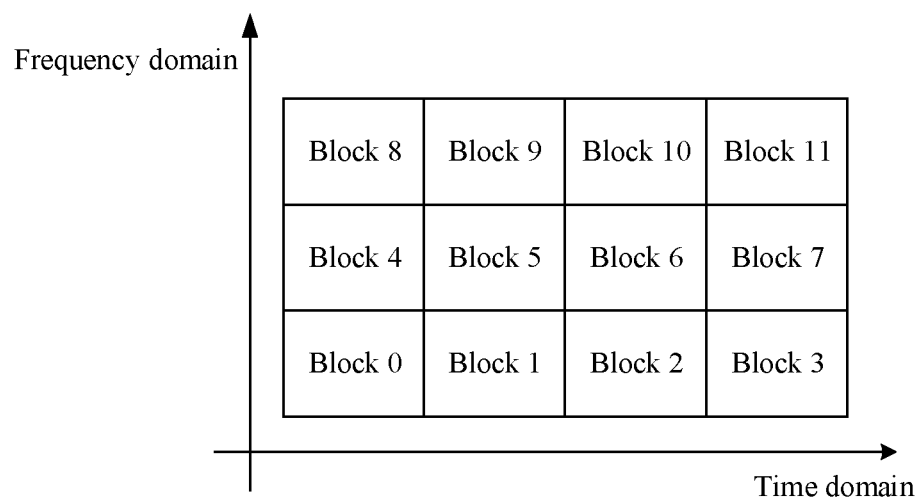
FIG. 9 is still another schematic diagram of modulation resource blocks according to an embodiment of this application.

FIG. 8 and FIG. 9 are schematic diagrams of modulation resource blocks according to embodiments of this application. FIG. 8 and FIG. 9 each show 12 modulation resource blocks. In FIG. 8, the modulation resource blocks are numbered first in frequency domain and then in time domain, to help improve demodulation performance. In FIG. 9, the modulation resource blocks are numbered first in time domain and then in frequency domain, to facilitate fast demodulation.

Step A2: Modulate the first to-be-modulated bits (to obtain P first symbols).

In the process of modulating the first to-be-modulated bits, the transmit end device determines, in the first constellation, a first constellation point corresponding to the first to-be-modulated bits, to obtain the P first symbols corresponding to the first constellation point, where P=M*N, M is a positive integer, and N is an integer greater than 1.

The following describes the process in which the transmit end device modulates the first to-be-modulated bits in two steps.

Step 1: Determine the First Constellation.

A constellation is related to a quantity of antenna ports, a quantity of resource units, and a bit quantity of to-be-modulated bits. The transmit end device may determine the first constellation based on the foregoing manner 1. For specific descriptions, refer to the foregoing related descriptions in the manner 1. Details are not described herein again.

Step 2: Determine the First Constellation Point.

Each constellation point in the constellation corresponds to one bit value, and the transmit end device may determine, based on a correspondence between each constellation point in the first constellation and each bit value, a first constellation point corresponding to a bit value (that is, a first bit value) of the first to-be-modulated bits, to obtain P first symbols corresponding to the first constellation point, to complete the process of modulating the first to-be-modulated bits.

Step A3: Perform Resource Mapping, and Send the P First Symbols.

The transmit end device maps the P first symbols to N resource units of each of the M antenna ports based on the obtained P first symbols, where each antenna port corresponds to N resource units, N first symbols are mapped to the N resource units corresponding to each antenna port, and one first symbol is mapped to one resource unit of each antenna port. The transmit end device sends the P first symbols by using the M antenna ports, and each antenna port is used to send N symbols mapped to corresponding N resource units.

A matrix corresponding to the first constellation point is denoted as a matrix X, where the matrix X includes P first symbols. It is assumed that the matrix X is an M*N matrix. For N columns of first symbols in an $m^{th}$ row, the N columns of first symbols are in a one-to-one correspondence with N resource units, one column of first symbols corresponds to one resource unit, each column of first symbols is mapped to a corresponding resource unit, and the N columns of first symbols are mapped to the N resource units. The transmit end device may send the N columns of first symbols in the $m^{th}$ row in the matrix X by using a corresponding antenna port, to send the N columns of first symbols in the M rows by using the M antenna ports that are in a one-to-one correspondence with the M rows.

A correspondence between the N resource units and the P first symbols may be defined in a communication protocol or specified in a system.

As an example instead of a limitation, refer to the right figure in FIG. 6. The N columns of symbols may be sequentially mapped to resource units determined based on the manner of first in frequency domain and then in time domain, to help fast demodulation. Alternatively, refer to the left figure in FIG. 6. The N columns of symbols may be sequentially mapped to resource units determined based on the manner of first in time domain and then in frequency domain, to improve demodulation performance.

When the resource units included in the time-frequency resource used to transmit the to-be-transmitted bit stream need to be grouped to obtain the t modulation resource blocks, the first to-be-modulated bits may be some bits or all bits in the to-be-transmitted bit stream. The P first symbols obtained by modulating the first to-be-modulated bits may be mapped to one modulation resource block (denoted as the first modulation resource block) in the modulation resource blocks, and resource units occupied by the first modulation resource block are N resource units. Step 2 in step A1 describes the manner of determining, based on the quantity of bits, the to-be-modulated bit carried on each modulation resource block, that is, each to-be-modulated bit may be carried on a corresponding modulation resource block. Therefore, in a resource mapping process, the P first symbols may be mapped to a corresponding first modulation resource block.

When the resource units included in the time-frequency resource used to transmit the to-be-transmitted bit stream do not need to be grouped, there is only one modulation resource block, the first to-be-modulated bits may be the to-be-transmitted bit stream, and the to-be-transmitted bit stream may be mapped to N resource units.

The foregoing uses the first to-be-modulated bits as an example to describe in detail the process of processing the first to-be-modulated bits by the transmit end device. From a perspective of a receive end device, for received P first symbols, the receive end device may determine the first constellation based on the manner 1 in the foregoing manners of determining the first constellation; or if the receive end device is a terminal device, the receive end device may determine the first constellation based on the manner 2, and determine the first to-be-modulated bits corresponding to the first constellation point (that is, the P first symbols) in the first constellation. For the process of determining the first to-be-modulated bits corresponding to the first constellation point in the first constellation, refer to the foregoing related descriptions in S240 in the method 200. For brevity, details are not described herein again.

It should be understood that, when the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Embodiment 2

In this embodiment, the transmit end device may determine the first constellation based on the foregoing manner 2. This embodiment may be used for uplink transmission, and the transmit end device is a terminal device.

Step A1: Determine the First to-be-Modulated Bits.

Because there is a correspondence between a constellation point and a bit quantity, in this embodiment, the transmit end device may determine the bit quantity u by using the constellation, and determine the first to-be-modulated bits based on u.

Optionally, the first constellation includes $L_1$ constellation points, and $L_1 = 2^u$, where u is a positive integer.

The determining the first to-be-modulated bits includes:
  determining the first to-be-modulated bits based on u and the to-be-transmitted bit stream, where the to-be-transmitted bit stream includes the first to-be-modulated bits, or the at least some bits in the to-be-transmitted bit stream are used to determine the first to-be-modulated bits.

That the to-be-transmitted bit stream includes the first to-be-modulated bits may be explained as follows: One explanation is that the to-be-transmitted bit stream includes only the first to-be-modulated bits, that is, the first to-be-modulated bits are the to-be-transmitted bit stream. In the other explanation, the to-be-transmitted bit stream not only includes the first to-be-modulated bits, but may further include other bits. In this case, the first to-be-modulated bits are some bits in the to-be-transmitted bit stream.

That the at least some bits in the to-be-transmitted bit stream are used to determine the first to-be-modulated bits may be explained as follows: The at least some bits in the to-be-transmitted bit stream may be all or some bits in the to-be-transmitted bit stream, and that the at least some bits are used to determine the first to-be-modulated bits may be that the at least some bits are the first to-be-modulated bits, or that the first to-be-modulated bits are obtained by processing (for example, performing channel coding and/or scrambling on) the at least some bits. In all embodiments in the case A, that the at least some bits are the first to-be-modulated bits may be used as an example for description.

In this step, the terminal device may determine, based on the first constellation, the first bit quantity u corresponding to the first constellation, and obtain, based on u, the first to-be-modulated bits whose bit quantity is u from the to-be-transmitted bit stream.

When u is equal to a quantity $u_t$ of bits in the to-be-transmitted bit stream, the to-be-transmitted bit stream is used as the first to-be-modulated bits.

When u is less than the quantity $u_t$ of bits in the to-be-transmitted bit stream, first to-be-modulated bits whose bit quantity is u are intercepted from the to-be-transmitted bit stream, where the first to-be-modulated bits are some bits of the to-be-transmitted bit stream.

Specifically, in this case, as described above, a quantity of resource units included in the time-frequency resource used to transmit the to-be-transmitted bit stream is greater than the quantity of resource units corresponding to one constellation point. The time-frequency resource may be grouped to obtain a plurality of modulation resource blocks (for example, t modulation resource blocks). To-be-modulated bits carried on each modulation resource block are determined based on a quantity of bits corresponding to each modulation resource block, where the first to-be-modulated bits are to-be-modulated bits carried on a first modulation resource block in the t modulation resource blocks. For specific descriptions of a process of obtaining the t modulation resource blocks, refer to related descriptions in Embodiment 1. For the process of determining, based on the bit quantity u, the to-be-modulated bits carried on each modulation resource block, refer to related descriptions in Embodiment 1. For brevity, details are not described herein again.

For a manner in which the terminal device determines the first constellation, refer to related descriptions in the foregoing manner 2 of determining the first constellation. For brevity, details are not described herein again.

This embodiment may be well applied to a scenario in which complete data cannot be transmitted at a time. For example, in a service, a quantity of bits of one piece of complete service data is relatively large. For limited resource units, data transmission performance may be affected when complete service data is transmitted at a time. Therefore, in this case, the complete service data may be transmitted in a plurality of times. The to-be-transmitted bit stream may be service data transmitted at any time. However, the terminal device may not know a quantity of bits of service data that can be currently transmitted, and can complete one transmission only based on a related configuration of a network device. The service data transmitted at one time may be a part of service data in the complete service data. Therefore, in this scenario, a bit quantity of the to-be-modulated bits carried on each modulation resource block may be determined by using a constellation sent by the network device, and the quantity of modulation resource blocks may be determined by using another configuration of the network device, so that the to-be-modulated bits on each modulation resource block can be determined, to transmit service data at a time.

Step A2: Modulate the to-be-Modulated Bits (to Obtain P First Symbols).

In this step, the transmit end device may determine, in the first constellation determined based on the manner 2, a first constellation point corresponding to a first bit value of the first to-be-modulated bits, based on a correspondence between each constellation point in the first constellation and each bit value, to obtain P first symbols corresponding to the first constellation point, thereby completing the process of modulating the first to-be-modulated bits.

Step A3: Perform Resource Mapping, and Send the P First Symbols.

For specific descriptions of this step, refer to specific descriptions of step A3 in Embodiment 1. For brevity, details are not described herein again.

The foregoing uses the first to-be-modulated bits as an example to describe in detail the process in which the transmit end device processes the first to-be-modulated bits. From a perspective of a receive end device (that is, the network device), for the received P first symbols, the receive end device may determine the first constellation based on the manner 2 in the foregoing two manners of determining the first constellation, and determine the first to-be-modulated bits corresponding to the first constellation point (that is, the P first symbols) in the first constellation. For the process of determining the first to-be-modulated bits corresponding to the P first symbols in the first constellation, refer to related descriptions in S240 in the method 200. For brevity, details are not described herein again.

When the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Case B: Modulation, Scrambling, and Resource Mapping

In this case, the process of processing the first to-be-modulated bits includes a process of determining the first to-be-modulated bits, a process of modulating the first to-be-modulated bits, a process of scrambling the first to-be-modulated bits, and a process of performing resource mapping on the first to-be-modulated bits. The following divides this embodiment into two embodiments, that is, Embodiment 3 and Embodiment 4, based on different scrambling manners. In addition, based on different manners of determining a constellation, each embodiment is divided into two small embodiments for description. A main difference between the two embodiments lies in that, as shown in FIG. 10, in Embodiment 3, modulation and scrambling are performed jointly, while as shown in FIG. 11, in Embodiment 4, scrambling is performed after modulation.

Figure 10:
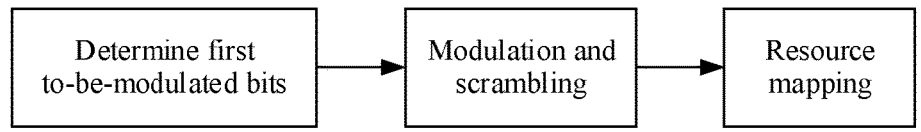
FIG. 10 to FIG. 15 each are another schematic flowchart of a data transmission method according to an embodiment of this application.
Figure 11:
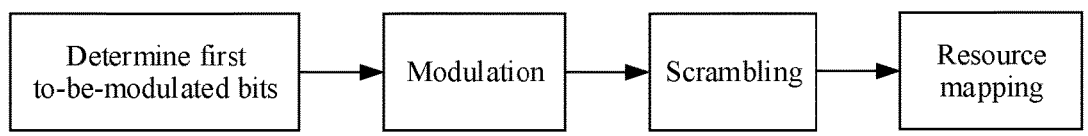

Embodiment 3 (Corresponding to FIG. 10)

In this embodiment, modulation and scrambling are performed jointly.

When a constellation is designed, not only modulation of to-be-modulated bits but also scrambling of the to-be-modulated bits are considered. That is, a constellation is related not only to a quantity of bits, a quantity of antenna ports, and a quantity of resource units, but also to a scrambling parameter.

In a possible design, a constellation point in a first constellation is obtained by scrambling a constellation point in a second constellation by using a first scrambling sequence, and each constellation point in the second constellation corresponds to P symbols. The first scrambling sequence includes P scrambling elements, the P scrambling elements are in a one-to-one correspondence with the P symbols of each constellation point, and each scrambling element corresponds to one symbol.

That is, in the constellation design, the first constellation is generated based on the second constellation and the first scrambling sequence.

The second constellation may be a constellation configured by a network device for a terminal device, defined by a communication protocol or specified by a system. New constellations may be obtained based on the second constellation and different scrambling sequences. For example, a constellation A is obtained based on the second constellation and a scrambling sequence A, a constellation B is obtained based on the second constellation and a scrambling sequence B, and a constellation C is obtained based on the second constellation and a scrambling sequence C. As an example instead of a limitation, in a specific implementation, the second constellation and a scrambling sequence are used as two input parameters of a function, and a new constellation is obtained by performing a function operation. The constellation A, the constellation B, and the constellation C are all new constellations obtained based on the second constellation and different scrambling sequences. Both the new constellation and the second constellation may be used to modulate a same to-be-modulated bit, and both the new constellation and the second constellation correspond to a same quantity of antenna ports, a same quantity of resource units, and a same quantity of bits. A difference lies in that the new constellation is further used to scramble the to-be-modulated bit. It may be understood that each new constellation is a constellation obtained after the second constellation is rotated by using a corresponding scrambling sequence. The first scrambling sequence is used as an example. It is assumed that a matrix corresponding to each constellation point in the second constellation may be represented as Ci, the matrix Ci includes P symbols, and each symbol corresponds to one scrambling element of the first scrambling sequence. A matrix corresponding to each constellation point in the first constellation may be represented as Xi. A symbol in the matrix Xi corresponding to the new constellation point is obtained through calculation (for example, multiplication or summation) by using each symbol in the matrix Ci and a corresponding scrambling element in the first scrambling sequence, to obtain the first constellation.

The following provides further related descriptions about the first scrambling sequence.

Optionally, the P scrambling elements of the first scrambling sequence are not completely the same.

The P scrambling elements may all be different, or may be partially the same. For example, some scrambling elements in the P scrambling elements are of one value, and the other scrambling elements are of another value. For another example, values of scrambling elements other than a value of a $q^{th}$ scrambling element in the P scrambling elements are the same, for example, q=1, 2, 3, or another integer less than P.

Optionally, the first scrambling sequence may be determined based on a first scrambling parameter.

For example, an $h^{th}$ element of the first scrambling sequence may be represented as:

$$S(h) = \frac{1}{\sqrt{2}}(1 - 2c_{2h-1} + (1 - 2c_{2h})j)$$

where h is an integer whose value ranges from 1 to P, c is a pseudo random sequence determined based on initialization of the first scrambling parameter, a length of c is 2P, $c_{2h-1}$ indicates a $(2h-1)^{th}$ element in the pseudo random sequence, $c_{2h}$ indicates a $(2h)^{th}$ element in the pseudo random sequence c, j represents an imaginary unit, and the square of j is equal to −1.

For example, an $n^{th}$ element in the pseudo random sequence c may be represented as:

$$c(n)=(x_1(n+N_c)+x_2(n+N_c)) \bmod 2$$

where Nc=1600, $x_1(0)$=1, $x_1(i)$=0, i=1, 2, . . . , 30, $x_1(n+31)=(x_1(n+3)+x_1(n)) \bmod 2$, $x_2(n+31)=(x_2(n+3)+x_2(n+2)+x_2(n+1)+x_2(n)) \bmod 2$, and $c_{init}=\Sigma_{i=0}^{30}x_2(i) \cdot 2^1$. For example, the first scrambling parameter may be $c_{init}$. In this way, $x_2(i)$ may be determined based on $c_{init}$, and c(n) may be determined based on $x_2(i)$=0, i=0, 1, . . . , 30, $x_1(i)$=0, i=1, 2, . . . , 30, Nc=1600, $x_1(0)$=1, x: $(n+31)=(x_1(n+3)+x_1(n)) \bmod 2$, and $x_2(n+31)=(x_2(n+3)+x_2(n+2)+x_2(n+1)+x_2(n)) \bmod 2$.

Optionally, the first scrambling sequence may be a function of the first scrambling parameter and a sequence number of a resource unit (for example, a sequence number of a time domain unit and/or a frequency domain unit). For example, the first scrambling sequence may be generated based on $c_{init}$, where $c_{init}$ is a linear combination of the first scrambling parameter and the sequence number of the resource unit, for example, $c_{init}$=$c_1$*First scrambling parameter+$c_1$*Sequence number of the resource unit, where both a and a are constants. The sequence number of the resource unit may be an integer. For example, the sequence number of the resource unit may be 0, 1, 2, or the like. Optionally, the scrambling sequence may alternatively be generated in another manner. This is not limited herein.

Optionally, the first scrambling parameter may be determined based on at least one of the following: an ID (for example, a cell radio network temporary identifier (C-RNTI)) of the terminal device, an ID that is of the terminal device and that is configured by the network device, a sequence number of a time unit (for example, a slot, a mini-slot, a frame, or a symbol) used to send the P first symbols or the P second symbols, a sequence number of an RB used to send the P first symbols or the P second symbols, and a sequence number of a modulation resource block. For example, the first scrambling parameter may be any one of the foregoing items, or the first scrambling parameter may be a linear combination of the at least two of the foregoing items. For example, First scrambling parameter=$a_1$*Sequence number of a time unit+$b_1$*Sequence number of an RB. For example, the sequence number of the time unit and the sequence number of the RB may be integers, and $a_1$ and $b_1$ are constants.

Optionally, amplitudes of the P scrambling elements in the first scrambling sequence are the same, and/or phases of the P scrambling elements are determined based on the first scrambling parameter.

For example, a phase of an $h^{th}$ element of the first scrambling sequence may be represented as:

$$\text{Phase} = \frac{\pi}{2}(c_{2h-1} + c_{2h})$$

where h is an integer whose value is 1 to P, c is a pseudo random sequence determined based on the first scrambling parameter, a length of c is 2P, $c_{2h-1}$ indicates a $(2h-1)^{th}$ item in the pseudo random sequence, $c_{2h}$ indicates a $(2h)^{th}$ item in the pseudo random sequence c, and the first scrambling parameter may be $c_{init}$. For $c_{init}$ and a manner of determining c, refer to the foregoing related descriptions. Details are not described again.

Based on this constellation design, for the foregoing manner 1 and manner 2, the first constellation needs to be further determined based on the first scrambling parameter.

For the foregoing manner 1 and manner 2, the following describes in detail a manner of further determining the first constellation based on the first scrambling parameter, and the manner of determining the first constellation based on the first scrambling parameter is denoted as a manner 1-A and a manner 2-A, where the manner 1-A may correspond to the manner 1, and the manner 2-A may correspond to the manner 2.

Manner 1-A

In a possible design, the transmit end device or the receive end device determines the first constellation based on the first scrambling parameter and at least one of M or N; the transmit end device or the receive end device determines the first constellation based on u and the first scrambling parameter; or the transmit end device or the receive end device determines the first constellation based on the first bit quantity u, the first scrambling parameter, and at least one of M or N.

As described above, in the constellation design, the design of the first constellation is determined based on the second constellation and the first scrambling sequence. In this manner, although the second constellation does not need to be determined based on u and/or at least one of M or N, for ease of understanding, a constellation related to u and/or at least one of M or N may be understood as the second constellation, and further, a constellation related to the second constellation and the first scrambling parameter may be understood as the first constellation.

Specifically, the transmit end device or the receive end device may determine the first scrambling sequence based on the first scrambling parameter, for example, at least one of the ID of the terminal device, the sequence number of the time unit, the sequence number of the RB, or the sequence number of the modulation resource block. For the first scrambling sequence, refer to the foregoing specific descriptions about determining the first scrambling sequence. Details are not described again. Because a constellation is obtained based on a scrambling sequence corresponding to a scrambling parameter, it may be understood that one scrambling parameter corresponds to one constellation. Therefore, a corresponding constellation may be determined based on the first scrambling parameter. To simplify description, the following describes, by using an example in which the first constellation is determined based on the first bit quantity u, the first scrambling parameter, and at least one of M or N, a related embodiment in which scrambling and modulation are performed jointly.

In another possible design, the transmit end device or the receive end device may determine the second constellation based on u and/or at least one of M or N, and then determine the first constellation based on the second constellation and the first scrambling parameter. For example, the first scrambling sequence is determined based on the first scrambling parameter, and the second constellation is scrambled by using the first scrambling sequence, to obtain the first constellation.

For specific descriptions of determining the second constellation based on u and/or at least one of M or N, refer to related descriptions in the manner 1. Details are not described herein again. The second constellation herein may be understood as the first constellation in the manner 1.

Manner 2-A

This manner is applicable to a terminal device performing uplink transmission or downlink transmission. In this manner, the terminal device may determine the first constellation by using signaling sent by the network device.

In a possible design, the network device sends fifth indication information to the terminal device, where the fifth indication information is used to indicate the first constellation, and the first constellation is generated based on the second constellation and the first scrambling parameter.

The fifth indication information may be the first indication information, the second indication information and the third indication information, or the fourth indication information in the manner 2. For specific descriptions of each type of indication information, refer to related descriptions of each type of indication information in the manner 2. Details are not described again. A difference lies in that the first constellation in this manner is generated based on the second constellation and the first scrambling parameter.

In another possible design, the network device sends sixth indication information to the terminal device, where the sixth indication information is used to indicate the second constellation. For example, the second constellation may be obtained based on u and/or at least one of M or N.

The terminal device determines the first constellation based on the second constellation and the first scrambling parameter. For example, the first scrambling sequence is determined based on the first scrambling parameter, and the second constellation is scrambled by using the first scrambling sequence, to obtain the first constellation.

In other words, the terminal device may determine the second constellation based on signaling, and further determine the first constellation based on the second constellation and the first scrambling parameter.

An indication manner of the sixth indication information in this design may be the indication manner of the first indication information in the manner 2 (for example, a matrix value corresponding to the second constellation, or an index corresponding to the second constellation), the indication manner of the second indication information and the indication manner of the third indication information (for example, an index corresponding to the second constellation), or the indication manner of the fourth indication information (for example, jointly coding M and the second constellation corresponding to M). For specific descriptions of the indication manner of each type of indication information, refer to related descriptions of the indication manner of each type of indication information in the manner 2. Details are not described again. A difference lies in that, the sixth indication information indicates the second constellation in this manner, and the first constellation in the manner 2 needs to be replaced with the second constellation herein.

The following describes in detail the embodiments of this application based on Embodiment 3-A and Embodiment 3-B in the two manners (the manner 1-A and the manner 2-A) of determining the first constellation.

Embodiment 3-A

In this embodiment, modulation and scrambling are performed jointly, and the transmit end device may determine the first constellation based on the foregoing manner 1-A.

Step B1: Determine the First to-be-Modulated Bits.

An implementation of this step is the same as the implementation of step A1 in Embodiment 1 in the case A. For specific descriptions, refer to the descriptions of step A1 in Embodiment 1. For brevity, details are not described herein again.

Step B2: Modulate and Scramble the First to-be-Modulated Bits (to Obtain the P First Symbols).

In this step, the transmit end device determines the first constellation based on the manner 1-A, and determines, based on a correspondence between each constellation point in the first constellation and each bit value, a first constellation point corresponding to a bit value of the first to-be-modulated bits, to obtain the P first symbols. The first constellation is obtained by scrambling constellation points in the second constellation by using the first scrambling sequence. Therefore, the P first symbols are symbols obtained after the first to-be-modulated bits are modulated and scrambled.

Therefore, according to the data transmission method provided in this embodiment of this application, a basic constellation (for example, the second constellation) is scrambled by using a scrambling sequence to obtain a new constellation, to implement rotation of the basic constellation, which plays a pseudo random role, where different scrambling sequences can be used to obtain different new constellations. For the first to-be-modulated bits, even when M, N, and u are the same, the transmit end device may further determine the first constellation by using the first scrambling parameter used to determine the first scrambling sequence, thereby implementing interference randomization between different users in non-coherent transmission.

Step B3: Perform Resource Mapping, and Send the P First Symbols.

For specific descriptions of this step, refer to specific descriptions of step A3 in Embodiment 1 in the case A. For brevity, details are not described herein again.

The foregoing uses the first to-be-modulated bits as an example to describe in detail the process of processing the first to-be-modulated bits by the transmit end device. From a perspective of the receive end device, for the received P first symbols, the receive end device may determine the first constellation based on the manner 1-A in the foregoing manners of determining the first constellation; or if the receive end device is a terminal device, the receive end device may determine the first constellation based on the manner 2-A, and determine the first to-be-modulated bits corresponding to the first constellation point (that is, the P first symbols) in the first constellation. For the process of determining the first to-be-modulated bits corresponding to the first constellation point in the first constellation, refer to the foregoing related descriptions in S240 in the method 200. For brevity, details are not described herein again.

It should be understood that, when the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Embodiment 3-B

In this embodiment, modulation and scrambling are performed jointly. The transmit end device may determine the first constellation based on the foregoing manner 2-A. This embodiment may be used for uplink transmission. The transmit end device is a terminal device.

Step B1: Determine the First to-be-Modulated Bits.

Because scrambling a symbol corresponding to each constellation point in the constellation does not affect a quantity of bits corresponding to the constellation point, the transmit end device may determine the first constellation based on the indication information sent by the network device in a possible design of the manner 2-A, and determine the first bit quantity u of the first to-be-modulated bits based on the first constellation. Alternatively, the transmit end device may determine the second constellation based on the sixth indication information sent by the network device in another possible design of the manner 2-A. Because a bit quantity u corresponding to the second constellation is the same as a bit quantity u corresponding to the first constellation, the transmit end device may determine the first bit quantity u of the first to-be-modulated bits based on the second constellation.

For specific descriptions of determining the first to-be-modulated bits based on u and the to-be-transmitted bit stream, refer to related descriptions of step A1 in Embodiment 2. Details are not described again.

Step B2: Modulate and Scramble the First to-be-Modulated Bits (to Obtain the P First Symbols).

The transmit end device may determine, in the first constellation determined based on the manner 2-A, a first constellation point corresponding to a bit value of the first to-be-modulated bits, based on a correspondence between each constellation point in the first constellation and each bit value, to obtain the P first symbols. The first constellation is a constellation obtained by scrambling constellation points in the second constellation by using the first scrambling sequence. Therefore, the P first symbols are symbols obtained after the first to-be-modulated bits are modulated and scrambled.

Step B3: Perform Resource Mapping, and Send the P First Symbols.

For specific descriptions of this step, refer to specific descriptions of step A3 in Embodiment 1. For brevity, details are not described herein again.

The foregoing uses the first to-be-modulated bits as an example to describe in detail the process of processing the first to-be-modulated bits by the transmit end device. From a perspective of the receive end device (that is, the network device), for the received P first symbols, the receive end device may determine the first constellation based on the manner 1-A in the foregoing two manners of determining the first constellation, and determine the first to-be-modulated bits corresponding to the first constellation point (that is, the P first symbols) in the first constellation. For the process of determining the first to-be-modulated bits corresponding to the first constellation point in the first constellation, refer to the foregoing related descriptions in S240 in the method 200. For brevity, details are not described herein again.

It should be understood that, when the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Embodiment 4 (Corresponding to FIG. 11)

In this embodiment, modulation is performed before scrambling. The following describes in detail the embodiments of this application based on Embodiment 4-A and Embodiment 4-B in the two manners (the manner 1 and the manner 2) of determining the first constellation.

Embodiment 4-A

In this embodiment, modulation is performed before scrambling, and the transmit end device may determine the first constellation based on the foregoing manner 1.

Step B1: Determine the First to-be-Modulated Bits.

An implementation of this step is the same as the implementation of step A1 in Embodiment 1 in the case A. For specific descriptions, refer to the descriptions of step A1 in Embodiment 1. For brevity, details are not described herein again.

Step B2: Modulate the to-be-Modulated Bits (to Obtain the P First Symbols).

Differences from Embodiment 3 be in that, in Embodiment 4, modulation and scrambling on the first to-be-modulated bits are asynchronous, a constellation design is irrelevant to a scrambling sequence, and the transmit end device determines the first constellation based on the foregoing manner 1, and determines, in the first constellation, a first constellation point corresponding to the first to-be-modulated bits, to obtain the P first symbols. For specific descriptions of this step, refer to step A2 in Embodiment 1 in the case A. For brevity, details are not described again.

Step B3: Scramble the P First Symbols (to Obtain the P Second Symbols).

In this step, the transmit end device scrambles, by using the second scrambling sequence, the P first symbols obtained after the first to-be-modulated bits are modulated, to obtain the P second symbols.

The second scrambling sequence includes P scrambling elements, the P scrambling elements are in a one-to-one correspondence with the P first symbols, and one scrambling element corresponds to one first symbol. The second scrambling sequence may be determined based on a second scrambling parameter. As an example instead of a limitation, the second scrambling parameter may be determined based on at least one of the following: an ID of the terminal device, an ID that is of the terminal device and that is configured by the network device, a sequence number of a time unit (for example, a slot, a mini-slot, a frame, or a symbol), a sequence number of an RB, or a sequence number of a modulation resource block. For example, the second scrambling parameter may be any one of the foregoing items, or the second scrambling parameter may be a linear combination of the at least two of the foregoing items. For example, Second scrambling parameter=$a_2$*Sequence number of a time unit+$b_2$*Sequence number of an RB. For example, the sequence number of the time unit and the sequence number of the RB may be integers, and $a_2$ and $b_2$ are constants.

The P second symbols are obtained through calculation (for example, multiplication or summation) by using each of the P scrambling elements and each corresponding first symbol. For example, it is assumed that an $i^{th}$ scrambling element in the P scrambling elements is $a_i$, a corresponding first symbol is $x_i$, a scrambled symbol is $y_i=x_i*f(a_i)$, a modulus of $f(a_i)$ is fixed (for example, the modulus is 1), and a phase is determined by $a_i$, for example, $f(a_i)=\exp(2*a_i*j*p_i/R)$, where R is a positive integer. It is assumed that P=6 and the P first symbols are $[x_1, x_2, x_3, x_4, x_5, x_6]$. The following shows results obtained by scrambling the P first symbols by using P scrambling elements in each of two different scrambling sequences. It should be noted that, because an exp( ) operation is repeated with a period of 2*pi, an equivalent phase of $f(a_i)$ is $[(2*a_i) \bmod R]*pi/R$, where pi is the ratio of circumference to diameter, and mod represents a modulo operation.

$$[x_1, x_2, x_3, x_4, x_5, x_6] \begin{matrix} \nearrow [x_1 e^{j\theta_1}, x_2 e^{j\theta_2}, x_3 e^{j\theta_3}, x_4 e^{j\theta_4}, x_5 e^{j\theta_5}, x_6 e^{j\theta_6}] \\ \searrow [x_1 e^{j\varphi_1}, x_2 e^{j\varphi_2}, x_3 e^{j\varphi_3}, x_4 e^{j\varphi_4}, x_5 e^{j\varphi_5}, x_6 e^{j\varphi_6}] \end{matrix}$$

where $\theta_i$ and $\varphi_i$ are phases of $i^{th}$ terms of two scrambling sequences respectively, i ranges from 1 to 6, j is an imaginary unit, and the square of the imaginary unit is equal to −1.

The following provides further related descriptions about the second scrambling sequence.

Optionally, the P scrambling elements of the second scrambling sequence are not completely the same.

Optionally, the second scrambling sequence may be a function of the second scrambling parameter and a sequence number (and/or a time-frequency domain sequence number) of a resource unit used to send the P first symbols or the P second symbols. For example, the second scrambling sequence may be generated based on $c_{init}$, where $c_{init}$ is a linear combination of the second scrambling parameter and the sequence number of the resource unit, for example, $c_{init}=c_3$*Second scrambling parameter+$c_4$*Sequence number of the resource unit, where both $c_3$ and $c_4$ are constants. The sequence number of the resource unit may be an integer. For example, the sequence number of the resource unit may be 0, 1, 2, or the like. For specific descriptions of determining the second scrambling sequence based on $c_{init}$, refer to related descriptions of determining the first scrambling sequence based on $c_{init}$ in Embodiment 3. Details are not described again. Optionally, the P scrambling elements are not completely the same.

Optionally, amplitudes of the P scrambling elements in the second scrambling sequence are the same, and/or phases of the P scrambling elements are determined based on the second scrambling parameter.

For specific descriptions of determining the phases of the P scrambling elements based on the second scrambling parameter, refer to related descriptions of determining the phases of the P scrambling elements based on the first scrambling parameter in Embodiment 3. Details are not described again.

Optionally, a length of the second scrambling sequence is P, or a length of the second scrambling sequence is greater than P.

In a first case, a length of one scrambling sequence may be a product of a quantity of resource units occupied by one modulation resource block (or a length of one modulation resource block) and a quantity of antenna ports. In this case, the second scrambling sequence includes only the P scrambling elements.

In a second case, a length of one scrambling sequence may be a product of a quantity of resource units occupied by a plurality of modulation resource blocks and a quantity of antenna ports. In this case, the second scrambling sequence not only includes the P scrambling elements, but also includes other scrambling elements. The other scrambling elements are used to scramble a symbol carried on another modulation resource block. Herein, the plurality of modulation resource blocks may be all modulation resource blocks that carry the foregoing to-be-transmitted bit stream, may be some modulation resource blocks in all modulation resource blocks that carry the to-be-transmitted bit stream, or may be all modulation resource blocks that carry the to-be-transmitted bit stream and modulation resource blocks that carry other to-be-transmitted bit streams. All modulation resource blocks that carry the to-be-transmitted bit stream may be one modulation resource block or a plurality of modulation resource blocks, where one modulation resource block corresponds to the case in which the time-frequency resource used to transmit the to-be-transmitted bit stream is not grouped, and the plurality of modulation resource blocks correspond to the case in which the time-frequency resource used to transmit the to-be-transmitted bit stream is grouped or the case in which the to-be-transmitted bit stream is repeatedly transmitted.

Therefore, according to the information transmission method provided in this embodiment of this application, the P modulated first symbols are scrambled by using the second scrambling sequence, so that the P first symbols can be rotated. In this way, randomize interference between different users in non-coherent transmission is implemented.

Step B4: Perform Resource Mapping, and Send the P Second Symbols.

For specific descriptions of this step, refer to related descriptions of step A3 in Embodiment 1 in the case A. For brevity, details are not described herein again. A difference lies in that the P first symbols in step A3 in Embodiment 1 in the case A are replaced with the P second symbols herein.

The foregoing uses the first to-be-modulated bits as an example to describe in detail the process of processing the first to-be-modulated bits by the transmit end device. From a perspective of the receive end device, after receiving the P second symbols, the receive end device needs to descramble the P second symbols by using the second scrambling sequence, to obtain the P first symbols. The receive end device may determine the first constellation based on the manner 1 in the foregoing manners of determining the first constellation; or if the receive end device is a terminal device, the receive end device may determine the first constellation based on the manner 2, and determine the first to-be-modulated bits corresponding to the first constellation point (that is, the P first symbols). For the process of determining the first to-be-modulated bits corresponding to the first constellation point in the first constellation, refer to related descriptions in S240 in the method 200. For brevity, details are not described herein again.

It should be understood that, when the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Embodiment 4-B

In this embodiment, modulation is performed before scrambling. The transmit end device may determine the first constellation based on the foregoing manner 2. This embodiment may be used for uplink transmission. The transmit end device is a terminal device.

Step B1: Determine the First to-be-Modulated Bits.

An implementation of this step is the same as the implementation of step A1 in Embodiment 2 in the case A. For specific descriptions, refer to the descriptions of step A1 in Embodiment 2. For brevity, details are not described herein again.

Step B2: Modulate the to-be-Modulated Bits (to Obtain the P First Symbols).

The transmit end device may determine, in the first constellation determined based on manner 2, the first constellation point corresponding to the first to-be-modulated bits, to obtain the P first symbols. For this step, refer to step A2 in Embodiment 2 in the case A. For brevity, details are not described again.

Step B3: Scramble the P First Symbols (to Obtain the P Second Symbols).

In this step, the transmit end device scrambles, by using the second scrambling sequence, the P first symbols obtained after the first to-be-modulated bits are modulated, to obtain the P second symbols.

For specific descriptions, refer to related descriptions of step B3 in Embodiment 4-A. For brevity, details are not described again.

Step B4: Perform Resource Mapping, and Send the P Second Symbols.

For specific descriptions, refer to specific descriptions of step A3 in Embodiment 1 in the case A. For brevity, details are not described herein again. A difference lies in that the P first symbols in step A3 in Embodiment 1 in the case A are replaced with the P second symbols herein.

The foregoing uses the first to-be-modulated bits as an example to describe in detail the process of processing the first to-be-modulated bits by the transmit end device. From a perspective of the receive end device (that is, the network device), after receiving the P second symbols, the receive end device needs to descramble the P second symbols by using the second scrambling sequence, to obtain the P first symbols. The receive end device may determine the first constellation based on the manner 1 in the foregoing two manners of determining the first constellation, and determine the first to-be-modulated bits corresponding to the first constellation point (that is, the P first symbols) in the first constellation. For the process of determining the first to-be-modulated bits corresponding to the first constellation point in the first constellation, refer to related descriptions in S240 in the method 200. For brevity, details are not described herein again.

It should be understood that, when the first to-be-modulated bits are some bits in the to-be-transmitted bit stream, a process in which the receive end device obtains other to-be-modulated bits is the same as the process in which the receive end device obtains the first to-be-modulated bits. For brevity, details are not described herein again.

Case C: Channel Coding, Modulation, Scrambling, and Resource Mapping

In this case, the first to-be-modulated bits may be obtained by performing channel coding on the at least some bits in the to-be-transmitted bit stream. The first to-be-modulated bits are modulated, the P first symbols obtained after the modulation are scrambled, and resource mapping is performed on the P second symbols obtained after the P first symbols are scrambled. Alternatively, the first to-be-modulated bits may be obtained by performing channel coding and scrambling on the at least some bits in the to-be-transmitted bit stream. The first to-be-modulated bits are modulated, and resource mapping is performed on the P first symbols obtained after the modulation.

In non-coherent transmission, for the to-be-transmitted bit stream, if only a small quantity of modulation resource blocks are used, sufficient performance can be obtained with no need to perform channel coding on the to-be-transmitted bit stream. If a plurality of modulation resource blocks need to be used, channel coding may be performed on the at least some bits in the to-be-transmitted bit stream, to help resist channel fading.

Based on this, in a possible design, when it is determined to use t resource unit groups to transmit the to-be-transmitted bit stream, channel coding is performed on the at least some bits in the to-be-transmitted bit stream, to obtain the first to-be-modulated bits, where each resource unit group in the t resource unit groups includes a plurality of resource units. The N resource units used to carry the first to-be-modulated bits are resource units in any resource unit group of the t resource unit groups, and t is greater than a preset value.

In other words, the transmit end device performs channel coding on the at least some bits in the to-be-transmitted bit stream only when the quantity t of modulation resource blocks (that is, resource unit groups) used to transmit the to-be-transmitted bit stream is greater than a preset value.

In a possible design, the preset value is 1, 2, 3, 4, or a larger integer value. This is not limited in this embodiment of this application.

That is, in this case, when one modulation resource block is used to transmit the to-be-transmitted bit stream, channel coding may not need to be performed on the to-be-transmitted bit stream; when a plurality of modulation resource blocks are used to transmit the to-be-transmitted bit stream, channel coding may be performed on the to-be-transmitted bit stream.

In this embodiment of this application, for a sequence of channel coding, modulation, and scrambling in the case C, three embodiments (namely, Embodiment 5, Embodiment 6, and Embodiment 7) are used respectively to describe in detail this embodiment of this application. In addition, in each embodiment, based on different manners of determining a constellation, each embodiment is divided into two sub-embodiments for description.

Figure 12:
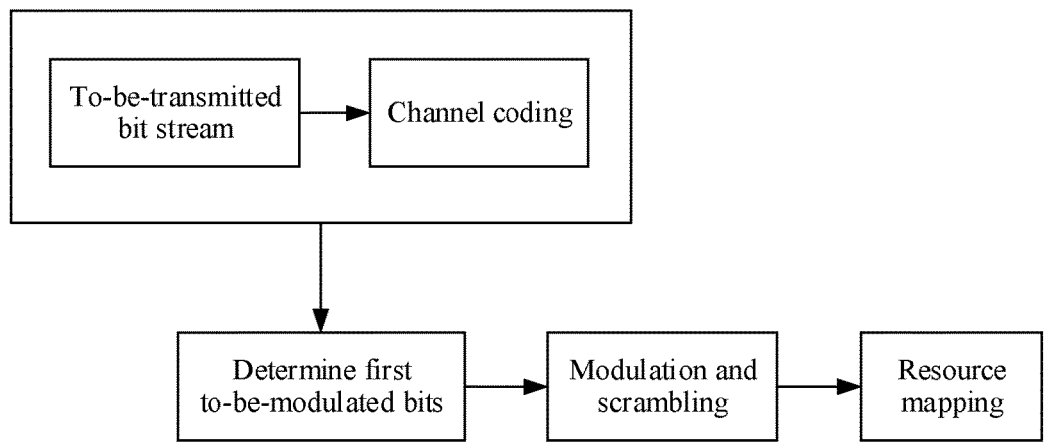
Figure 13:
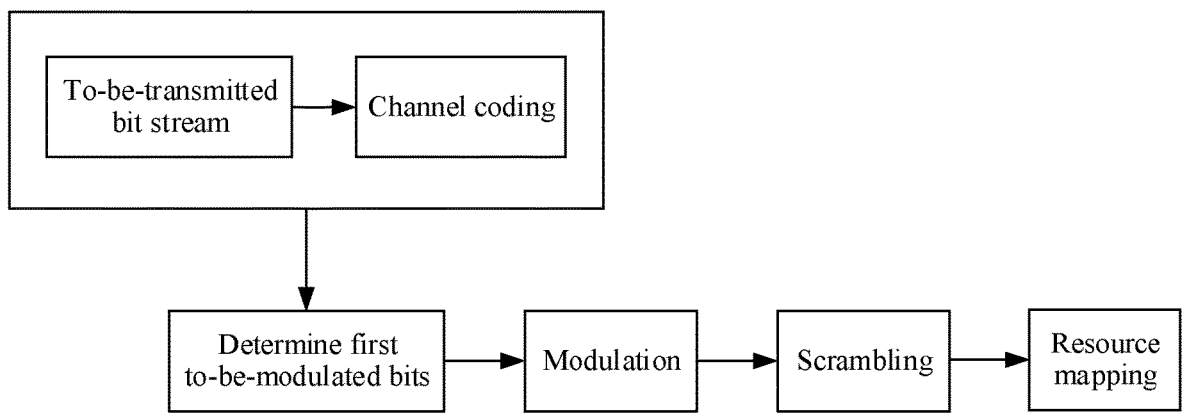
Figure 14:
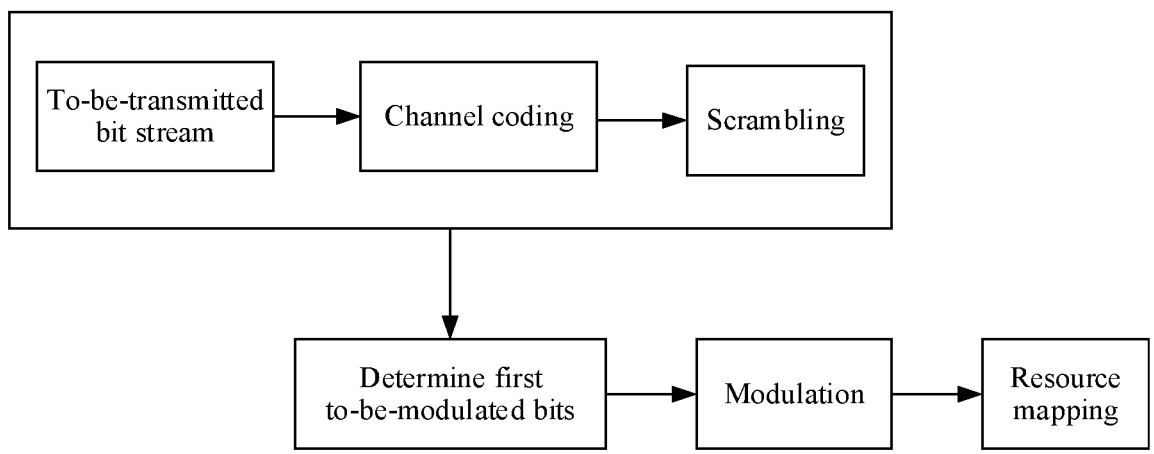

For ease of understanding, first, main steps of the three embodiments are briefly described. Refer to FIG. 12. Main steps in Embodiment 5 are as follows: Channel coding is performed on the at least some bits in the to-be-transmitted bit stream, to determine the first to-be-modulated bits, modulation and scrambling are performed jointly on the first to-be-modulated bits, and resource mapping is performed on the obtained P first symbols. Refer to FIG. 13. Main steps in Embodiment 6 are as follows: Channel coding is performed on the at least some bits in the to-be-transmitted bit stream, to determine the first to-be-modulated bits, modulating and scrambling are performed sequentially on the first to-be-modulated bits, and resource mapping is performed on the obtained P second symbols. Refer to FIG. 14. Main steps in Embodiment 7 are as follows: Channel coding and scrambling are performed on the at least some bits in the to-be-transmitted bit stream, to determine the first to-be-modulated bits, the first to-be-modulated bits are modulated, and resource mapping is performed on the obtained P first symbols.

Based on the foregoing ideas, each embodiment is described in detail.

Embodiment 5 (Corresponding to FIG. 12)

In this embodiment, the transmit end device performs channel coding on the at least some bits in the to-be-transmitted bit stream, to determine the first to-be-modulated bits, performs modulation and scrambling jointly on the first to-be-modulated bits, and performs resource mapping and modulation on the obtained P first symbols.

The first to-be-modulated bits may be modulated and scrambled by designing the first constellation.

In a possible design, a constellation point in a first constellation is obtained by scrambling a constellation point in a second constellation by using a first scrambling sequence, and each constellation point in the second constellation corresponds to P symbols.

The first scrambling sequence includes P scrambling elements, the P scrambling elements are in a one-to-one correspondence with the P symbols of each constellation point, and one scrambling element corresponds to one symbol.

For specific descriptions of the first constellation, the second constellation, and the first scrambling sequence, refer to related descriptions of the first constellation, the second constellation, and the first scrambling sequence in Embodiment 3. For brevity, details are not described herein again.

Based on this constellation design, the first constellation may be determined based on the foregoing manner 1-A and manner 2-A.

The following describes in detail the embodiments of this application based on Embodiment 5-A and Embodiment 5-B in the two manners (the manner 1-A and the manner 2-A) of determining the first constellation. For ease of differentiation and understanding, a bit stream obtained after channel coding is performed on the to-be-transmitted bit stream may be denoted as a coded bit stream, and bits obtained after channel coding is performed on bits obtained by grouping the to-be-transmitted bit stream may be denoted as coded bits.

Embodiment 5-A

In this embodiment, modulation and scrambling are performed jointly, and the transmit end device may determine the first constellation based on the foregoing manner 1-A.

Step C1: Perform Channel Coding on the at Least Some Bits in the to-be-Transmitted Bit Stream, to Determine the First to-be-Modulated Bits.

In this step, there may be two manners (namely, a manner 5-1 and a manner 5-2) of determining the first to-be-modulated bits. A main difference between the two manners lies in: In the manner 5-1, channel coding is performed on the to-be-transmitted bit stream, and a coded bit stream obtained based on the channel coding is grouped or not grouped, to obtain the first to-be-modulated bits. In the manner 5-2, before channel coding, channel coding is performed on grouped or ungrouped bits in the to-be-transmitted bit stream to obtain new bits (a coded bit stream or coded bits), to determine the first to-be-modulated bits. When the first to-be-modulated bits are determined based on the manner 5-1, the at least some bits in the to-be-transmitted bit stream are all bits in the to-be-transmitted bit stream. When the first to-be-modulated bits are determined based on the manner 5-2, if the to-be-transmitted bit stream is grouped, the at least some bits in the to-be-transmitted bit stream are some bits in the to-be-transmitted bit stream; if the to-be-transmitted bit stream is not grouped, the at least some bits in the to-be-transmitted bit stream are all bits in the to-be-transmitted bit stream.

Manner 5-1 (Grouping is Performed or not Performed after Coding)

In this manner, the transmit end device performs channel coding on the to-be-transmitted bit stream to obtain the coded bit stream, and may group or not group the coded bit stream depending on whether the time-frequency resource used to transmit the to-be-transmitted bit stream is grouped, to determine the first to-be-modulated bits.

Coding information may include a bit rate and a coding scheme. The code rate r represents a ratio of bits before coding to bits after coding. For example, if a quantity of bits in the to-be-transmitted bit stream is $u_f$, and a quantity of bits in the coded bit stream is $u_x$, the bit rate $r=u_f/u_x$. The coding scheme may be RM (reed muller) coding, repeated coding, convolutional coding, turbo coding, polar coding, low density parity check (LDPC) coding, or the like.

During actual transmission, the quantity of resource units included in the time-frequency resource used to transmit the to-be-transmitted bit stream may be greater than the quantity of resource units corresponding to one constellation point. In this case, the resource units included in the time-frequency resource may be divided into a plurality of groups, to obtain the plurality of modulation resource blocks. Based on this, for the coded bit stream, in a possible design, the coded bit stream may be divided into a plurality of groups, the plurality of groups of coded bits are in a one-to-one correspondence with the plurality of modulation resource blocks, a quantity of the coded bit groups is equal to a quantity of modulation resource blocks, and each modulation resource block carries a corresponding group of coded bits. Modulation, scrambling, and resource mapping are separately performed on each group of coded bits. Herein, any group of coded bits is the first to-be-modulated bits. In another possible design, the coded bit stream does not need to be grouped, and the coded bit stream may be used as the first to-be-modulated bits. When the quantity of resource units included in the time-frequency resource used to transmit the to-be-transmitted bit stream is greater than the quantity of resource units corresponding to one constellation point, the coded bit stream may be repeatedly transmitted, and a quantity of repeated transmissions is a quantity of modulation resource blocks. One modulation resource block is used for each transmission, and different modulation resource blocks are used for any two transmissions. In each transmission, the coded bit stream is modulated and scrambled jointly, and obtained symbols are mapped to a corresponding modulation resource block.

If the quantity of resource units included in the time-frequency resource used to transmit the to-be-transmitted bit stream is the quantity of resource units corresponding to one constellation point, the coded bit stream may not need to be grouped, and the coded bit stream is used as to-be-modulated bits carried on one modulation resource block. Herein, the coded bit stream is the first to-be-modulated bits.

For a case in which the coded bit stream is grouped, to-be-modulated bits (that is, coded bits) carried on each modulation resource block need to be determined, where the first to-be-modulated bits are to-be-modulated bits carried on any modulation resource block. For specific descriptions, refer to the process of determining the to-be-modulated bits carried on each modulation resource block in step A1 in Embodiment 1 of the case A. A difference lies in that the to-be-modulated bits herein are coded bits, and the to-be-modulated bits in Embodiment 1 are uncoded bits.

In the process of determining the to-be-modulated bits carried on each modulation resource block, when the first manner and the second manner of determining the quantity of bits corresponding to each modulation resource block in step A1 in the embodiments are applied to this embodiment, adaptive adjustment needs to be performed based on the channel coding process in this embodiment. The following briefly describes the two manners of determining the quantity of bits of each modulation resource block, and mainly points out a difference. For specific descriptions in other parts, still refer to related descriptions in the first manner and the second manner of determining the quantity of bits corresponding to each modulation resource block in step A1 in Embodiment 1.

First Manner

In a possible design, the transmit end device determines, based on the quantity $u_t$ of bits in the to-be-transmitted bit stream, the bit rate r, and the quantity t of modulation resource blocks used to carry the to-be-transmitted bit stream, the quantity $N_0$ of bits corresponding to each modulation resource block.

For example, $u_0 = u_x/t$, where $u_x = u_t/r$ and $u_x$ represents a quantity of bits of a coded to-be-transmitted bit stream (that is, a coded bit stream). Because the coded bit stream obtained after channel coding is performed on the to-be-transmitted bit stream is grouped, a bit quantity of the coded bits needs to be determined based on $u_x = u_t/r$.

When $u_x$ cannot be exactly divisible by t, a quantity of bits corresponding to one of the modulation resource blocks may be greater than or less than a quantity of bits corresponding to each of the other modulation resource blocks.

Second Manner

This manner is applicable to a case in which the transmit end device is a terminal device.

In a possible design, the network device sends, to the terminal device, resource indication information used to indicate the quantity of resource units occupied by each modulation resource block, scheduling information used to indicate the resource units used to transmit the to-be-transmitted bit stream, and bit rate information used to indicate the bit rate, and the terminal device determines, based on the resource indication information, the scheduling information, and the bit rate information, the quantity of bits corresponding to each modulation resource block. Alternatively, the bit rate information may be preconfigured, that is, the network device does not need to send the bit rate information to the terminal device.

As an example instead of a limitation, a system or a communication protocol may specify that the quantity $N_0$ of resource units occupied by each modulation resource block and the quantity $N_t$ of resource units used to transmit the to-be-transmitted bit stream may jointly correspond to the quantity $u_t$ of bits in the to-be-transmitted bit stream, and the correspondence may be presented in a form of, for example, a table. In a table, a row represents $N_t$, a column represents $N_0$, and one specific $N_t$ and one specific $N_0$ correspond to one $u_t$. In this way, the terminal device may determine $u_t$ by using $N_0$ and $N_t$. The quantity t of modulation resource blocks may be determined based on a ratio $t = N_t/N_0$. The quantity $u_0$ of bits corresponding to each modulation resource block may be determined based on a ratio $u_0 = u_x/t$, where $u_x = u_t/r$, $u_x$ represents the bit quantity of the coded to-be-transmitted bit stream (that is, the coded bit stream), and r is a bit rate.

The resource indication information and the bit rate information may be independent signaling, or may be signaling carried in other information.

As an example instead of a limitation, the resource indication information and the bit rate information may be signaling in modulation and coding scheme (MCS) configuration information. The quantity that is of resource units occupied by each modulation resource block and that is indicated by the resource indication information in the MCS configuration information may be understood as a modulation scheme in which to-be-modulated bits are modulated. Because one piece of MCS configuration information indicates one MCS, in a specific implementation, the MCS and $N_t$ may be used to indicate $u_t$. For example, a table lookup manner may be used, where a row in a table represents $N_t$, and a column represents the MCS. For a relationship between the MCS, $N_t$, and $u_t$, refer to the foregoing related descriptions about Table 5. Details are not described herein again.

The foregoing manner of determining $u_0$ based on $N_0$ indicated by the resource indication information and $N_t$ indicated by the scheduling information is merely an example for description. For example, the terminal device may determine $u_0$ based on spectral efficiency, $N_0$, and r. Specifically, the quantity of bits, before coding, corresponding to one modulation resource block is determined by using the spectral efficiency and $N_0$. For example, the quantity of bits, before coding, corresponding to one modulation resource block is equal to a product of the spectral efficiency and a quantity of resources occupied by No resource units, where a unit of the quantity of resources occupied by the $N_0$ resource units is Hertz*second (Hz*s), and a unit of the spectral efficiency is bit/second/hertz (bit/s/Hz). The quantity $u_0$ of coded bits corresponding to one modulation resource block is determined based on the quantity of bits, before coding, corresponding to one modulation resource block and r. Alternatively, the terminal device may determine $u_t$ based on the spectral efficiency and $N_t$, and determine the quantity $u_x$ of bits in the coded bit stream based on $u_x=u_t/r$, and determine $u_0$ based on $u_0=u_x/t$.

In another possible design, the terminal device determines, based on the quantity of resource units occupied by each modulation resource block, an MCS used to transmit the to-be-transmitted bit stream, and the quantity of resource units used to transmit the to-be-transmitted bit stream, the quantity of bits corresponding to each modulation resource block. The MCS is further used to indicate the bit rate.

As an example instead of a limitation, a system or a communication protocol may specify that an MCS used to transmit the to-be-transmitted bit stream and the quantity $N_t$ of resource units used to transmit the to-be-transmitted bit stream may jointly correspond to the quantity $u_t$ of bits in the to-be-transmitted bit stream, and the correspondence may be presented in a form of, for example, a table. In a table, a row represents $N_t$, a column represents an MCS, and one specific MCS and one specific $N_t$ correspond to one $u_t$. For details, refer to related descriptions in Table 6. In this way, the terminal device may determine $u_t$ based on the MCS and $N_t$, determine, based on the resource indication information, the quantity $N_0$ of resource units occupied by each modulation resource block, determine the quantity t of modulation resource blocks based on a ratio $t=N_t/N_0$, and determine, based on a ratio $u_0=u_x/t$, the quantity $u_0$ of bits corresponding to each modulation resource block, where $u_x=u_t/r$, $u_x$ represents the quantity of bits of the coded to-be-transmitted bit stream (that is, the coded bit stream), and r is the bit rate.

For a channel coding process, as an example instead of a limitation, the quantity of bits in the to-be-transmitted bit stream is $u_t$, and the process of performing channel coding on the to-be-transmitted bit stream by the transmit end device may be as follows: If $u_t$ ranges from 1 to 2, repeated code transmission may be used. If $u_t$ ranges from 3 to 11, RM coding may be used for channel coding. If $u_t$ is greater than 12, polar coding may be used for coding. In the coding process, the to-be-transmitted bit stream is converted into a coded bit stream. A quantity of bits in the coded bit stream is $u_x$, where $u_x \geq u_t$, and a value of $u_x$ is determined based on a modulation scheme and resource mapping. For example, if a modulation order is k, a quantity of resource units (for example, RE time-frequency resources) that may be used for data transmission is R, $u_x=k*R$.

Manner 5-2 (Grouping is Performed or not Performed Before Coding)

In this manner, based on a case in which the resource units included in the time-frequency resource used to transmit the to-be-transmitted bit stream need to be divided into the plurality of groups, to obtain the plurality of modulation resource blocks, in a possible design, the to-be-transmitted bit stream may be divided into a plurality of groups, the plurality of groups of bits correspond to the plurality of modulation resource blocks, each modulation resource block carries coded bits obtained after channel coding is performed on each corresponding group of bits by using coding information, and modulation, scrambling, and resource mapping are performed on each group of coded bits. Herein, the first to-be-modulated bits are coded bits obtained after channel coding is performed on any group of bits. In another possible design, the to-be-transmitted bit stream does not need to be grouped, the coded bit stream obtained after channel coding is performed on the to-be-transmitted bit stream is used as the first to-be-modulated bits, and the coded bit stream may be repeatedly transmitted, where a quantity of repeated transmissions is a quantity of modulation resource blocks. One modulation resource block is used for each transmission, and different modulation resource blocks are used for any two transmissions. In each transmission, the coded bit stream is modulated, and modulated symbols are mapped to a corresponding modulation resource block.

If the quantity of resource units included in the time-frequency resource used to transmit the to-be-transmitted bit stream is the quantity of resource units corresponding to one constellation point, the to-be-transmitted bit stream may not need to be grouped, either. The coded bit stream obtained after channel coding is performed on the to-be-transmitted bit stream is used as to-be-modulated bits carried on one modulation resource block. Herein, the first to-be-modulated bits are a coded bit stream obtained after channel coding is performed on the to-be-transmitted bit stream.

For the case in which the to-be-transmitted bit stream is grouped, to-be-modulated bits (that is, coded bits or a coded bit stream) carried on each modulation resource block need to be determined, where the first to-be-modulated bits are coded bits or a coded bit stream carried on any modulation resource block. For specific descriptions, refer to the process of determining the to-be-modulated bits carried on each modulation resource block in step A1 in Embodiment 1 in the case A. For brevity, details are not described again. A difference lies in that the to-be-modulated bits herein are coded bits or a coded bit stream, and the to-be-modulated bits in Embodiment 1 are uncoded bits.

For a channel coding process, refer to related descriptions in the manner 5-1. For brevity, details are not described herein again. A difference from the manner 5-1 lies in that the coding information in the manner 5-1 is coding information for the to-be-transmitted bit stream. In the manner 5-2, if the to-be-transmitted bit stream is grouped, the coding information herein is coding information of a group of bits obtained after the grouping. If the to-be-transmitted bit stream is not grouped, the coding information herein is coding information for the to-be-transmitted bit stream.

Step C2: Modulate and Scramble the First to-be-Modulated Bits (to Obtain the P First Symbols).

An implementation of this step is the same as the implementation of step B2 in Embodiment 3-A in the case B. For specific descriptions, refer to related descriptions of step B2 in Embodiment 3-A. For brevity, details are not described again.

Step C3: Perform Resource Mapping, and Send the P First Symbols.

For specific descriptions of this step, refer to specific descriptions of step A3 in Embodiment 1 in the case A. For brevity, details are not described herein again.

The foregoing uses the first to-be-modulated bits as an example to describe in detail the process of processing the first to-be-modulated bits by the transmit end device. It should be understood that when the first to-be-modulated bits are coded bits obtained after channel coding is performed on one group of bits in groups of bits obtained by grouping the to-be-transmitted bit stream, or when the first to-be-modulated bits are a group of coded bits in groups of coded bits in the coded bit stream obtained after channel coding is performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of the receive end device, for the received P first symbols, the receive end device may determine the first constellation based on the manner 1-A in the manners of determining the first constellation, or if the receive end device is a terminal device, the receive end device may determine the first constellation based on the manner 2-A, determine the first to-be-modulated bits corresponding to the first constellation point (that is, the P first symbols) in the first constellation, and obtain the uncoded bits based on the coding information and the first to-be-modulated bits. For the process of determining the first to-be-modulated bits corresponding to the first constellation point in the first constellation, refer to related descriptions in S240 in the method 200. For brevity, details are not described herein again.

The following briefly describes, based on the two manners in which the transmit end device determines the first to-be-modulated bits, related content decoded by the receive end device.

If the transmit end device groups, based on the manner 5-1, the coded bit stream obtained after channel coding is performed on the to-be-transmitted bit stream, from a perspective of the receive end device, the receive end device needs to obtain to-be-modulated bits carried on all modulation resource blocks (for example, the t modulation resource blocks), integrate the to-be-modulated bits carried on all the modulation resource blocks into one coded bit stream, and decode the coded bit stream by using coding information that is used by the transmit end device and that is for performing channel coding on the to-be-transmitted bit stream, to obtain an uncoded to-be-transmitted bit stream. It can be learned that, in this case, the coding information used to decode the first to-be-modulated bits may be coding information that is used by the transmit end device and that is for performing channel coding on the to-be-transmitted bit stream.

If the transmit end device groups the to-be-transmitted bit stream based on the manner 5-2, the receive end device decodes, by using coding information that is used by the transmit end device and that is for performing channel coding on each group of bits, the to-be-modulated bits carried on each modulation resource block, to obtain each group of uncoded bits, thereby obtaining an uncoded to-be-transmitted bit stream. It can be learned that, in this case, the coding information used by the receive end device to decode the to-be-modulated bits carried on each modulation resource block is the coding information used, by the receive end device, by the transmit end device to perform channel coding on each group of bits.

Embodiment 5-B

In this embodiment, modulation and scrambling are performed jointly. The transmit end device may determine the first constellation based on the foregoing manner 2-A. This embodiment may be used for uplink transmission. The transmit end device is a terminal device.

Because scrambling a symbol corresponding to each constellation point in the constellation does not affect a quantity of bits corresponding to the constellation point, the transmit end device may determine the first constellation based on the indication information sent by the network device in a possible design of the manner 2-A, and determine the first bit quantity u of the first to-be-modulated bits based on the first constellation. Alternatively, the transmit end device may determine the second constellation based on the sixth indication information sent by the network device in another possible design of the manner 2-A. Because a bit quantity u corresponding to the second constellation is the same as a bit quantity u corresponding to the first constellation, the transmit end device may determine the first bit quantity u of the first to-be-modulated bits based on the second constellation, determine the first to-be-modulated bits, jointly modulate and scramble the first to-be-modulated bits, and perform resource mapping on the obtained P first symbols.

Step C1: Perform Channel Coding on the at Least Some Bits in the to-be-Transmitted Bit Stream, to Determine the First to-be-Modulated Bits.

In a possible design, the first constellation includes $L_1$ constellation points, where $L_1=2^u$, and u is a positive integer.

The determining the first to-be-modulated bits includes:
  determining the first to-be-modulated bits based on u and a to-be-transmitted bit stream, where the to-be-transmitted bit stream includes the first to-be-modulated bits, or at least some bits in the to-be-transmitted bit stream are used to determine the first to-be-modulated bits.

In this embodiment, only a case in which the at least some bits in the to-be-transmitted bit stream are used to determine the first to-be-modulated bits may be involved. The at least some bits in the to-be-transmitted bit stream may be all or some bits in the to-be-transmitted bit stream. The at least some bits are used to determine the first to-be-modulated bits, and the first to-be-modulated bits may be obtained after channel coding is performed on the at least some bits.

In the process of determining the first to-be-modulated bits based on the first bit quantity u and the to-be-transmitted bit stream, similar to Embodiment 5-A, there may also be two manners (namely, a manner 5-3 and a manner 5-4) of determining the first to-be-modulated bits in this step. A main difference between the two manners is similar to the main difference between the manner 5-1 and the manner 5-2 in Embodiment 5-A.

The following describes, by using the manner 5-3 and the manner 5-4, in detail the process of determining the first to-be-modulated bits based on the to-be-transmitted bit stream and the first bit quantity u determined by the first constellation.

Manner 5-3 (Grouping is Performed or not Performed after Coding)

In this manner, the transmit end device performs channel coding on the to-be-transmitted bit stream based on the coding information to obtain the coded bit stream, and based on the manner 2-A, determines the first constellation according to an indication of the network device (for example, the fifth indication information or the sixth indication information sent by the network device), determines the corresponding first bit quantity u based on the first constellation, and obtains first to-be-modulated bits whose bit quantity is u from the coded bit stream; and when u is equal to the quantity $u_x$ of bits in the coded bit stream, uses the coded bit stream as the first to-be-modulated bits; or when u is less than the quantity $u_t$ of bits in the coded bit stream, intercepts coded bits whose bit quantity is u from the coded bit stream, where the first to-be-modulated bits are the coded bits. For specific descriptions of intercepting the coded bits whose bit quantity is u from the coded bit stream, refer to related descriptions of step A1 in Embodiment 2. For brevity, details are not described herein again. A difference lies in that the foregoing to-be-transmitted bit stream is analogous to the coded bit stream herein.

For specific descriptions of the channel coding process, refer to related descriptions of the channel coding process in step C1 in Embodiment 5-A. For brevity, details are not described herein again.

Manner 5-4 (Grouping is Performed or not Performed Before Coding)

In this manner, based on the manner 2-A, the transmit end device determines the first constellation according to an indication of the network device (for example, the fifth indication information or the sixth indication information sent by the network device), determines a corresponding first bit quantity u based on the first constellation, and determines a bit quantity $u_p$ of uncoded bits based on u and a bit rate r, where $u_p = u*r$. If $u_p$ is equal to the quantity $u_t$ of bits in the to-be-transmitted bit stream, a coded bit stream obtained after channel coding is performed based on the to-be-transmitted bit stream is determined as the first to-be-modulated bits. If $u_p$ is less than the quantity $u_t$ of bits in the to-be-transmitted bit stream, bits whose bit quantity is $u_p$ are intercepted from the to-be-transmitted bit stream, and channel coding is performed on the intercepted bits based on the coding information to obtain coded bits, where the coded bits are the first to-be-modulated bits. For specific descriptions of intercepting the bits whose bit quantity is $u_p$ from the to-be-transmitted bit stream, refer to related descriptions of step A1 in Embodiment 2. For brevity, details are not described herein again. A difference lies in that the foregoing bit quantity u is analogous to the bit quantity $u_p$ herein.

For specific descriptions of the channel coding process, refer to related descriptions of the channel coding process in step C1 in Embodiment 5-A. For brevity, details are not described herein again.

Step C2: Modulate and Scramble the First to-be-Modulated Bits (to Obtain the P First Symbols).

The transmit end device may determine, in the first constellation determined based on the foregoing manner 2-A, a first constellation point corresponding to a bit value of the first to-be-modulated bits, based on a correspondence between each constellation point in the first constellation and each bit value, to obtain the P first symbols. The first constellation is obtained by scrambling constellation points in the second constellation by using the first scrambling sequence. Therefore, the P first symbols are symbols obtained after the first to-be-modulated bits are modulated and scrambled.

Step C3: Perform Resource Mapping, and Send the P First Symbols.

For specific descriptions of this step, refer to specific descriptions of step A3 in Embodiment 1 in the case A. For brevity, details are not described herein again.

The foregoing uses the first to-be-modulated bits as an example to describe in detail the process of processing the first to-be-modulated bits by the transmit end device. It should be understood that when the first to-be-modulated bits are coded bits obtained after channel coding is performed on one group of bits in groups of bits obtained by grouping the to-be-transmitted bit stream, or when the first to-be-modulated bits are a group of coded bits in groups of coded bits in the coded bit stream obtained after channel coding is performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of the receive end device (that is, the network device), for the received P first symbols, the receive end device may determine the first constellation based on the manner 1-A in the foregoing manners of determining the first constellation, determine the first to-be-modulated bits corresponding to the first constellation point (that is, the P first symbols) in the first constellation, and obtain the uncoded bits based on the coding information and the first to-be-modulated bits. For the process of determining the first to-be-modulated bits corresponding to the first constellation point in the first constellation, refer to related descriptions in S240 in the method 200. In the two manners in which the transmit end device determines the first to-be-modulated bits, for specific descriptions of related content decoded by the receive end device, refer to descriptions of related content decoded by the receive end device in Embodiment 5-A. For brevity, details are not described herein again.

Embodiment 6 (Corresponding to FIG. 13)

In this embodiment, the transmit end device performs channel coding on the at least some bits in the to-be-transmitted bit stream to determine the first to-be-modulated bits, modulates the first to-be-modulated bits, scrambles the P first symbols obtained after the modulation, and performs resource mapping on the P second symbols obtained after the scrambling.

The following describes in detail Embodiment 6-A and Embodiment 6-B based on the two manners (the manner 1 and the manner 2) of determining the first constellation.

Embodiment 6-A

In this embodiment, modulation is performed before scrambling, and the transmit end device may determine the first constellation based on the foregoing manner 1.

Step C1: Perform Channel Coding on the at Least Some Bits in the to-be-Transmitted Bit Stream, to Determine the First to-be-Modulated Bits.

An implementation of this step is the same as the implementation of step C1 in Embodiment 5-A. For specific descriptions, refer to related descriptions of step C1 in Embodiment 5-A. For brevity, details are not described again.

Step C2: Modulate the to-be-Modulated Bits (to Obtain the P First Symbols).

The transmit end device may determine the first constellation based on the foregoing manner 1, and determine, in the first constellation, the first constellation point corresponding to the first to-be-modulated bits, to obtain the P first symbols. For specific descriptions of this step, refer to related descriptions of step A2 in Embodiment 1 in the case A. For brevity, details are not described herein again.

Step C3: Scramble the P First Symbols (to Obtain the P Second Symbols).

In this step, the transmit end device scrambles, by using the second scrambling sequence, the P first symbols obtained after the first to-be-modulated bits are modulated, to obtain the P second symbols.

For specific descriptions of this step, refer to related descriptions of step B3 in Embodiment 4-A. For brevity, details are not described herein again.

Step C4: Perform Resource Mapping, and Send the P Second Symbols.

For specific descriptions of this step, refer to related descriptions of step A3 in Embodiment 1 in the case A. For brevity, details are not described herein again. A difference lies in that the P first symbols in step A3 in Embodiment 1 in the case A are replaced with the P second symbols herein.

The foregoing uses the first to-be-modulated bits as an example to describe in detail the process of processing the first to-be-modulated bits by the transmit end device. It should be understood that when the first to-be-modulated bits are coded bits obtained after channel coding is performed on one group of bits in groups of bits obtained by grouping the to-be-transmitted bit stream, or when the first to-be-modulated bits are a group of coded bits in groups of coded bits in the coded bit stream obtained after channel coding is performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of the receive end device, after receiving the P second symbols, the receive end device needs to descramble the P second symbols by using the second scrambling sequence, to obtain the P first symbols. The receive end device may determine the first constellation based on the manner 1 in the manners of determining the first constellation, or if the receive end device is a terminal device, the receive end device may determine the first constellation based on the manner 2, and determine the first to-be-modulated bits corresponding to the first constellation point (that is, the P first symbols) in the first constellation. In addition, the receive end device obtains uncoded bits based on coding information and the first to-be-modulated bits. For the process of determining the first to-be-modulated bits corresponding to the first constellation point in the first constellation, refer to related descriptions in S240 in the method 200. In the two manners in which the transmit end device determines the first to-be-modulated bits, for specific descriptions of related content decoded by the receive end device, refer to descriptions of related content decoded by the receive end device in Embodiment 5-A. For brevity, details are not described herein again.

Embodiment 6-B

In this embodiment, modulation is performed before scrambling. The transmit end device may determine the first constellation based on the foregoing manner 2. This embodiment may be used for uplink transmission. The transmit end device is a terminal device.

Step C1: Perform Channel Coding on the at Least Some Bits in the to-be-Transmitted Bit Stream, to Determine the First to-be-Modulated Bits.

An implementation of this step is the same as the implementation of step C1 in Embodiment 5-B. For specific descriptions, refer to related descriptions of step C1 in Embodiment 5-B. For brevity, details are not described again.

Step C2: Modulate the to-be-Modulated Bits (to Obtain the P First Symbols).

The transmit end device determines, in the first constellation obtained based on the manner 2, the first constellation point corresponding to the first to-be-modulated bits, based on a correspondence between each constellation point in the first constellation and each bit value, to obtain the P first symbols. For this step, refer to step A2 in Embodiment 2 in the case A. For brevity, details are not described again.

Step C3: Scramble the P First Symbols (to Obtain the P Second Symbols).

In this step, the transmit end device scrambles, by using the second scrambling sequence, the P first symbols obtained after the first to-be-modulated bits are modulated, to obtain the P second symbols.

For specific descriptions of this step, refer to related descriptions of step B3 in Embodiment 4-A. For brevity, details are not described herein again.

Step C4: Perform Resource Mapping, and Send the P Second Symbols.

For specific descriptions of this step, refer to related descriptions of step A3 in Embodiment 1 in the case A. For brevity, details are not described herein again. A difference lies in that the P first symbols in step A3 in Embodiment 1 in the case A are replaced with the P second symbols herein.

The foregoing uses the first to-be-modulated bits as an example to describe in detail the process of processing the first to-be-modulated bits by the transmit end device. It should be understood that when the first to-be-modulated bits are coded bits obtained after channel coding is performed on one group of bits in groups of bits obtained by grouping the to-be-transmitted bit stream, or when the first to-be-modulated bits are a group of coded bits in groups of coded bits in the coded bit stream obtained after channel coding is performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of the receive end device (that is, the network device), after receiving the P second symbols, the receive end device needs to descramble the P second symbols by using the second scrambling sequence, to obtain the P first symbols. The receive end device may determine the first constellation based on the manner 1 in the foregoing two manners of determining the first constellation, and determine the first to-be-modulated bits corresponding to the first constellation point (that is, the P first symbols) in the first constellation. In addition, the receive end device obtains uncoded bits based on coding information and the first to-be-modulated bits. For the process of determining the first to-be-modulated bits corresponding to the first constellation point in the first constellation, refer to related descriptions in S240 in the method 200. In the two manners in which the transmit end device determines the first to-be-modulated bits, for specific descriptions of related content decoded by the receive end device, refer to descriptions of related content decoded by the receive end device in Embodiment 5-A. For brevity, details are not described herein again.

Embodiment 7 (Corresponding to FIG. 14)

In this embodiment, the transmit end device performs channel coding and scrambling on the at least some bits in the to-be-transmitted bit stream, to determine the first to-be-modulated bits, performs modulation on the first to-be-modulated bits, and performs resource mapping on the obtained P first symbols.

For ease of differentiation and understanding, a bit stream obtained after channel coding and scrambling are performed on the to-be-transmitted bit stream may be denoted as a coded scrambled bit stream, and bits obtained after channel coding and scrambling are performed on bits obtained by grouping the to-be-transmitted bit stream may be denoted as coded scrambled bits.

The following describes in detail Embodiment 7-A and Embodiment 7-B based on the two manners (the manner 1 and the manner 2) of determining the first constellation.

Embodiment 7-A

In this embodiment, modulation is performed after scrambling, and the transmit end device may determine the first constellation based on the foregoing manner 1.

Step C1: Perform Channel Coding and Scrambling on the at Least Some Bits in the to-be-Transmitted Bit Stream, to Determine the First to-be-Modulated Bits.

In this step, there may be two manners (namely, a manner 7-1 and a manner 7-2) of determining the first to-be-modulated bits. A main difference between the two manners lies in: In the manner 7-1, after channel coding and scrambling are performed on the to-be-transmitted bit stream, a coded scrambled bit stream that is obtained is grouped or not grouped, to obtain the first to-be-modulated bits. In the manner 7-2, before channel coding, channel coding and scrambling are performed on grouped or ungrouped bits in the to-be-transmitted bit stream to obtain new bits (a coded scrambled bit stream or coded scrambled bits), to determine the first to-be-modulated bits. When the first to-be-modulated bits are determined based on the manner 7-1, the at least some bits in the to-be-transmitted bit stream are all bits in the to-be-transmitted bit stream. When the first to-be-modulated bits are determined based on the manner 7-2, if the to-be-transmitted bit stream is grouped, the at least some bits in the to-be-transmitted bit stream are some bits in the to-be-transmitted bit stream; if the to-be-transmitted bit stream is not grouped, the at least some bits in the to-be-transmitted bit stream are all bits in the to-be-transmitted bit stream.

Manner 7-1 (Grouping is Performed or not Performed after Coding and Scrambling)

In this manner, the transmit end device performs channel coding on the to-be-transmitted bit stream to obtain a coded bit stream, and scrambles the coded bit stream to obtain the coded scrambled bit stream; and may group or not group the coded scrambled bit stream depending on whether the time-frequency resource used to transmit the to-be-transmitted bit stream is grouped, to determine the first to-be-modulated bits.

In a case in which the quantity of resource units included in the time-frequency resource used to transmit the to-be-transmitted bit stream may be greater than the quantity of resource units corresponding to one constellation point, the resource units included in the time-frequency resource may be divided into a plurality of groups, to obtain the plurality of modulation resource blocks. Based on this, for the coded scrambled bit stream, in a possible design, the coded scrambled bit stream may be divided into a plurality of groups, the plurality of groups of coded scrambled bits are in a one-to-one correspondence with the plurality of modulation resource blocks, a quantity of groups of coded scrambled bit groups is equal to a quantity of modulation resource blocks, and each modulation resource block carries a corresponding group of coded scrambled bits. Modulation and resource mapping are separately performed on each group of coded scrambled bits. Herein, any group of coded scrambled bits is the first to-be-modulated bits. In another possible design, the coded scrambled bit stream does not need to be grouped, the coded scrambled bit stream may be used as the first to-be-modulated bits, the coded scrambled bit stream may be repeatedly transmitted, and a quantity of repeated transmissions is a quantity of modulation resource blocks. One modulation resource block is used for each transmission, and different modulation resource blocks are used for any two transmissions. In each transmission, the coded scrambled bit stream is modulated, and modulated symbols are mapped to a corresponding modulation resource block.

If the quantity of resource units included in the time-frequency resource used to transmit the to-be-transmitted bit stream is the quantity of resource units corresponding to one constellation point, the coded scrambled bit stream may not need to be grouped, and the coded scrambled bit stream is used as to-be-modulated bits carried on one modulation resource block. Herein, the coded scrambled bit stream is the first to-be-modulated bits.

In a case in which the coded scrambled bit stream is grouped, the to-be-modulated bits (that is, coded scrambled bits) carried on each modulation resource block need to be determined, where the first to-be-modulated bits are to-be-modulated bits carried on any modulation resource block. Because scrambling the coded bit stream does not affect a quantity of bits corresponding to each modulation resource block, for specific descriptions of determining the to-be-modulated bits carried on each modulation resource block, refer to the process of determining the to-be-modulated bits carried on each modulation resource block in step C1 in Embodiment 5-A. For brevity, details are not described again. A difference lies in that the to-be-modulated bits herein are coded scrambled bits, and the to-be-modulated bits in Embodiment 5-A are coded bits. For specific descriptions of the channel coding process, refer to related descriptions of the channel coding process in step C1 in Embodiment 5-A. For brevity, details are not described again.

For a scrambling process, as an example instead of a limitation, the coded bit stream is denoted as b, the coded bit stream is scrambled by using a scrambling sequence c, and an obtained coded bit stream is denoted as $\tilde{b}$. A length of the scrambling sequence c is the same as a quantity $u_x$ of bits in the coded bit stream b. An $n^{th}$ element in the coded scrambled bit stream $\tilde{b}$ obtained after the scrambling is obtained by performing a modulo 2 operation on a sum of each bit in the coded bit stream b and each scrambling element in the scrambling sequence c:

$$\tilde{b}(n)=(b(n)+c(n))\bmod 2$$

where c is the scrambling sequence, and c may be a scrambling sequence in an LTE standard or an NR standard, or may be another scrambling sequence. For example, c is a pseudo random sequence obtained based on a radio network temporary identity (RNTI) (denoted as $n_{RNTI}$) of the terminal device and $n_{ID}$, and the pseudo random sequence may be used as a scrambling sequence. Therefore, c is also a scrambling sequence. $n_{ID}$ is the ID that is of the terminal device and that is configured by the network device or an ID of the terminal device in a physical cell, b(n) represents an $n^{th}$ element in the coded bit stream b, and c(n) represents an $n^{th}$ element in the scrambling sequence c. mod represents a modulo operation.

For specific descriptions of the manner of determining c(n), refer to related descriptions of the manner of determining c(n) in Embodiment 3. Details are not described again. $c_{init}$ may be determined based on $c_{init}=n_{RNTI} \cdot 2^{15}+n_{ID}$, and c(n) may be determined based on $c_{init}$ and the foregoing related descriptions, where $n_{ID} \in \{0, 1 \ldots , 1023\}$, or $n_{ID}=N_{ID}^{cell}$, where $N_{ID}^{cell}$ represents a cell identifier.

For the first to-be-modulated bits determined based on the manner 7-1, because grouping is performed or not performed after coding and scrambling, a length of the scrambling sequence may be equal to the quantity of bits in the coded bit stream obtained after channel coding is performed on the to-be-transmitted bit stream.

Manner 7-2 (Grouping is Performed or not Performed Before Coding)

In this manner, before channel coding is performed on the at least some bits in the to-be-transmitted bit stream, in a case in which the resource units included in the time-frequency resource used to transmit the to-be-transmitted bit stream need to be grouped into a plurality of groups to obtain a plurality of modulation resource blocks, in a possible design, the to-be-transmitted bit stream may be divided into a plurality of groups, the plurality of groups of bits are in a one-to-one correspondence with the plurality of modulation resource blocks, a quantity of the bit groups is equal to the quantity of modulation resource blocks, and each modulation resource block carries coded scrambled bits obtained after channel coding and scrambling are performed on a corresponding group of bits. Modulation and resource mapping are performed on each group of coded scrambled bits. Herein, the first to-be-modulated bits are coded scrambled bits obtained after channel coding and scrambling are performed on any group of bits. In another possible design, the to-be-transmitted bit stream does not need to be grouped, channel coding and scrambling are performed on the to-be-transmitted bit stream, the coded scrambled bit stream that is obtained is used as the first to-be-modulated bits, and the coded scrambled bit stream may be repeatedly transmitted, where a quantity of repeated transmissions is a quantity of modulation resource blocks. One modulation resource block is used for each transmission, and different modulation resource blocks are used for any two transmissions. In each transmission, the coded scrambled bit stream is modulated, and modulated symbols are mapped to a corresponding modulation resource block.

If the quantity of resource units included in the time-frequency resource used to transmit the to-be-transmitted bit stream is the quantity of resource units corresponding to one constellation point, the to-be-transmitted bit stream may not need to be grouped, either. The coded scrambled bit stream obtained after channel coding and scrambling are performed on the to-be-transmitted bit stream may be used as to-be-modulated bits carried on one modulation resource block. Herein, the first to-be-modulated bits are a coded scrambled bit stream obtained after channel coding and scrambling are performed on the to-be-transmitted bit stream.

For the case in which the to-be-transmitted bit stream is grouped, to-be-modulated bits (that is, coded scrambled bits or a coded scrambled bit stream) carried on each modulation resource block need to be determined, where the first to-be-modulated bits are coded scrambled bits or a coded scrambled bit streams carried on any modulation resource block. For specific descriptions, refer to the process of determining the to-be-modulated bits carried on each modulation resource block in step A1 in Embodiment 1 in the case A. For brevity, details are not described again. A difference lies in that the to-be-modulated bits herein are coded scrambled bits or a coded scrambled bit stream, and the to-be-modulated bits in Embodiment 1 are uncoded bits.

For a channel coding and scrambling process, refer to related descriptions in the manner 7-1. For brevity, details are not described herein again.

For the first to-be-modulated bits determined based on the manner 7-2, because grouping is performed or not performed before coding, the length of the scrambling sequence may be less than or equal to the quantity of bits in the coded bit stream obtained after channel coding is performed on the to-be-transmitted bit stream. If grouping is not performed before coding, the first to-be-modulated bits are a coded scrambled bit stream obtained after channel coding and scrambling are performed on the to-be-transmitted bit stream, and the length of the scrambling sequence may be equal to the quantity of bits in the coded bit stream obtained after channel coding is performed on the to-be-transmitted bit stream. If grouping is performed before coding, the first to-be-modulated bits are coded scrambled bits obtained after channel coding and scrambling are performed on some bits in the to-be-transmitted bit stream, and the length of the scrambling sequence may be less than the quantity of bits in the coded bit stream, and may be equal to a bit quantity of coded bits obtained after channel coding is performed on the some bits.

Step C2: Modulate the to-be-Modulated Bits (to Obtain the P First Symbols).

The transmit end device may determine, in the first constellation determined based on the foregoing manner 1, the first constellation point corresponding to the first to-be-modulated bits, based on a correspondence between each constellation point in the first constellation and each bit value, to obtain the P first symbols. For specific descriptions of this step, refer to related descriptions of step A2 in Embodiment 1 in the case A. For brevity, details are not described herein again.

Step C3: Perform Resource Mapping, and Send the P First Symbols.

For specific descriptions of this step, refer to specific descriptions of step A3 in Embodiment 1 in the case A. For brevity, details are not described herein again.

The foregoing uses the first to-be-modulated bits as an example to describe in detail the process of processing the first to-be-modulated bits by the transmit end device. It should be understood that when the first to-be-modulated bits are coded scrambled bits obtained after channel coding and scrambling are performed on one group of bits in groups of bits obtained by grouping the to-be-transmitted bit stream, or when the first to-be-modulated bits are a group of coded scrambled bits in groups of coded scrambled bits in the coded scrambled bit stream obtained after channel coding and scrambling are performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of the receive end device, for the received P first symbols, the receive end device may determine the first constellation based on the manner 1 in the manners of determining the first constellation, or if the receive end device is a terminal device, the receive end device may determine the first constellation based on the manner 2, determine the first to-be-modulated bits corresponding to the first constellation point (that is, the P first symbols) in the first constellation, and descramble and decode the first to-be-modulated bits based on the scrambling sequence and the coding information, to obtain the uncoded bits. For the process of determining the first to-be-modulated bits corresponding to the first constellation point in the first constellation, refer to related descriptions in S240 in the method 200. For brevity, details are not described herein again.

The following briefly describes, based on the two manners in which the transmit end device determines the first to-be-modulated bits, related content descrambled and decoded by the receive end device.

If the transmit end device groups, based on the manner 7-1, the coded scrambled bit stream obtained after channel coding and scrambling are performed on the to-be-transmitted bit stream, because the coded bit stream is grouped or not grouped, the length of the scrambling sequence may be equal to the quantity of bits in the coded bit stream. In addition, the receive end device needs to obtain to-be-modulated bits carried on all modulation resource blocks (for example, the t modulation resource blocks), integrate the to-be-modulated bits carried on all the modulation resource blocks into one coded scrambled bit stream, and descramble and decode the coded scrambled bit stream by using coded information that is used by the transmit end device and that is for performing channel coding on the to-be-transmitted bit stream and the scrambling sequence that is for scrambling the to-be-transmitted bit stream, to obtain an uncoded to-be-transmitted bit stream. It can be learned that, in this case, the scrambling sequence and the coding information for descrambling and decoding the first to-be-modulated bits may be the coding information that is used by the transmit end device and that is for performing channel coding on the to-be-transmitted bit stream and the scrambling sequence that is for scrambling the to-be-transmitted bit stream.

If the transmit end device groups, based on the manner 7-2, the first to-be-modulated bits before performing channel coding on the first to-be-modulated bits, the length of the scrambling sequence may be less than or equal to the quantity of bits in the coded bit stream obtained after channel coding is performed on the to-be-transmitted bit stream. If grouping is not performed before coding, the first to-be-modulated bits are a coded scrambled bit stream obtained after channel coding and scrambling are performed on the to-be-transmitted bit stream, and the length of the scrambling sequence may be equal to the quantity of bits in the coded bit stream obtained after channel coding is performed on the to-be-transmitted bit stream. If grouping is performed before coding, the first to-be-modulated bits are coded scrambled bits obtained after channel coding and scrambling are performed on some bits in the to-be-transmitted bit stream, and the length of the scrambling sequence may be less than the quantity of bits in the coded bit stream, and may be equal to a bit quantity of coded bits obtained after channel coding is performed on the some bits.

In addition, the receive end device descrambles and decodes, by using the coding information for performing channel coding on each group of bits by the transmit end device and the scrambling sequence for scrambling each group of bits, the to-be-modulated bit carried on each modulation resource block, to obtain each group of uncoded bits, thereby obtaining an uncoded to-be-transmitted bit stream. It can be learned that, in this case, the scrambling sequence used by the receive end device to descramble the to-be-modulated bits carried on each modulation resource block is the scrambling sequence used, by the receive end device, by the transmit end device to scramble each group of bits, and the coding information used by the receive end device to decode the to-be-modulated bits carried on each modulation resource block is the coding information used, by the receive end device, by the transmit end device to perform channel coding on each group of bits.

Embodiment 7-B

In this embodiment, modulation is performed after scrambling. The transmit end device may determine the first constellation based on the foregoing manner 2. This embodiment may be used for uplink transmission. The transmit end device is a terminal device.

Step C1: Perform Channel Coding and Scrambling on the at Least Some Bits in the to-be-Transmitted Bit Stream, to Determine the First to-be-Modulated Bits.

In a possible design, the first constellation includes $L_1$ constellation points, where $L_1=2^u$, and u is a positive integer.

The determining the first to-be-modulated bits includes:

determining the first to-be-modulated bits based on u and a to-be-transmitted bit stream, where the to-be-transmitted bit stream includes the first to-be-modulated bits, or at least some bits in the to-be-transmitted bit stream are used to determine the first to-be-modulated bits.

In this embodiment, only a case in which the at least some bits in the to-be-transmitted bit stream are used to determine the first to-be-modulated bits is involved. The at least some bits in the to-be-transmitted bit stream may be all or some bits in the to-be-transmitted bit stream. The at least some bits are used to determine the first to-be-modulated bits, and the first to-be-modulated bits may be obtained after channel coding and scrambling are performed on the at least some bits.

In the process of determining the first to-be-modulated bits based on the first bit quantity u and the to-be-transmitted bit stream, similar to Embodiment 7-A, there may also be two manners (namely, a manner 7-3 and a manner 7-4) of determining the first to-be-modulated bits in this step. A main difference between the two manners is similar to the main difference between the manner 7-1 and the manner 7-2 in Embodiment 7-A.

The following describes, by using the manner 7-3 and the manner 7-4, in detail the process of determining the first to-be-modulated bits based on the to-be-transmitted bit stream and the first bit quantity u determined by the first constellation.

Manner 7-3 (Grouping is Performed or not Performed after Coding)

In this manner, the transmit end device performs channel coding and scrambling on the to-be-transmitted bit stream based on the coding information and the scrambling sequence, to obtain the coded scrambled bit stream, determines, based on the manner 2, the first constellation according to an indication of the network device, determines a corresponding first bit quantity u based on the first constellation, and obtains the first to-be-modulated bits whose bit quantity is u from the coded scrambled bit stream; and when u is equal to the quantity of bits in the coded scrambled bit stream, uses the coded scrambled bit stream as the first to-be-modulated bits; or when u is less than the quantity of bits in the coded scrambled bit stream, intercepts coded scrambled bits whose bit quantity is u from the coded scrambled bit stream, where the first to-be-modulated bits are the coded scrambled bits. For specific descriptions of intercepting the coded scrambled bits whose bit quantity is u from the coded scrambled bit stream, refer to related descriptions of step A1 in Embodiment 2. For brevity, details are not described herein again. A difference lies in that the foregoing to-be-transmitted bit stream is analogous to the coded scrambled bit stream herein.

For specific descriptions of the channel coding and scrambling process, refer to related descriptions of the channel coding and scrambling process in step C1 in Embodiment 7-A. For brevity, details are not described herein again.

Manner 7-4 (Grouping is Performed or not Performed Before Coding)

In this manner, the transmit end device determines, based on the manner 2, the first constellation according to an indication of the network device, determines a corresponding first bit quantity u based on the first constellation, and determines a bit quantity $u_p$ of uncoded bits according to u and a bit rate r, where $u_p=u*r$; and if $u_p$ is equal to the quantity $u_t$ of bits in the to-be-transmitted bit stream, determines the coded scrambled bit stream obtained after channel coding and scrambling are performed based on the to-betransmitted bit stream as the first to-be-modulated bits; or if $u_p$ is less than the quantity $u_t$ of bits in the to-be-transmitted bit stream, intercepts bits whose bit quantity is $u_p$ from the to-be-transmitted bit stream, and then performs channel coding and scrambling on the intercepted bits based on the coding information and the scrambling sequence, to obtain coded scrambled bits, where the coded scrambled bits are the first to-be-modulated bits. For specific descriptions of intercepting the bits whose bit quantity is $u_p$ from the to-be-transmitted bit stream, refer to related descriptions of step A1 in Embodiment 2. For brevity, details are not described herein again. A difference lies in that the foregoing bit quantity u is analogous to the bit quantity $u_p$ herein.

For specific descriptions of the channel coding and scrambling process, refer to related descriptions of the channel coding and scrambling process in step C1 in Embodiment 7-A. For brevity, details are not described herein again.

Step C2: Modulate the to-be-Modulated Bits (to Obtain the P First Symbols).

The transmit end device may determine, in the first constellation determined based on the foregoing manner 2, the first constellation point corresponding to the first to-be-modulated bits, based on a correspondence between each constellation point in the first constellation and each bit value, to obtain the P first symbols. For specific descriptions of this step, refer to related descriptions of step A2 in Embodiment 1 in the case A. For brevity, details are not described herein again.

Step C3: Perform Resource Mapping, and Send the P First Symbols.

For specific descriptions of this step, refer to specific descriptions of step A3 in Embodiment 1 in the case A. For brevity, details are not described herein again.

The foregoing uses the first to-be-modulated bits as an example to describe in detail the process in which the transmit end device processes the first to-be-modulated bits. When the first to-be-modulated bits are coded scrambled bits obtained after channel coding and scrambling are performed on one group of bits in groups of bits obtained by grouping the to-be-transmitted bit stream, or when the first to-be-modulated bits are a group of coded scrambled bits in groups of coded scrambled bits in the coded scrambled bit stream obtained after channel coding and scrambling are performed on the to-be-transmitted bit stream, a process of processing other to-be-modulated bits by the transmit end device is the same as the process of processing the first to-be-modulated bits by the transmit end device, to complete processing on the to-be-transmitted bit stream. For brevity, details are not described herein again.

From a perspective of a receive end device (that is, the network device), for the received P first symbols, the receive end device may determine the first constellation based on the manner 1 in the manners of determining the first constellation, and determine the first to-be-modulated bits corresponding to the first constellation point (that is, the P first symbols) in the first constellation. The receive end device separately descrambles and decodes the first to-be-modulated bits based on the scrambling sequence and the coding information, to obtain uncoded bits. For the process of determining the first to-be-modulated bits corresponding to the first constellation point in the first constellation, refer to related descriptions in S240 in the method 200. In the two manners in which the transmit end device determines the first to-be-modulated bits, for specific descriptions of related content descrambled and decoded by the receive end device, refer to descriptions of related content descrambled and decoded by the receive end device in Embodiment 7-A. For brevity, details are not described herein again.

Case D: Channel Coding, Modulation, and Resource Mapping

Figure 15:
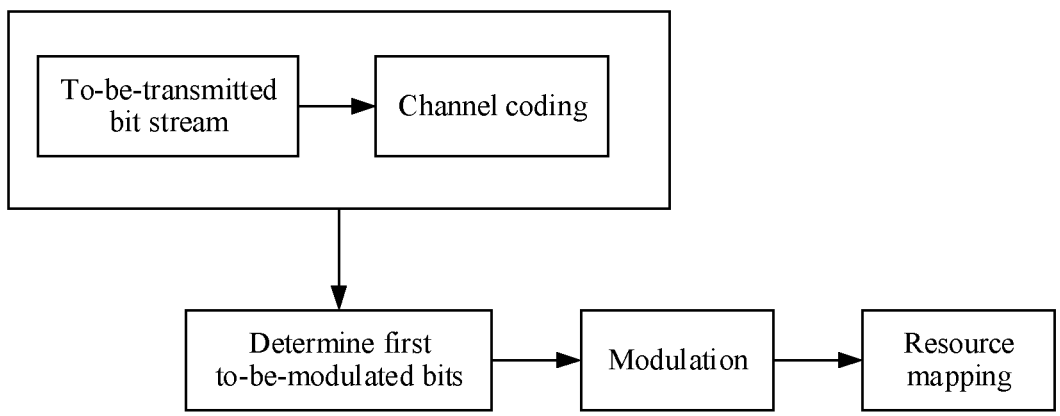

Refer to FIG. 15. The process of processing the to-be-transmitted bit stream includes the following steps. Step D1: Perform channel coding on the at least some bits in the to-be-transmitted bit stream to determine the first to-be-modulated bits. Step D2: Modulate the first to-be-modulated bits to obtain the P first symbols. Step D3: Perform resource mapping on the P first symbols. Compared with Embodiment 6-A and Embodiment 6-B in the case C, the embodiment in the case D does not include a process of scrambling the P first symbols. Therefore, for specific descriptions of steps D1 and D2 in the case D, refer to related descriptions of step C1 and step C2 in Embodiment 6-A and Embodiment 6-B. For brevity, details are not described herein again.

The foregoing describes in detail the data transmission method in the embodiments of this application in non-coherent transmission based on the cases. Based on the non-coherent transmission provided in the embodiments of this application, in some communication systems, non-coherent transmission and coherent transmission may coexist. In this case, the transmit end device needs to determine whether to use non-coherent transmission or coherent transmission to send data. The receive end device also needs to determine whether to use non-coherent transmission or coherent transmission to receive data. Therefore, an embodiment of this application further provides a manner of determining whether to use non-coherent transmission to transmit data. In this way, it is determined to use different transmission modes based on different cases, so that data can have better transmission performance in different transmission modes. For example, when a specific condition is met, non-coherent transmission is used, and data transmission performance is relatively good.

The following describes in detail a plurality of manners in which the transmit end device or the receive end device determines a transmission mode to be used.

1. In a possible design, a terminal device serving as the transmit end device or the receive end device may determine a transmission mode through specification in a system or predefinition in a protocol, or based on information sent by a network device. The transmission mode includes non-coherent transmission or coherent transmission.

When the network device sends information to the terminal device, the information may be used to indicate a transmission mode.

For example, the information may be Boolean indication information, a first value indicates that non-coherent transmission is used, and a second value indicates that coherent transmission is used.

For example, the information may be used to indicate a constellation used for transmitting the to-be-transmitted bit stream, where symbols corresponding to each constellation point in the constellation correspond to a plurality of resource units. In other words, it indicates, by indicating the constellation, that the terminal device may transmit data by using non-coherent transmission. Conversely, when the symbols corresponding to each constellation point in the constellation indicated by the information corresponding to one resource unit, it means that the terminal device needs to transmit data by using coherent transmission.

For example, the information may be used to indicate that the terminal device does not transmit a pilot. In other words, it indicates, by indicating the terminal device not to transmit a pilot, that the terminal device may transmit data by using non-coherent transmission. Conversely, when the information indicates that the terminal device transmits a pilot, it means that the terminal device needs to transmit data by using coherent transmission.

For example, the information may be higher layer signaling (for example, radio resource control (RRC)) signaling, media access control control element (MAC CE) signaling, or physical layer signaling (for example, DCI).

In another possible design, a network device serving as the transmit end device or the receive end device may determine a transmission mode through specification in a system or a predefinition in a protocol, or in another manner. For specific descriptions of determining, by the network device, the transmission mode in another manner, refer to at least one of the following items 2 to 8. Details are not described herein.

2. The transmit end device or the receive end device determines the transmission mode based on an information type of the to-be-transmitted bit stream.

Optionally, if the information type of the transmission bit stream is service data, coherent transmission may be used.

Optionally, if the information type of the transmission bit stream is control information (for example, DCI or UCI), non-coherent transmission may be used.

3. The transmit end device or the receive end device determines the transmission mode based on a channel carrying the to-be-transmitted bit stream.

Optionally, if the channel carrying the to-be-transmitted bit stream is a physical layer control channel (for example, a PDCCH or a PUCCH), non-coherent transmission may be used. Optionally, if the channel carrying the to-be-transmitted bit stream is a shared channel (for example, a PUSCH), coherent transmission may be used.

4. The transmit end device or the receive end device determines the transmission mode based on a transmission direction of transmitting the to-be-transmitted bit stream.

Optionally, if the transmission direction is downlink transmission, coherent transmission may be used.

Optionally, if the transmission direction is uplink transmission, non-coherent transmission may be used.

The uplink transmission may be that the terminal device sends data to the network device, and the downlink transmission may be that the network device sends data to the terminal device.

5. The transmit end device or the receive end device determines the transmission mode based on the quantity of bits in the to-be-transmitted bit stream.

Optionally, if the quantity of bits in the to-be-transmitted bit stream falls within a first value range, non-coherent transmission is used.

Optionally, if the quantity of bits in the to-be-transmitted bit stream does not fall within the first value range, coherent transmission is used.

For example, the first value range may be greater than a first value, less than a second value, or greater than the first value and less than the second value.

For example, the first value range may be 3 to 11 bits, or 1 to 11 bits.

For the receive end device, as an example instead of a limitation, the quantity of bits in the to-be-transmitted bit stream may be determined in the following manners.

In a possible design, the receive end device determines the quantity of bits in the to-be-transmitted bit stream based on resource indication information that is configured by the network device and that is used to indicate the quantity of resource units occupied by each modulation resource block and scheduling information that is used to indicate the resource units used to transmit the to-be-transmitted bit stream. For specific descriptions, refer to the foregoing related descriptions. Details are not described herein again.

In a possible design, when the information type of the to-be-transmitted bit stream is a specific type of information, a quantity of bits of the specific type of information may be predefined in a protocol or a communication system. For example, the specific type of information may be feedback information (an acknowledgment (ACK), or a negative acknowledgment (NACK)), channel quality indicator (CQI) information, or the like. Therefore, the receive end device may determine the quantity of bits in the to-be-transmitted bit stream based on the information type of the to-be-transmitted bit stream.

For example, if the information type is feedback information, the feedback information includes an acknowledgment (ACK) and a negative acknowledgment (NACK), and the feedback information corresponds to 1 bit. For another example, a channel quality indicator (CQI) corresponds to 5 bits.

6. The transmit end device or the receive end device determines the transmission mode based on the quantity of antenna ports used to transmit the to-be-transmitted bit stream.

Optionally, if the quantity of antenna ports used to transmit the to-be-transmitted bit stream is less than or equal to a second threshold, non-coherent transmission is used.

Optionally, if the quantity of antenna ports used to transmit the to-be-transmitted bit stream is greater than a second threshold, coherent transmission is used.

For example, the second threshold is 1 or 2.

7. The transmit end device or the receive end device determines the transmission mode based on the quantity of resource units occupied by the to-be-transmitted bit stream.

Optionally, if the quantity of resource units occupied by the to-be-transmitted bit stream is less than a third threshold, non-coherent transmission is used.

Optionally, if the quantity of resource units occupied by the to-be-transmitted bit stream is greater than or equal to the third threshold, coherent transmission is used.

For example, the third threshold is 1, 2, 3, 4, or the like. The quantity of resource units occupied by the to-be-transmitted bit stream is a quantity of resource units used to transmit the to-be-transmitted bit stream, and the resource unit may be an RE, an RB, an RBG, or the like.

8. The transmit end device or the receive end device determines the transmission mode based on capability information of the terminal device, where the capability information is used to indicate that the terminal device supports non-coherent transmission or supports coherent transmission.

In other words, different capabilities of the terminal device support different transmission modes.

A network device serving as the receive end device or the transmit end device may determine, based on the capability information reported by the terminal device, to use non-coherent transmission to transmit data. Conversely, when the capability information indicates that the terminal device supports coherent transmission, the network device may also determine, based on the capability information, to use coherent transmission to perform data transmission.

For example, the capability information may be information reported by the terminal device and indicating that the terminal device supports or does not support non-coherent transmission. In other words, when the terminal device reports that the terminal device supports non-coherent transmission, it is considered that the terminal device is capable of supporting non-coherent transmission; when the terminal device reports that the terminal device does not support non-coherent transmission, it is considered that the terminal device is incapable of supporting non-coherent transmission, but is capable of supporting coherent transmission.

For another example, the capability information may be a size or a maximum value that is of the quantity P of resource units occupied by one modulation resource block and that is supported by the terminal device, and/or the capability information may be a size or a maximum value that is of the bit quantity u of to-be-modulated bits and that is supported by the terminal device. For example, if P is less than or equal to a first preset value, it is considered that the terminal device is capable of supporting non-coherent transmission; if P is greater than the first preset value, it is considered that the terminal device is incapable of supporting non-coherent transmission, but is capable of supporting coherent transmission. If the bit quantity of the to-be-modulated bits is less than or equal to a second preset value, it is considered that the terminal device is capable of supporting non-coherent transmission; or if the bit quantity of the to-be-modulated bits is less than or equal to the second preset value, it is considered that the terminal device is incapable of supporting non-coherent transmission, but is capable of supporting coherent transmission.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

The foregoing describes in detail the data transmission method provided in the embodiments of this application with reference to FIG. 1 to FIG. 15. The following describes in detail a communication apparatus provided in the embodiments of this application with reference to FIG. 16 and FIG. 17. In the foregoing embodiments provided in this application, the methods provided in the embodiments of this application are separately described from a perspective of interaction between the transmit end device and the receive end device. To implement functions in the foregoing methods provided in the embodiments of this application, the transmit end device and the receive end device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

It should be understood that in this embodiment of this application, module division is an example, and is merely logical function division. During actual implementation, there may be another division manner. In addition, function modules in each embodiment of this application may be integrated into one processor, or each of the modules may exist alone physically, or two or more modules may be integrated into one module. The integrated module may be implemented in a form of hardware, or may be implemented in a form of a software functional module.

Figure 16:
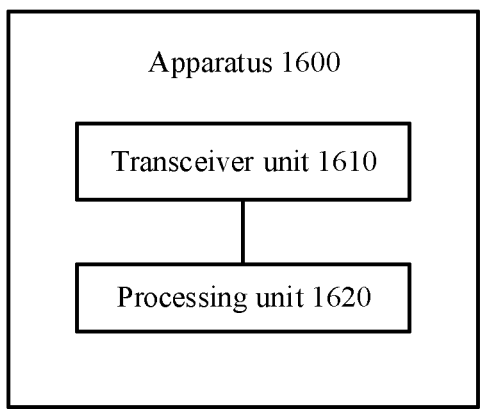
FIG. 16 is a schematic block diagram of a communication apparatus according to an embodiment of this application.

FIG. 16 is a schematic block diagram of a communication apparatus according to an embodiment of this application. The apparatus 1600 may be a transmit end device, may be a chip system in the transmit end device, or may be another apparatus that can match the transmit end device. The apparatus 1600 may be a receive end device, may be a chip system in the receive end device, or may be another apparatus that can match the receive end device. The apparatus 1600 includes a transceiver unit 1610 and a processing unit 1620.

In a possible design, the apparatus is configured to implement a function of the transmit end device in the foregoing methods.

The processing unit 1620 is configured to determine, in a first constellation, a first constellation point corresponding to first to-be-modulated bits, where the first constellation point corresponds to P first symbols, P=M*N, M is a positive integer, N is an integer greater than 1, and the first to-be-modulated bits include a positive integer quantity of bits.

The transceiver unit 1610 is configured to send P second symbols on N resource units by using M antenna ports, and skipping sending demodulation reference signals of the P second symbols, where the P second symbols are the P first symbols, or the P second symbols are symbols determined based on the P first symbols.

The processing unit 1620 may be configured to implement the methods performed by the transmit end device in the embodiments corresponding to FIG. 1 to FIG. 15.

For specific descriptions, refer to related descriptions in the method embodiments. Details are not described herein again.

In another possible design, the apparatus is configured to implement a function of the receive end device in the foregoing methods.

The transceiver unit 1610 is configured to receive P second symbols on N resource units by using M antenna ports, and skip receiving demodulation reference signals of the P second symbols, where the P second symbols are P first symbols, or the P second symbols are symbols determined based on P first symbols, the P first symbols correspond to a first constellation point, P=M*N, M is a positive integer, and N is an integer greater than 1.

The processing unit 1620 is configured to determine first to-be-modulated bits corresponding to the first constellation point in a first constellation.

The processing unit 1620 may be configured to implement the methods performed by the receive end device in the embodiments corresponding to FIG. 1 to FIG. 15.

For specific descriptions, refer to related descriptions in the method embodiments. Details are not described herein again.

It should be understood that, the apparatus 1600 herein is represented in a form of function unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 1600 may be specifically the transmit end device or the receive end device in the foregoing embodiments, and the apparatus 1600 may be configured to perform procedures and/or steps that are corresponding to the transmit end device or the receive end device in the foregoing method embodiments. To avoid repetition, details are not described herein again.

The apparatus 1600 in the foregoing solutions has a function of implementing corresponding steps performed by the transmit end device or the receive end device in the foregoing methods. The function may be implemented by hardware, may be implemented by software, or may be implemented by hardware executing corresponding software. The hardware or the software includes one or more modules corresponding to the foregoing function. For example, the transceiver unit may be replaced with by a transmitter and a receiver, or may be replaced with another communication interface such as an interface. Another unit such as the processing unit may be replaced with a processor, to separately perform a transmitter operation and a related processing operation in each method embodiment. In addition, the transceiver unit in the apparatus 1600 may alternatively include a sending unit and a receiving unit. For performing a receiving-related operation, a function of the transceiver unit may be understood as a receiving operation performed by the receiving unit, and for performing a sending-related operation, a function of the transceiver unit may be understood as a sending operation performed by the sending unit.

Figure 17:
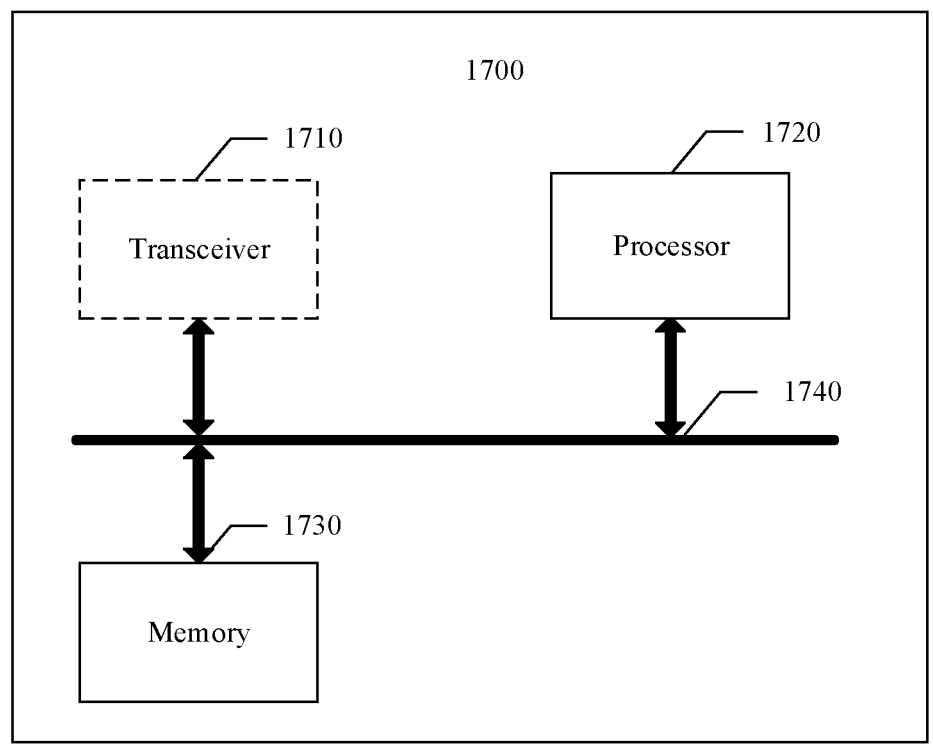
FIG. 17 is a schematic structural diagram of a communication apparatus according to an embodiment of this application.

FIG. 17 shows an apparatus 1700 according to an embodiment of this application.

In a possible design, the apparatus is configured to implement a function of the transmit end device in the foregoing methods. The apparatus may be a transmit end device, or may be an apparatus that can be disposed in the transmit end device or used in matching with the transmit end device. The apparatus may be a chip system. In this embodiment of this application, the chip system may include a chip, or may include a chip and another discrete component.

The apparatus 1700 includes at least one processor 1720, configured to implement a function of the transmit end device in the data transmission methods provided in the embodiments of this application.

The apparatus 1700 may further include at least one memory 1730, configured to store program instructions and/or data. The memory 1730 is coupled to the processor 1720. Coupling in the embodiments of this application may be indirect coupling or a communication connection between apparatuses, units, or modules in an electrical form, a mechanical form, or another form, and is used for information exchange between the apparatuses, the units, or the modules. The processor 1720 may cooperate with the memory 1730. The processor 1720 may execute the program instructions stored in the memory 1730. At least one of the at least one memory may be included in the processor.

The apparatus 1700 may further include a communication interface. For example, the communication interface may be a transceiver 1710, configured to communicate with another device via a transmission medium, so that an apparatus in the apparatus 1700 may communicate with the another device. For example, the another device may be a receive end device. In this embodiment of this application, the communication interface may alternatively be in another form of a circuit, a module, an interface, or the like, and is used for communication between the apparatus 1700 and another device.

For example, the processor 1720 is configured to determine first to-be-modulated bits, and is further configured to determine, in a first constellation, a first constellation point corresponding to the first to-be-modulated bits, where the first constellation point corresponds to P first symbols, P=M*N, M is a positive integer, and N is an integer greater than 1. The processor 1720 sends, via the transceiver 1710, P second symbols on N resource units by using M antenna ports, and skipping sending demodulation reference signals of the P second symbols, where the P second symbols are the P first symbols, or the P second symbols are symbols determined based on the P first symbols.

The processor 1720 may be configured to implement the methods performed by the transmit end device in all embodiments corresponding to FIG. 1 to FIG. 15.

For specific descriptions, refer to related descriptions in the method embodiments. Details are not described herein again.

In another possible design, the apparatus is configured to implement a function of the receive end device in the foregoing methods. The apparatus may be a receive end device, may be an apparatus that can be disposed in the receive end device, or may be an apparatus that can be used in matching with the receive end device. The apparatus may be a chip system.

The apparatus 1700 includes at least one processor 1720, configured to implement a function of the receive end device in the data transmission methods provided in the embodiments of this application.

The apparatus 1700 may further include at least one memory 1730, configured to store program instructions and/or data. The memory 1730 is coupled to the processor 1720. The processor 1720 may cooperate with the memory 1730. The processor 1720 may execute the program instructions stored in the memory 1730. At least one of the at least one memory may be included in the processor.

The apparatus 1700 may further include a communication interface. For example, the communication interface may be a transceiver 1710, configured to communicate with another device via a transmission medium, so that an apparatus in the apparatus 1700 may communicate with the another device. For example, the another device may be a transmit end device.

For example, the processor 1720 receives, via the transceiver 1710, P second symbols on N resource units by using M antenna ports, and skip receiving demodulation reference signals of the P second symbols, where the P second symbols are P first symbols, or the P second symbols are symbols determined based on P first symbols, the P first symbols correspond to a first constellation point, P=M*N, M is a positive integer, and N is an integer greater than 1. The processor 1720 is configured to determine first to-be-modulated bits corresponding to the first constellation point in a first constellation.

The processor 1720 may be configured to implement the methods performed by the receive end device in all embodiments corresponding to FIG. 1 to FIG. 15.

For specific descriptions, refer to related descriptions in the method embodiments. Details are not described herein again.

A specific connection medium between the transceiver 1710, the processor 1720, and the memory 1730 is not limited in this embodiment of this application. In this embodiment of this application, the memory 1730, the processor 1720, and the transceiver 1710 are connected by using a bus 1740 in FIG. 17. The bus is denoted by using a bold line in FIG. 17. A manner of connection between other components is merely an example for description, and cannot be construed as a limitation. The bus may be classified into an address bus, a data bus, a control bus, and the like. For ease of representation, only one thick line is used to represent the bus in FIG. 17, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD), or may be a volatile memory, for example, a random access memory (RAM). The memory is any other medium that can be configured to carry or store expected program code in a form of instructions or a data structure and that can be accessed by a computer, but is not limited thereto. The memory in the embodiments of this application may alternatively be a circuit or any other apparatus that can implement a storage function, and is configured to store program instructions and/or data.

All or a part of the methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD), or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

A person skilled in the art can make various modifications and variations to this application without departing from the scope of this application. This application is intended to cover these modifications and variations of this application provided that they fall within the scope of the claims of this application and equivalent technologies thereof.

What is claimed is:

1. A transmission method, comprising:
   determining, by a transmit end device, a first constellation point in a first constellation, the first constellation point corresponding to first to-be-modulated bits, wherein the first constellation point corresponds to P first symbols, P=M*N, M is a positive integer, N is an integer greater than 1, and the first to-be-modulated bits comprise a positive integer quantity of bits, the transmit end device having at least M antenna ports;
   determining, by the transmit end device, P second symbols, the P second symbols being the P first symbols or being symbols determined based on the P first symbols; and
   sending, by the transmission device, the P second symbols on N resource units on the M antenna ports, and foregoing sending demodulation reference signals of the P second symbols.

2. The method according to claim 1, wherein N is determined based on a time-frequency resource used to transmit the first to-be-modulated bits, or N is determined based on a time-frequency resource used to transmit a to-be-transmitted bit stream and a first threshold, wherein the to-be-transmitted bit stream comprises the first to-be-modulated bits, or the first to-be-modulated bits being determined from at least some bits in the to-be-transmitted bit stream.

3. The method according to claim 1, further comprising:
   determining the first constellation based on at least one of M or N, wherein each constellation point in the first constellation corresponds to P symbols.

4. The method according to claim 1, wherein a constellation point in the first constellation is obtained by scrambling a constellation point in a second constellation by using a first scrambling sequence, each constellation point in the second constellation corresponding to P symbols.

5. The method according to claim 1, wherein the first constellation comprises $L_1$ constellation points, wherein $L_1=2^u$, and u is a positive integer.

6. The method according to claim 5, further comprising:
   determining the first to-be-modulated bits based on u and a to-be-transmitted bit stream, wherein the to-be-transmitted bit stream comprises the first to-be-modulated bits, or at least some bits in the to-be-transmitted bit stream are used to determine the first to-be-modulated bits.

7. The method according to claim 1, wherein the constellation point in the first constellation belongs to a third constellation, the first constellation comprising $L_1$ constellation points, the third constellation comprising $L_2$ constellation points, where $L_2 \geq L_1$.

8. The method according to claim 1, wherein at least one of the following conditions is met:
   amplitudes of all of the P first symbols are the same, or
   a phase difference between any two first symbols in the P first symbols is an integer multiple of S,
   wherein S=2*pi/k, k is an integer greater than 1, and pi is the ratio of circumference to diameter.

9. The method according to claim 1, wherein determining that the P second symbols are symbols determined based on the P first symbols comprises:
   the P second symbols being determined based on the P first symbols and a second scrambling sequence.

10. The method according to claim 1, wherein a to-be-transmitted bit stream comprises the first to-be-modulated bits or at least some bits in the to-be-transmitted bit stream are used to determine the first to-be-modulated bits, wherein at least one of the following conditions is satisfied:
    the to-be-transmitted bit stream comprises control information; or
    a channel carrying the to-be-transmitted bit stream is a physical layer control channel; or a transmission direction for transmitting the to-be-transmitted bit stream is uplink; or a quantity of bits in the to-be-transmitted bit stream falls within a first value range; or a quantity of antenna ports used for transmitting the to-be-transmitted bit stream is less than a second threshold; or a quantity of resource units occupied by the to-be-transmitted bit stream is less than a third threshold.

11. A communication apparatus comprising at least one processor and a communication interface coupled to the processor, the at least one processor being coupled to memory including instructions that, when executed by the at least one processor, cause the apparatus to:

determine, in a first constellation, a first constellation point corresponding to first to-be-modulated bits, wherein the first constellation point corresponds to P first symbols, P=M*N, M is a positive integer, N is an integer greater than 1, and the first to-be-modulated bits comprise a positive integer quantity of bits;

determine P second symbols, the P second symbols being the P first symbols or being symbols determined based on the P first symbols; and send, through the communication interface, the P second symbols on N resource units by using M antenna ports.

12. The apparatus according to claim 11, wherein N is determined based on a time-frequency resource used to transmit the first to-be-modulated bits, or N is determined based on a time-frequency resource used to transmit a to-be-transmitted bit stream and a first threshold, wherein the to-be-transmitted bit stream comprises the first to-be-modulated bits, the first to-be-modulated bits being determined from at least some bits in the to-be-transmitted bit stream.

13. The apparatus according to claim 11, wherein the instructions cause the at least one processor is configured to:

determine the first constellation based on at least one of M or N, wherein each constellation point in the first constellation corresponds to P symbols.

14. The apparatus according to claim 11, wherein a constellation point in the first constellation is obtained by scrambling a constellation point in a second constellation by using a first scrambling sequence, each constellation point in the second constellation corresponding to P symbols.

15. The apparatus according to claim 11, wherein the first constellation comprises $L_1$ constellation points, wherein $L_1=2^u$, and u is a positive integer.

16. The apparatus according to claim 15, wherein the instructions cause the at least one processor is configured to:

determine the first to-be-modulated bits based on u and a to-be-transmitted bit stream, wherein the to-be-transmitted bit stream comprises the first to-be-modulated bits, or at least some bits in the to-be-transmitted bit stream are used to determine the first to-be-modulated bits.

17. The apparatus according to claim 11, wherein the constellation point in the first constellation belongs to a third constellation, the first constellation comprising $L_1$ constellation points, the third constellation comprising $L_2$ constellation points, where $L_2 \geq L_1$.

18. The apparatus according to claim 11, wherein at least one of the following conditions is met:

amplitudes of all of the P first symbols are the same, or a phase difference between any two first symbols in the P first symbols is an integer multiple of S, wherein S=2*pi/k, k is an integer greater than 1, and pi is the ratio of circumference to diameter.

19. The apparatus according to claim 11, wherein determining that the P second symbols are symbols determined based on the P first symbols comprises:

the P second symbols are determined based on the P first symbols and a second scrambling sequence.

20. A non-transitory computer-readable medium storing instructions that, when executed by at least one processor of a device, cause the device to:

determine a first constellation point in a first constellation, the first constellation point corresponding to first to-be-modulated bits, wherein the first constellation point corresponds to P first symbols, P=M*N, M is a positive integer, N is an integer greater than 1, and the first to-be-modulated bits comprise a positive integer quantity of bits;

determine P second symbols, the P second symbols being the P first symbols or being symbols determined based on the P first symbols; and send P second symbols on N resource units on the M antenna ports, and foregoing sending demodulation reference signals of the P second symbols.

* * * * *